INVENTORS
Evelyn Berezin
Jack Knoll
Eugene Leonard
BY
ATTORNEYS

FIG. 2 COMMUNICATIONS BUFFER CB

FIG. 3 INPUT-OUTPUT MODE CONTROL 20

ODD-EVEN CHARACTER SELECTOR
22

FIG. 5 SCANNER 24

MEMORY INPUT SELECTOR
30

MEMORY INPUT 30

INTERFACE 34

INPUT UNIT 36-1

TERMINAL JUNCTION 38

OUTPUT UNIT 40-1

AND GATE 1001

OR GATE 1021

MIXER GATE 1040

AMPLIFIER 1050

FIG. 20B
BINARY COUNTER 1130
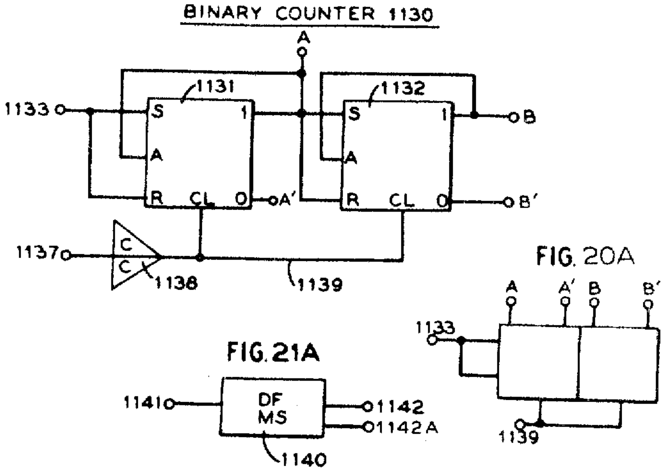
FIG. 20A, FIG. 21A
FIG. 21B
DELAY FLOP 1140
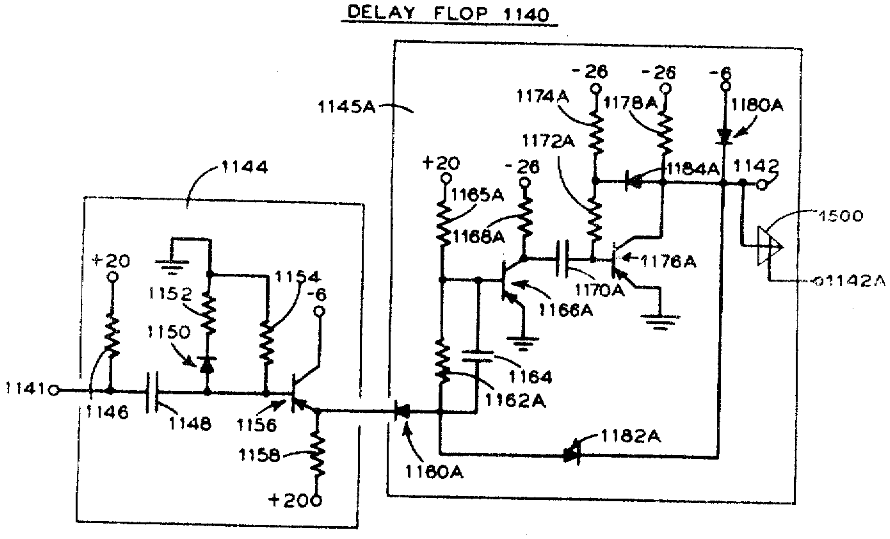

COMPARATOR 1600

BILATERAL SWITCH

INFORMATION TRANSFER APPARATUS

United States Patent Office 3,312,945

Patented Apr. 4, 1967

3,312,945

INFORMATION TRANSFER APPARATUS

Evelyn Berezin, New York, Jack Knoll, Plainview, and Eugene Leonard, Sands Point, N.Y., assignors to Digitronics Corporation, Albertson, N.Y., a corporation of Delaware Filed Oct. 14, 1963, Ser. No. 315,743
23 Claims. (Cl. 340—172.5)

This invention pertains to the transfer of information and more particularly to the transfer of information represented by signals between a high-speed data handler and a plurality of relatively low-speed data handlers.

This is a continuation-in-part of the application for Information Transfer Apparatus, Ser. No. 315,003, filed Oct. 9, 1963, now abandoned.

In the information processing field, quite often a high-speed data handler such as an electronic data processor is connected to a plurality of relatively low-speed data handlers such as input-output devices. In fact, it often occurs that the data processor can process data or information at rates of tens of thousands of characters per second, whereas the input-output devices can transmit or accept data in the order of not more than hundreds of characters per second. When the input-output devices are electromechanical the rate is even slower to the point that input-output equipment using human operators manipulating keyboards generate characters at the rate of less than ten per second.

It should therefore be apparent that a good many of the advantages obtained by high speed data processors can be lost if the processors must make many transactions with the input-output devices. Assume for example that the data processor must transfer a word or message to a first input-output device and a second input-output device wishes to transfer a word or message to the data processor. If the data processor must remain continuously connected to the input-output devices during the entire transfer operation, considerable processing time is lost. In the course of solving such a problem, buffering devices have been developed wherein a message is transferred at the slow rate from the input-output device to the buffering device and from the buffering device to the data processor at a high rate. Another buffering device is then used to transfer messages in the other direction. Such buffering devices are satisfactory when only a few input-output devices are associated with the data processor. However, when a considerable number of input-output devices is involved the presently used buffering systems become uneconomical because of the parallel duplication of equipment.

It is accordingly a general object of the invention to provide improved buffering apparatus between a relatively high-speed data handler and a group of relatively low-speed input-output data handlers.

It is another object of the invention to provide a unitary buffering means between a high-speed data processor and a plurality of relatively low-speed input-output devices wherein only a small portion of the equipment is specifically associated with each of the input-output devices and the major portion of the equipment is shared in common by all the input-output devices.

It is a further object of the invention to provide a buffering means which effectively simultaneously services a plurality of input-output devices to facilitate the transfer of information between these devices and a common data processor.

Briefly, in accordance with this aspect of the invention, a communications buffer is provided for coupling a data processor to a plurality of input-output devices. The communications buffer includes a plurality of storage registers each of which can store a plurality of characters. To each storage register is assigned one respective input-output device. A scanner sequentially interrogates the storage registers associated with the input-output devices. Four types of transfers can take place with each of the storage registers: a transfer from the data processor to the storage register; a transfer from the storage register to the data processor; a transfer from the storage register to the input-output device; and a transfer from the input-output device to the storage register. When the result of the interrogation indicates no transfer operation is called for, the next storage register associated with another input-output device is interrogated. If a transfer between the storage register and the associated input-output device is indicated, a single character is transferred. After the single character transfer, the scanner interrogates the next storage register. If a transfer between the storage register and the data processor is indicated, an entire message or word comprising a plurality of characters is transferred. At the end of the word transfer, the scanner interrogates the next storage register. It should therefore be noted that during a complete scan cycle several different types of transfers may be performed in a considerably short time; the transfers between the data processor and the storage registers progress at data processor rates, and transfers between the storage registers and the input-output devices progress at input-output device rate. In fact, the time allocated to each complete scan is less than the time required for an input-output device to handle one character so that simultaneous message transfers can take place between the communications buffer and the input-output devices and, at the same time, message transfers are being performed between some of the storage registers and the data processor.

In such a system wherein each storage register is interrogated for transfer activity, it is necessary to provide means for storing control indicia to indicate if a transfer operation is to be performed, what kind of transfer operation is to be performed and what characters are involved in the transfer.

Heretofore, associated with each buffer was a group of control indicia storage devices such as flip-flops which stored the control information indicating the kind of transfer. In addition, at least for the single character transfers, it was also necessary to provide separate character addressing means that indicate which character is to be transferred. Accordingly, as the number of serviced input-output devices increases there is a considerable increase in equipment.

It is accordingly a general object of this aspect of the invention to provide improved control apparatus for controlling the transfer of data.

It is another object of this aspect of the invention to provide a minimum of control apparatus for controlling the transfer of information.

It is another object of the invention to provide a minimum of apparatus for storing control indicia which controls the transfer of information.

Generally, in accordance with this aspect of the invention, several of the character positions of each storage register are specifically reserved for storing control indicia. When a storage register is interrogated, the control indicia are read out. The read out control indicia are then used to indicate if a transfer operation is to take place, and if so what kind.

The control indicia can be returned to the storage register unchanged if the same type of transfer operation is to be performed on the next scan or can be modified if a different type of transfer operation is to be performed on the next scan.

Furthermore, when the transfer operation is on a single character basis, several character positions in the storage register are reserved for address characters for indicating which one of the remaining character positions of the storage register will be involved in the transfer operation. The address characters are read out of the storage register and used to select the character position which will transmit or receive a character. The address characters are then updated to a new value i.e., the representation of the address of another character position so that on the next interrogation of the storage register a different character position is selected. In other words, the control and address information are "carried along" with the actual data.

It has been found that magnetic core memories are ideally suited in systems requiring medium storage capacity and short access time. Therefore, such a memory is well suited for the system under discussion. But, it should be noted that other types of memories could also be used. Generally, magnetic core memories include a plurality of planes of magnetic cores with the cores aligned in "rows" and "columns" in the planes. Each core can store a bit of information. Generally, each character comprises a group of bits of information. For example, an alphanumeric character may be represented by six bits, but it is customary to add one bit for parity checking purposes, for a total of seven bits.

Prior to this invention, a magnetic core memory suitable, by way of example, for storage of 64 words, each composed of 84 seven-bit characters, would be organized into seven (one per bit) planes of magnetic cores, with each plane arranged in 84 (one per character) columns and 64 (one per word) register-forming rows of magnetic cores. A character cell is then defined by the intersection of a row and a column, and embraces the seven bit cells (one per plane) lying within this intersection.

Such a memory would be provided with 84 column-windings, each threading the magnetic cores in its particular column; 64 row-windings, each threading the magnetic cores in its particular row; and two sets of seven plane windings (for a total of 14), namely a set of seven sense windings and a set of seven inhibit windings.

Each sense winding would be serviced by a sense amplifier; each inhibit winding by an inhibit driver; and each row winding and also each column winding by a current amplifier (also referred to as bilateral switch). We would thus have 7 sense amplifiers, 7 inhibit drivers, and 148 (64+84) current amplifiers. Additionally, one bidirectional amplifier (also referred to as a read-write amplifier) would be provided.

The direction of current through the bidirectional amplifier determines whether a read operation or a write operation is to be performed. In a read operation, the signals detected by the sense amplifiers are utilized. In a write operation, they are similarly detected, but ignored. Instead, information is physically written binary 1's only, and in order to write a binary 0, the appropriate inhibit winding is energized and prevents the writing of 1 in its plane. In either a read or a write operation the appropriate row and column current amplifiers are also energized to confine reading or writing to a particular character cell.

The type of magnetic core memory just described, and in particular the large number of current amplifiers, are expensive, and it is accordingly, an object of another aspect of the invention to provide a less expensive magnetic core memory.

It is another object of this aspect of the invention to provide a magnetic core memory wherein the number of amplifiers required is considerably decreased.

Briefly, in accordance with this aspect of the invention, a magnetic core memory for storing a plurality of $n$ bit characters is provided which has $2n$ planes of magnetic cores arrayed in rows and columns. The $2n$ planes may be considered as 2 groups of $n$ planes each. The magnetic cores in each of the rows is threaded by a winding which is connected to a row current amplifier. The magnetic cores in each of the columns is threaded by a winding which is connected to a common-column current amplifier. The magnetic cores in each plane are threaded by a common-plane winding that is connected to a sense amplifier means. The magnetic cores in each plane are also threaded by a winding means that is connected to a read-write amplifier means. There are $n$ gating means each having 2 information inputs and a control input means. One information input of each of the $n$ gating means is connected to the output of one of the sense amplifiers associated with one of the planes from the first group. The other information input of each of the $n$ gating means is connected to the output of one of the sense amplifiers associated with one of the planes from the second group. Means are provided for energizing one of the rows and one of the column current amplifiers. Means are also provided for energizing the read-write amplifier means whereby the 2 characters stored in the $2n$ magnetic cores along the intersection of the selected row and column are transferred as signals via the sense amplifiers to the $n$ gating means; and means control of the $n$ gating means to transfer either the signals present at their first information inputs or their second information inputs.

It should be noted with such a scheme, for the example given above, the system would require 14 gating means and 14 sense amplifiers but would require only 42 column current amplifiers for the core storage capability. There is a net saving of 21 amplifiers (current amplifiers and other amplifiers) or approximately 20% in amplifier equipment.

Other objects, features and advantages of the invention will be apparent from the following detailed description when read with the accompanying drawings wherein FIG. 1 shows a block diagram of the system in accordance with the invention wherein a communications buffer connects a data processor to a plurality of input-output devices;

FIGS. 20A and 20B show respectively the symbol and circuit details for a typical binary counter;

FIGS. 21A and 21B show respectively the symbol and schematic diagram of a delay-flop;

GENERAL DESCRIPTION OF SYSTEM (FIG. 1)

Figure 1:
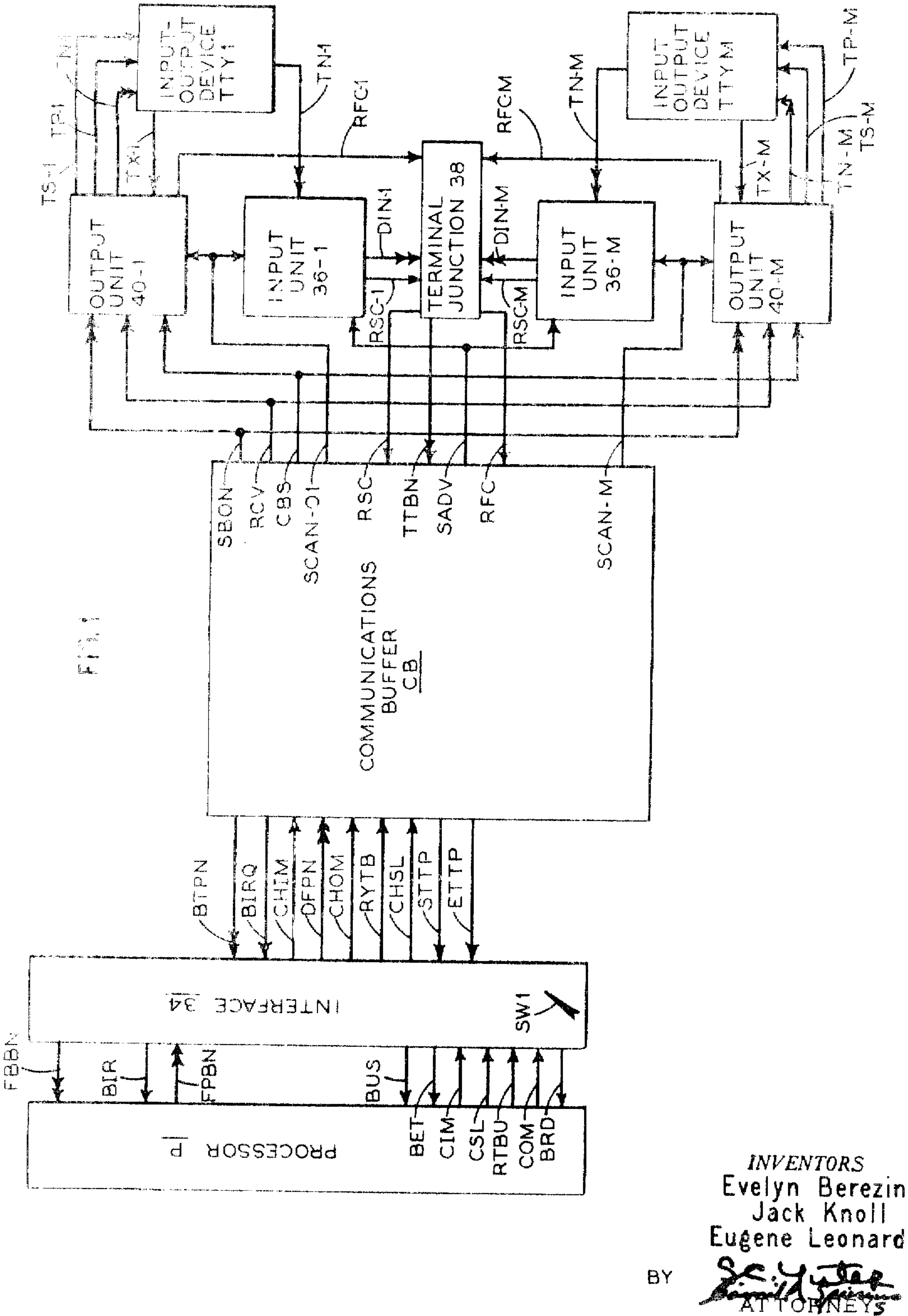

The communications buffer CB functions as a transfer means between a high-speed data processor P and a plurality of relatively low-speed input-output devices TTY–1 to TTY–M inclusive, only two of which are shown for simplicity's sake. Associated with each of the input-output devices TTY is a terminal which includes a single character input unit, a single character output unit and a multi-character or word storage register in a memory of the communications buffer CB. Associated with the data processor P is an interface which is used primarily for signal inversion and level shifting.

The terminals are sequentially scanned or interrogated for activity. Activity may be defined as a transfer operation. There are four transfer operations: processor-to-buffer; buffer-to-input-output; input-output-to-buffer; and buffer-to-processor. The transfer operations between the processor P and communications buffer CB are multi-character, i.e., word transfers between a storage register in the memory associated with a specific terminal. The transfer operations between the communications buffer CB and an input-output device TTY are single character transfers between an input-output device TTY and a character cell or address of the storage register of the terminal associated with that input-output device TTY.

More specifically, during a single processor-to-buffer transfer operation, an entire word comprising a plurality of information characters is sequentially loaded into the information character cells of a storage register associated with a terminal designated by the processor P. During a single buffer-to-processor transfer operation an entire word comprising a plurality of information characters is sequentially transferred from the information character cells of a loaded storage register to the processor P. During a buffer-to-input-output device transfer operation, the character in the first available information character cell of the storage register involved in the transfer, which has not previously been transferred, is transmitted to the input-output device. During an input-output device TTY to communications buffer CB transfer operation, the input-output device TTY transfers via input unit 36 and terminal junction 33 a single character to the first available "empty" information character cell in its associated storage register. Therefore, to transfer *n* characters between a storage register and its input-output device TTY, requires *n* transfer operations.

Each of the storage registers is divided into three groups of character cells: control character cells; address character cells; and information character cells. The control group stores two characters, each of seven bits. These are located in control character cells or character addresses 00 and 01 of a storage register. Several of the fourteen bit positions are assigned control bit significance. For example, if the second control bit position is marked (contains a binary 1), it indicates the information character cells of the storage register contain information characters and is ready to transfer a character from one of its information character cells to its associated input-output device TTY. If the third control bit position is marked, there is an indication that the storage register is completely loaded and ready to transfer an entire word from its information character cells to the processor P. When the tenth control bit position is marked, the storage register is prepared to receive into one of its information character cells a character from the input-output device TTY associated with its terminal. Only one of these particular control bits will be present at one time and generally remains present until an entire word is transferred. It should also be noted that during the present discussion there is no control bit position associated with a processor-to-buffer transfer operation.

Instead of employing a control bit to indicate a processor-to-buffer transfer operation, the processor P sends an output control signal and a terminal address indicating which storage register must accept a word. When the sequential scan reaches that terminal address, i.e., the terminal assigned that particular number, the processor P starts transferring the word regardless of the presence of any control bits in that storage location. Such a scheme gives the processor P maximum priority over the transfer of information. However, it should be apparent to those skilled in the art that such a control bit could be included, or in place thereof a control bit can be marked indicating that the associated terminal is busy, i.e., is involved in one of the three other transfer operations. Similarly, other control bit positions can be associated with error, overflow, case shift and other editing and control operations.

The next two character cells, denominated character addresses 02 and 03, are for storing a two decimal digit number in binary-coded decimal notation, i.e., the address characters. The address characters are characters indicating information character cell addresses and are employed in transfer operations between the storage register and its associated input-output device TTY. This two demical digit number indicates the information character cell which is to be involved in the transfer operation. During the transfer operation, the address characters are updated, i.e., one is added to the number representing the address characters so that during the next transfer operation associated with that storage register the subsequent information character cell or character address is involved. It should be noted that prior to transfer operations between the buffer and an input-output device, the associated address characters are preset to 04, the first information character cell or address of a storage register. It should also be noted that even though for engineering convenience seven bits are associated with each address character representing the character address, only the four less-significant bits of each are used to represent a decimal digit.

The remaining character cells, i.e., character addresses 04, 05, etc., are reserved for information characters. Each of these cells comprises seven bits to handle binary-coded alphanumeric characters which include a parity bit. However, for the sake of simplicity, the input-output devices TTY are assumed to be handling only the figures case of Teletype code. It should be noted that it will be obvious to those skilled in the art to employ input-output devices which handle six bit alphanumeric codes plus a parity bit, or to modify the system by incorporating translators and case shifting control elements with case-shift character generators so that both figures and characters in Teletype code can be handled.

The characters are read from and written into a storage register in the following manner. The two control characters are always read out of the memory simultaneously and written into the memory simultaneously; similarly, for the two address characters. The information characters are handled differently. In particular, the memory which is of the recirculation type handles the information characters in a specific manner for each transfer operation. During a processor-to-buffer operation, a pair of information characters are read from a pair of information character or character address cells; the information character cell which is to receive the information character from the processor P has the new character written therein, the information character of the other information character cell of the pair is merely recirculated back to the same information character cell. A similar routine occurs during the input-output-to-buffer transfer operations. However, during the buffer-to-processor and buffer-to-input-output transfer operations, a pair of information characters is read out and recirculated back to their same information character cells. During the read out portion of the cycle, the specific information character of the pair is also fed to the processor P via the interface 34 or the input-output device TTY via the associated output unit 40.

Generally, the communications buffer CB operates as follows. A scanner sequentially scans or interrogates a terminal by causing a read out of its control characters. If no activity is detected, i.e., none of the above mentioned control bits are detected, or there is no output control signal from the processor P, or there is an output control signal from the processor P but there is an inequality between the terminal address transmitted by the processor P and the address of the actual terminal under interrogation, or there is no request from an input-output unit, the sequential scan steps and interrogates the next terminal.

If there is activity however, a transfer operation is performed. For example, when control bit 10 is detected, an information character is transferred to the associated input-output device TTY from the information character cell indicated by the address characters. The address characters are updated by 1 and the sequential scan interrogates the next terminal. It should be noted that whenever a special end of word character is transferred, control bit 10 is destroyed; control bit 3 is created and the address characters are returned to an initial value.

If control bit 3 is detected, the information characters are sequentially read to the processor P and control bit 3 is destroyed. The last information character is a special end of word character which when detected ends the transfer and causes the sequential scan to interrogate the next terminal.

If control bit 2 is detected an information character is transferred to the input-output device TTY from the information character cell indicated by the address characters, the address characters are updated by 1, and the sequential scan interrogates the next terminal. If the transferred information character is one end of word character, indicating the input-output device should now transmit, control bit 2 is destroyed and control bit 10 is created. If, however, another end of word character is transmitted indicating the input-output device is to receive another word, control bit 10 is not created.

If the processor P is transmitting an output control signal and the terminal address being transmitted by the processor P is the same as the address of the terminal under interrogation, the characters of a word are sequentially transferred from the processor P to the information cells of the storage register associated with that terminal, control bit 2 is marked in the control character cells of the storage register of that terminal, and the address characters are preset to 04.

DETAILED DESCRIPTION OF FIGS. 1 AND 2

Figure 2:
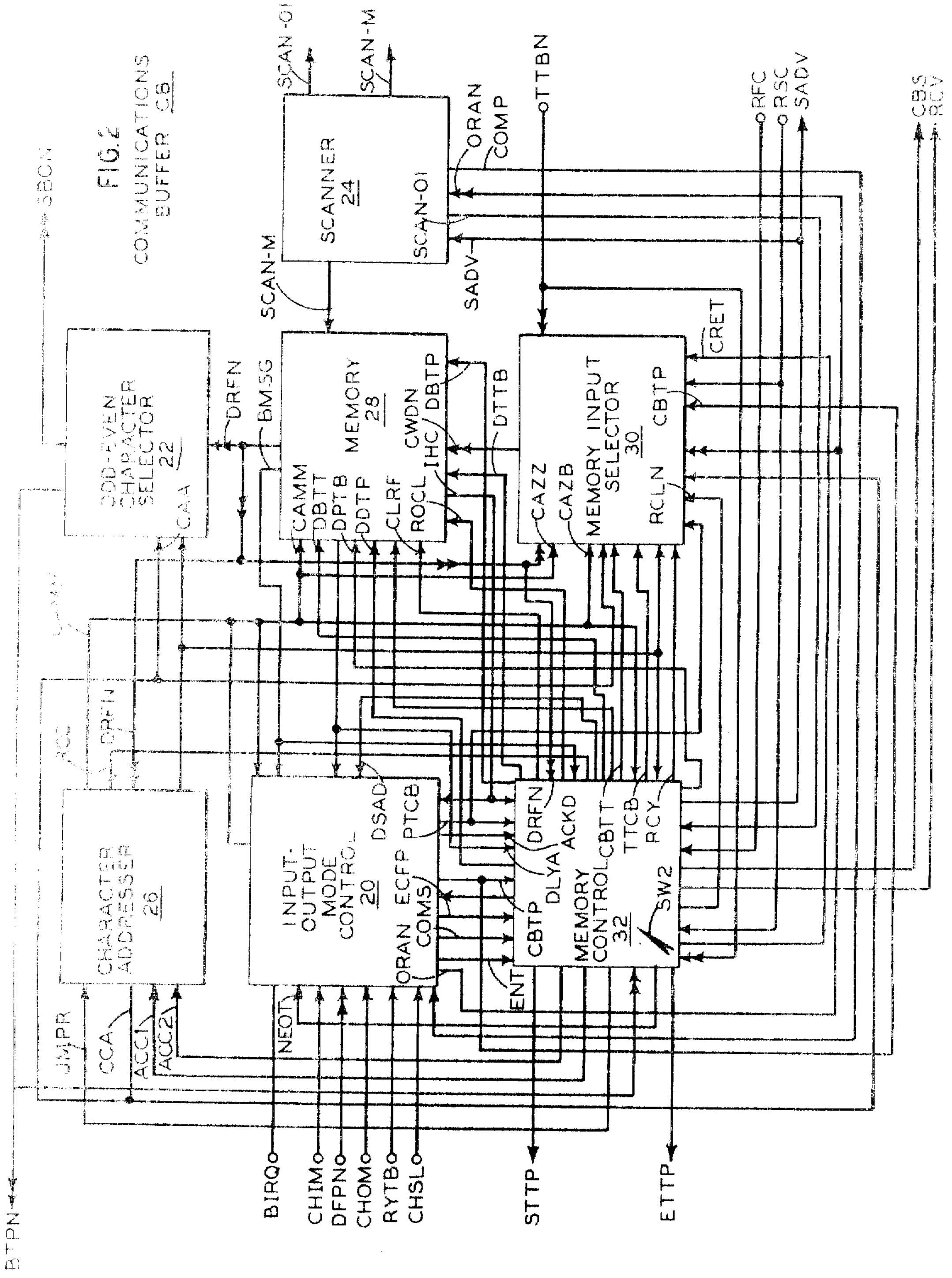
FIG. 2 shows a block diagram of the communications buffer of FIG. 1.
Figure 3:
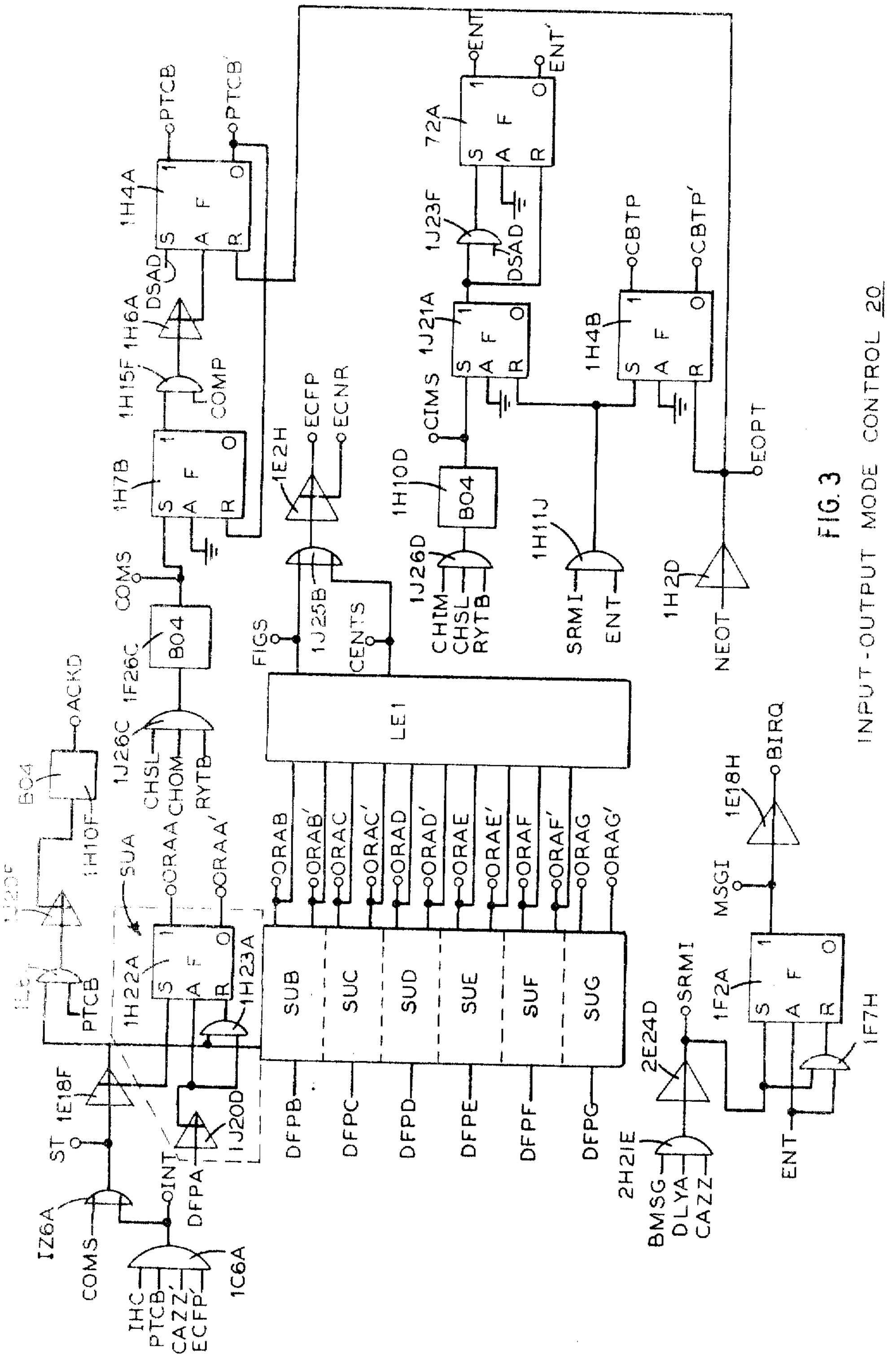
FIG. 3 is a logical diagram of the input-output control 20.
Figure 4:
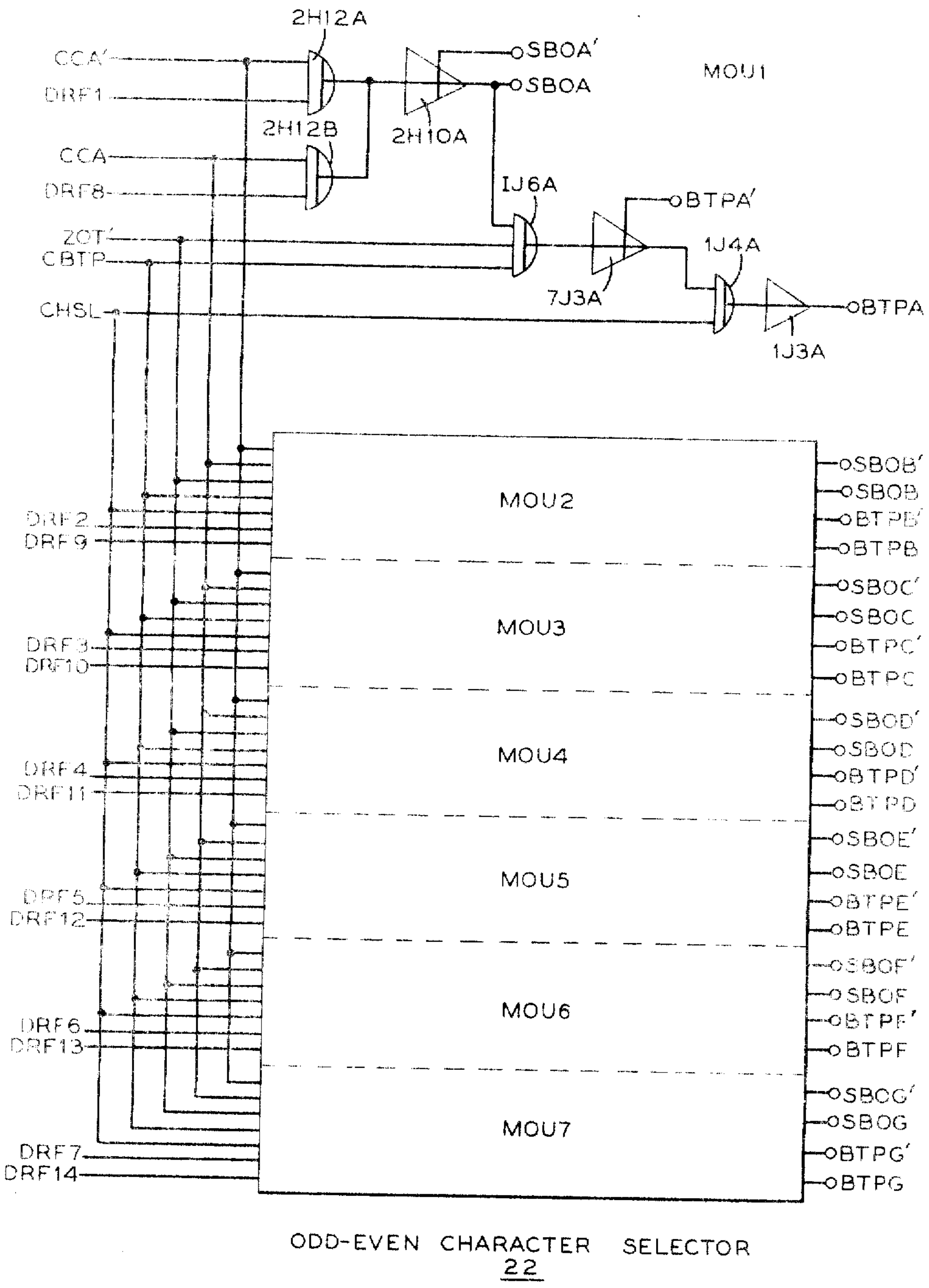
FIG. 4 is a logical diagram of the odd-even character selector 22.

In the description of the figures the following conventions will be employed:

(1) Each signal line has a reference character equal to the signal designation, i.e., the PTCB signal is carried on the PTCB signal line;

(2) Generally, simultaneously with the generation of a signal, its inverse is generated, i.e., the PTCB and PTCB′ signals are simultaneously generated. Quite often only the signal itself will be mentioned, but it should be understood that its inverse is also implied. In particular, with respect to FIGS. 1 and 2 only one signal line will be shown. However, that signal line can often be considered as two leads, one carrying the signal and the other its inverse. In FIGS. 3 et seq. the actual use of the signals and their inverses is unambiguously shown. It should be noted that when a signal is generated, it is considered present and equivalent to logical 1; its inverse however, even though it is being generated is considered absent and equivalent to logical 0. On the other hand, when a signal is not being generated it is considered absent and equivalent to logical 0; its inverse however at that time is considered present and equivalent to logical 1. In short, the presence of a signal implies the absence of its inverse; and vice-versa. Sometimes, in the circuit details, engineering considerations dictate the use of the inverse of a signal instead of the signal itself. Therefore, while logically the presence of a signal is required at a certain point, engineeringwise it is more desirable to use the absence of the inverse of the signal at that point. However, since they are logically equivalent, nothing is lost. Accordingly, to simplify the general description of the system, statements are made about the presence or absence of a signal at points whereas in actuality the absence or presence of the inverse of the signal may be used;

(3) Characters are transferred through the system with their bits in parallel. For example, a character from the processor P is represented by the ORAA, ORAB, ORAC, ORAD, ORAE, ORAF and ORAG signals. However, to simplify FIGS. 1 and 2 these seven signals will be generalized into a single signal line ORAN. Since the information characters will be carried on double arrowheaded lines it should be apparent that a double arrowheaded line bearing a reference character ending in N is actually a cable of at least a number of lines equal to the number of bits in a character;

(4) Since the character addresses and the terminal addresses range over considerable values, a generalized signal such as CAMM and SCAN–M will be used in FIGS. 1 and 2, where the M's range over the appropriated values;

(5) The signals transmitted throughout the system fall into two classes: (a) pulses such as the IHC pulse, which are relatively short term signals, generally, generated by monostable devices; and (b) *signals,* such as the PTCB signal, which are relatively long term signals generated generally by bistable devices;

(c) Throughout the description, terminology such as "characters or digits are transferred" is employed; it should be understood that binary coded combinations of signals representing the characters or digits are actually transferred;

(7) Terminology such as: "setting a flip-flop" means switching or triggering it to its on or "one" state wherein it generates a signal such as PTCB; "unsetting a flip-flop" means switching it to its off or "zero" state wherein it generates a signal such as PTCB′; "alerting a flip-flop" means priming it so that it will switch to the on state upon receipt of a set signal. In other words the alerting signal and the set signal effectively perform an "AND" function which will set the flip-flop. Generally the alerting signal precedes the set signal in time; although they could be coincident. Many of the flip-flops are not dependent on alerting signals;

(8) Generally, terminology such as "signals cooperate with other signals" to produce a different signal or to change the state of a flip-flop, implies an "AND" or coincidence function;

(9) The flip-flops in the system are set or unset by the trailing edge of a signal or pulse, or on the leading edge of an inverse signal or pulse.

The processor P is a conventional data processor such as an IBM 1401, for example. It has the facility to receive and transmit groups of characters serially (words) with the bits of the characters in parallel. It must be able: to transmit a control signal indicating the communications buffer CB has been selected to communicate with it; to transmit control signals indicating it wants to transmit or receive information; to transmit a control signal indicating that it is ready to perform the transfer of information; to accept strobe signals; and to accept end of transfer signals.

The input-output devices TTY may be, by way of example, Teletype devices which can transmit and receive characters serially with their bits in parallel. It must include: the facility of transmitting strobe signals; the facility of accepting a control signal to start its motor; and accepting control signals to switch it from transmitting to receiving.

The portion of the system which connects the processor P to the input-output devices TTY is the communications buffer CB which includes: an input-output mode control 20; an odd-even character selector 22; a scanner 24; a character addresser 26; a memory 28; a memory input selector 30; and a memory control 32. An interface 34 connects the communications buffer CB to the processor P. A plurality of input units 36, each associated with one of the input-output devices TTY; at least one terminal junction 38; and a plurality of output units 40 each associated with one of the input-output devices TTY, connect the input-output devices TTY to the communications buffer CB.

The input-output mode control 20 controls information character transfers between the processor P and the memory 28. It includes circuits, centered around a flip-flop, responsive to control signals from the processor P to start the input mode during which there is a word transfer from the memory 28 to the processor P. These circuits are responsive to an end of transfer signal derived from an end of word character (a special character which is appended to the word being transferred) to terminate the input mode. Another group of circuits centered around another flip-flop is responsive to control signals from processor P to start an output mode during which there is a character by character transfer of a word from the processor P to the memory 28. These circuits are also responsive to the end of transfer signal derived from the end of word character to terminate the output mode. Included in the input-output mode control 20 is a one character buffer register comprising seven flip-flops, each assigned to one bit of the characters being received, for temporarily storing a character before transfer to the memory 28. The inputs to the flip-flops are periodically strobed by timing signals from the memory 28 for gating the character from the processor P via the flip-flops to the memory 28. The strobe signal also causes a circuit to generate an acknowledge signal which is fed back to the processor P. A decoding circuit is also included for detecting for the special end of word characters. There is also provided a flip-flop circuit which when set transmits a control signal to the processor P indicating the communications buffer CB contains a word for transmission to the processor P.

The memory 28 is a conventional magnetic core memory which includes 14 planes of rows and columns. Therefore the cores at the intersection of the same row and the same column in 14 planes provide a storage for two seven bit characters. The 14 cores accordingly, provide 2 character cells or addresses. Each row is associated with a storage register which is assigned to an associated terminal, and each column is associated with a pair of characters in a storage register. A row winding serially threads all the cores in all the planes associated with that row. A column winding similarly threads all the cores in all the planes associated with that column. A sense winding threads all the cores in a given plane. A read-write winding also threads all the cores in a given plane; and an inhibit winding threads all the cores in a given plane. There are accordingly, 14 sense, 14 read-write and 14 inhibit windings. One end of each row winding is respectively connected to a bilateral switch, i.e., a device which when it receives a signal at a control input will permit the passage of current through its current input to a grounded output in either of two directions. In other words, it is equivalent to a mechanical single-pole, single-throw switch. One end of each column winding is also respectively connected to a similar bilateral switch. The other ends of all the row windings are connected together and to a terminal of a read-write driver. Similarly, for the other ends of the column windings. The ends of each sense winding are connected respectively to the input of a sense amplifier whose output is connected to a flip-flop which acts as a temporary storage device which is set by the output of its associated sense amplifier and unset a short time thereafter by a pulse from a pulse generator in memory 28.

The read-write amplifier is essentially a current amplifier which has at least two inputs, a read and a write input. When it receives a pulse at the read input it transmits read current of a first polarity and when it receives a pulse on the write input it transmits write current of an opposite polarity. The ends of the inhibit windings are connected respectively to outputs of inhibit drivers, i.e. a current amplifier which, when it receives a pulse at its input, transmits a current having a polarity which will negate the effect of any write current being transmitted by the read-write amplifier at the same time. Character selection (actually the selection of a pair of characters) is obtained by energizing one row bilateral switch and one column bilateral switch. This selects one core in each of the 14 planes. Reading of the selected pair of characters is effected by feeding a pulse to the read input of the read-write amplifier when these bilateral switches are energized. Similarly, writing is effected when a pulse is fed to the write input of the read-write amplifier. However, it should be noted that this would cause the writing of a binary 1 in each of the bit positions of the two selected characters. Since a character is a combination of binary ones and zeros the desired zeros are obtained by simultaneously energizing the appropriate inhibit drivers.

Included in memory 28 is a chain of pulse generators connected in a controllably recirculatable loop which generate the pulses that are fed to the read and write inputs of read-write amplifiers, the input of the inhibit amplifiers and the unsetting input of the storage flip-flops. Each read-write cycle includes first a read pulse followed by a DLYA pulse, an inhibit pulse and a write pulse which overlap in time. The inhibit pulse, actually called an IHC pulse, starts before the write pulse and ends after the write pulse. The number of read-write cycles is controlled by control inputs to the chain which are dependent on the type of transfer operation. The control inputs are energized by memory control 32. In other words, if the first pulse generator of the chain is triggered, it will trigger the next, etc. The last of the pulse generators will retrigger the first only if one of the control inputs is present. The scanner 24 provides the row selecting (terminal address) signals for the memory 28 which are also used to select the input-output device TTY associated with the storage register whose row is being selected. The scanner 24 includes a conventional multi-stage binary counter which counts scan advance signals (SADV) and a conventional decoder for decoding the outputs of the binary counters to the different signals (SCAN–M). Each one of these signals is fed to one of the row bilateral switches respectively of memory 28. For convenience, there is included in scanner 24 a conventional equality comparator whose one set of inputs is connected to the outputs of the binary counters and whose other set of inputs is connected to the outputs of the flip-flops in the input-output mode control 20 for comparing the available terminal address with the desired terminal address received from the processor P during a processor-to-buffer transfer operation.

The character addresser 26 is basically a pair of decade counters each comprising a plurality of interconnected binary counters and having the ability to controllably count by 1 or 2. The binary counters have the added ability of receiving respectively in parallel the bits representing a count. The outputs of the binary counters are connected to a conventional decoder which generates the column selection signals fed to the column bilateral switches of memory 28. In addition, the character addresser 26 includes a circuit which generates a signal while the character count is in the range 00 to 03 inclusive. The character addresser 26 further includes means for generating an odd-even control signal to indicate whether the character address is associated with the first or second of the pair of characters being selected. Actually this means is the first stage of the binary counters.

The odd-even character selector 22 is basically seven output gating means each including at least two conventional "AND" circuits with one input of the first AND circuit provided for receiving one bit from the first character of the pair of characters read from the memory 28 and one input of the second AND circuit provided for receiving the corresponding bit from the second pair of characters read from the memory 28. The other input of each of the AND circuits receives the odd-even control signals from the character addresser 28 to determine which of the AND units is to transmit a bit.

The memory input selector 30 is basically 14 switching units of logical elements comprising conventional AND circuits and "OR" circuits. The 14 logical elements are divided into two groups of seven. The output of each logical element is associated with one of the bits of the pair of characters which are handled by the memory 28 at any one time.

The information inputs to the logical elements are connected to various sources of characters throughout the system such as the processor P, the input-output devices TTY and the memory 28 (recirculation). Control inputs are also associated with the logical elements to control the sources for the bits of the characters as well as which pair of seven logical elements it is to feed bits to the memory 28. Included in memory input selector 30 is a parallel unit adder.

The memory control 32 is basically a plurality of logical elements and flip-flop units. One group of these units controls the advancing of the scanner 24. Another group initiates and controls the number of read-write cycles performed by the memory 28. Another group provides control signals for the control inputs of the logical elements in memory input selector 30. A further group controls the character addresser 26 during its updating operation. There is also included in memory control 32 clearing signals that are fed to various counters and flip-flops throughout the system.

Interface 34 (FIG. 1) comprises a plurality of amplifiers which act as phase inverters and level shifters to provide compatible electrical coupling between the processor P and the communications buffer CB.

A typical input unit 36–1 associated with input-output device TTY–1 includes at least five flip-flops which are respectively responsive to the bit outputs of input-output device TTY–1. It includes means for strobing the bit outputs to set the appropriate flip-flops when the terminal is under scan; to reset them after a given period of time; and to transmit a request to send signal.

Typical output unit 40–1 associated with input-output device TTY–1 includes at least five flip-flops associated with the bits of characters transmitted from odd-even character selector 22 to provide a one character temporary storage prior to and during transmission of the character to input-output device TTY–1. It also includes means for generating a strobe signal in response to a strobe signal from the input-output device for sampling the output lines of odd-even character selector 22 to set the appropriate flip-flops when the terminal is under scan and to reset them after a given period of time. It further includes means for transmitting a request for character signal; and means for generating a signal for energizing the drive means of the input-output device TTY–1.

Terminal junction 38 is basically an OR unit for receiving the characters transmitted from the respective input units 36 and for transmitting them to memory input 30.

GENERAL TERMINAL INTERROGATION (FIGS. 1 AND 2)

Initially, an operator closes switch SW1 which generates the BRD signal which is fed from interface 34 to inform the processor P that the communications buffer CB is ready for operation. The operator then momentarily closes the switch SW2 in memory control 32, causing the generation of a GCL signal that is fed to every flip-flop and counter in the system causing it to be unset (set to the zero state). Among other effects the scanner 24 is set to the first terminal and generates the SCAN–01 signal. Similarly the character addresser 26 is set to its first position which generates the CAZZ signal indicative of the first two character cells of a storage register.

Since the scanner 34 is generating the SCAN–01 signal and the character addresser 26 the CAZZ signal, the first two character cells (the control characters) of the first storage register are being selected in memory 28. Sixty milliseconds later memory control 32 starts generating a CLRF signal which is fed at least to the flip-flops in memory 28 to prevent their setting as long as this signal is present. The whole approach is to scan through each terminal and initially clear the bits in its control character cells. Concurrent with the start of the CLRF signal memory control 32 generates a scan advance pulse SADV which is fed at least to scanner 24 stepping it to the second terminal, causing the generation of the SCAN–02 signal, and an RCC pulse fed to character addresser 26 clearing it to the CAZZ signal, and shortly thereafter memory control 32 transmits an ROCL pulse to memory 28 to initiate a red-write cycle. During the read portion of this cycle the two control characters of storage register associated with the second terminal are read from the selected magnetic cores in the memory 28. However, since the CLRF prevents the setting of the associated flip-flops, the memory 28 transmits the equivalent of all zeros over the lines DRFN to memory input 30. The CAZZ signal cooperates with the DRFN signals to transfer the bits now represented by the CWDN signals to memory 28 for writing back into the same selected storage locations. In this particular case, all zeros will be written during the write portion of the read-write cycle. During each read-write cycle, the memory 28 generates an IHC pulse which is transmitted to the memory control 32. Shortly after the end of the write portion of the read-write cycle memory control 32 in response to the reception of the IHC pulse and since no transfer operation is called for (the control bits transferred from the memory 28 are all zeros) generates another SADV pulse, and another RCC pulse. Scanner 24, accordingly starts transmitting the SCAN–03 signal, and the control bits of the storage register associated with terminal 03 are cleared in the same manner as for terminal 02. This operation continues until the scanner 24 steps through the last terminal back to terminal 01. At this time, the IHC pulse occurring during the read-write cycle associated with the clearing of the control characters of terminal 01 cooperates with the SCAN–01 signal in memory control 32 to terminate the CLRF signal. The communications buffer CB is now ready to perform any of the above mentioned transfer operations.

Although the stepping of scanner 24 has been described for the special case of the initial clearing to zero of control characters in each storage register, several of the steps are common to subsequent operations. In particular, each time the scanner 24 is to be stepped to a new terminal a SADV pulse, or RCC pulse and a ROCL pulse are generated so that the control characters in the storage register associated with the terminal under scan are read out. If a transfer operation is called for, it will be performed before the scanner 24 is again stepped. If no transfer operation is called for, then immediately after the rewriting of the control characters the memory control 32 generates the SADV, RCC and ROCL pulses as described above. A more detailed description of the stepping of the scan can be found below in the section entitled automatic scanning of the terminals.

There will now be described the transfer operations. Of course, it should be realized that there may initially be many terminal interrogations before a transfer operation is performed.

PROCESSOR-TO-BUFFER TRANSFER OPERATION (FIGS. 1 AND 2)

Anytime at all during operation, the processor P can transmit control signals and at terminal address to the communications buffer CB, designating a terminal whose storage register is to receive a word. The communications buffer CB continues performing any of the three other transfer operations which it detects during the sequential interrogating of the terminals until the terminal is reached whose terminal address has been transmitted by the processor P. When this terminal is reached the entire word is transferred to the storage register serially by characters with the bits of the characters in parallel. At the end of the word transfer the scanner 24 steps to the next terminal.

More particularly, the processor P sends the CSL, COM and RTBU control signals and a coded combination of FPBN signals indicating a terminal address to the interface 34. The interface 34 inverts and level shifts the FPBN signals and transmits them as the DFPN signals to strobable inputs of the storage flip-flops in input-output mode control 20. Interface 34 level shifts and inverts the COM, RTBU and CSL signals and transfers them respectively as the CHOM, RYTB and CHSL signals to input-output mode control 20. The coincidence of the CHOM, RYTB and CHSL signals in input-output mode control 20 causes the generation of a COMS pulse that strobes the DFPN signals into their appropriate storage flip-flops which now start generating a coded combination of ORAN signals which are fed among other places to an address comparator in scanner 24. The COMS signal is fed to memory control 32 which generates a STTP pulse that is fed via interface 34 for inversion and level shifting to become the BUS pulse returned to processor P indicating the character has been accepted. Processor P recognizes this pulse and prepares to transmit the next character. Scanning continues and when equality is detected by the address comparator in scanner 24 between the coded combination of ORAN signals and signals representing the terminal address being generated by scanner 24 it transmits a COMP to input-output mode control 20 causing the setting of a flip-flop therein which starts generating the PTCB signal. A terminal interrogation takes place, i.e., the two control characters in the character cells 00 and 01 containing the control bits are read out during the read portion of the interrogation read-write cycle. When the control bits are to be read back, the PTCB signal which is fed among other places to memory input selector 30 causes the marking of control bit 2 by forcing the generation of a CWD2 signal which is fed to memory 28. The PTCB signal is also fed to memory control 32 where it sets a flip-flop which generates the DPTB signal that is received by memory 28. As long as memory 28 receives this control signal it continues to generate read-write cycles.

The 20T signal from scanner 24 indicating the contents of the character cells presently being handled are in range of 00 to 03 of character addresses, cooperates with the PTCB signal and the IHC pulse generated by memory 28 during the read-write cycle to cause the generation of an ACC2 pulse that is fed to character addresser 26 which will start generating a CAZB signal related to the character addresses 02 and 03, i.e., the cells of the two address characters. These address characters are read out in usual manner but instead of being written back, the PTCB signal cooperates with the CAZB in memory input 30 to force the writing of only the third least significant bit of the first digit by transmitting the CWD3 signal to memory 28. In other words, the address characters are preset to 04. It is worthwhile to summarize what has been written into the storage register: in the control characters portion, the control bit 2; and in the address characters portion, straight binary-coded decimal digits 04. Therefore, the next time this terminal is interrogated control bit 2 will initiate a buffer-to-input-output-device transfer operation, and the first character to be transferred will be from character address 04.

Returning however to the specific transfer operation under discussion, the IHC pulse cooperating with the PTCB signal and the absence of the CAZZ signal in input-output mode control 20 clears the storage flip-flops therein, strobes the next character from processor P into the appropriate storage flip-flops and transmits an ACKD acknowledge pulse to memory control 32 which transmits an STTP pulse via interface 34 and the BUS signal line to processor P which prepares the next character for transmission. The IHC pulse also cooperates with the ZOT and PTCB signals in memory control 32 to generate another ACC2 pulse which will step the character addresser 26 to character address 04, i.e., the first information character address. Character addresser 26 generates the appropriate combination of CAMM signals which selects the column containing character addresses 04 and 05 for reading out during the read portion of the next read-write cycle. It should be noted that during this next read-write cycle an even character address is being handled, i.e., character address 04. However, its odd mate, i.e., the contents of character address 05 is also read out. During the write portion of this next read-write cycle a new even character will be written and the read out odd character will be rewritten. Even characters from the memory 28 are associated with output lines DRF1 to DRF7 and input lines CWD1 to CWD7; and odd characters are associated with output lines DRF8 to DRF14 and input lines CWD8 to CWD14. Furthermore, the CCA signal which is generated by the first binary counter of the binary counters in character addresser 26 indicates the evenness and oddness of the character addresses. The CCA signal will be present when the character address is odd; and the CCA signal will be absent or the CCA′ signal present when the character address is even. Therefore, during the handling of the contents of character address 04 and all even character addresses, the presence of the CCA′ signal transmitted from character addresser 26 to memory input selector 30 connects paths between the ORAN signal lines and the CWD1 to CWD7 signal lines and connects paths between the DRF8 to DRF14 signal lines and the CWD8 to CWD14 signal lines. Accordingly, during the write portion of the cycle associated with the character address 04 and all even character addresses the incoming character stored in the storage flip-flops of input-output mode control 20 is written into the memory 28 via lines ORAN, memory input selector 30 and lines CWD1 to CWD7, and the character stored in the flip-flops of the memory 28 associated with the odd character of the pair is recirculated and rewritten into the memory via the lines DRF8 to DRF14, memory input selector 30 and lines CWD8 to CWD14.

The IHC pulse associated with the read-write cycles of the fourth and succeeding character addresses, in addition to performing its strobe functions in input-output mode control 20, also cooperates with the absence of the ZOT signal (only present during character addresses 00 to 03 inclusive) and the PTCB signal in memory control 32 to generate an ACC1 pulse that is fed to character addresser 26 to update the binary counters therein by 1. The counters will then contain a count of 05. The only real effect it has is to cause the generation of the CCA signal since the same column is selected. A new memory column is only selected when there is a transition from an odd character count to an even character count by character addresser 26. Therefore, during the read-write cycle associated wtih character address 05 the contents of character addresses 04 and 05 are again read out. However, during the write portion of the read-write cycle the presence of the CCA signal causes the character stored in the storage flip-flops of input-output mode control 20 to pass via lines ORAN, memory input selector 30 and lines CWD8 to CWD14 to memory 28 for recording; and causes the character stored in the storage flip-flops in the memory 28 associated with the even character address to recirculate via lines DRF1 to DRF8, memory input 30 and lines CWD1 to CWD8 to memory 28. This routine not only occurs for character address 05 but all succeeding odd character addresses. The IHC pulse associated with this read-write cycle causes the generation of another ACC1 signal as described above, which causes the character addresser 26 to step to character address 06. The appropriate combination of CAMM signals now selects the next column of the memory 28.

In this manner, the information characters are read from processor P into the selected storage register. This continues until a special end of word character is received by input-output mode control 20 from processor P. This special end of word character which may be fig. s(0011100) or a ¢(0010000) in binary code, is detected in input-output mode control 20 which generates the ECFP and ECNR signals. The ECFP is fed to memory control 32 to unset the flip-flop which has been generating the DPTB signal, and cooperates with an IHC pulse, and the ZOT′ and PTCB signals to generate a TFLO pulse which generates an NEOT pulse. The disappearance of the DPTB signal terminates read-write cycles in memory 28 after the writing of the special end of word character. The NEOT pulse is fed to input-output mode control 20 to unset the flip-flop which has been generating the PTCB signal. The termination of the PTCB signal causes the generation of an SADV pulse in memory control 32 which is fed to scanner 24 and the next terminal is interrogated in the usual manner; and also, an ETTP pulse which is fed via interface 34 and the BET signal line to processor P to indicate therein the end of the buffer-to-processor transfer operation.

BUFFER-TO-INPUT-OUTPUT TRANSFER OPERATION (FIGS. 1 AND 2)

During the usual interrogation of a terminal, if control bit 2 of the control characters is marked, this indicates that the storage register associated with that terminal contains a word which is to be transferred to its associated input-output device TTY. Four read-write cycles follow the usual read-write cycle associated with the interrogation of the terminal, i.e., the initial reading of the control characters. During the first of these subsequent read-write cycles, the two address characters in character addresses 02 and 03 of the storage register are both transferred to character addresser 26 and also recirculated back to their original location. During the next read-write cycle the character, i.e., the contents of the character cell having the character address represented by the two address characters which were transferred to character addresser 26 during the first of these subsequent read-write cycles is read from memory 28 and is transferred via the typical input unit 40–M to the associated input-output device TTY, and is also recirculated back into its original character cell. During the third of these subsequent read-write cycles the control characters are again read from memory 28 for possible updating which will occur generally when the character just transferred was a special end of word character, and are rewritten into memory 28. The fourth and last of the subsequent read-write cycles causes the updating of the address characters. These two digits are read from the memory 28 and returned via unit adder paths in memory input selector 30 to their original character cells. Accordingly, during the next buffer-to-input-output transfer operation of the terminal, the character next information character cell of that storage register will be transferred.

More particularly, assume that typical terminal M is being interrogated, that its control characters read from the control character cells of its storage register show control bit 2 as marked and that no information characters have yet been transferred. Since terminal M is under interrogation, the SCAN–M signal is present and is fed among other places to output unit 40–M which returns a signal via the RFC–M line, the terminal junction 38 and the RFC signal line to memory control 32. The coincidence of the PATCB′ signal from input-output mode control 20 indicating a processor-to-buffer transfer operation is not in progress, a CAZZ signal from character addresser 26 indicating the control characters are being read, a DRF2 signal from memory 28 (control bit 2) and the RFC signal generate an SBTT signal which sets a flip-flop therein causing the generation of a DBTT signal and sets another flip-flop therein which generates the CBTT signal. The DBTT signal is fed to memory 28 where as long as it is present will cause the generation of read-write cycles.

The IHC pulse associated with the read-write cycle of the control characters cooperates with the CAZZ signal and the CBTT signal in memory control 32 to generate an ACC2 pulse which is fed to character addresser 26. The binary counters therein switch from the representation of a count of zero and start generating a count of 2. Accordingly, the CAZZ signal associated with the control characters ends and the CAZB signal associated with the address characters begins. The first of the subsequent read-write cycles starts with the reading of the address characters from the memory 28 and results in their being present on the DRFN signal lines. The IHC pulse at the start of the write portion of this read-write cycle cooperates with the CBTT and CAZB signals in memory control 32 to generate the JMPR pulse which is fed to character addresser 26 to gate in the address characters on the DRFN signal lines. It should be noted that the same address characters are rewritten in memory 28. In fact, the CBTT signal cooperates with the CAZB signal in memory input selector 30 to "connect" the lines DRFN respectively to the lines CWDN. During the next read-write cycle the character addresser 26 generates the appropriate combination of CAMM signals representing character addresses 04 and 05. Remember that character addresser 26 now contains the address characters received from the character address cells of the storage register and that this is the first transfer of information characters so that the character address cells of the storage register contained character address 04. It had been preset to this representation during a prior processor-to-buffer transfer operation. It should also be recalled that character address 04 is an even character address and that during even character address times the CCA′ signal is present.

During the read portion, two characters, i.e., the characters in character addresses 04 and 05 are read out of memory 28 and are present as signals on the DRFN lines. The signals on lines DRF1 to DRF7 represent the contents of character address 04, and the signals on lines DRF8 to DRF14 the contents of character address 05. The CCA′ signal is received at odd-even character selector 22 to connect the DRF1 to DRF7 signal lines to the SBON signal lines so that the information character from character address 04 or, in fact, from any even character address is fed to input unit 40–M. At the same time, the CBTT signal from memory control 32 and the ZOT′ signal from character addresser 26 cooperate in memory input selector 30 to connect the DRFN lines respectively to the CWDN lines. It should be recalled that the ZOT signal is present only for character addresses 00 to 03 inclusive, therefore, the ZOT′ signal is present for all character addresses other than these four.

The IHC pulse during this read-write cycle cooperates with the CBTT signal and the appropriate CAMM signal, actually a CAZD signal, to generate a TFCA pulse, a CBS pulse, an RCV signal and to set a flip-flop which starts generating the RCY signal. The RCV signal cooperates with the SCAN–M signal in output unit 40–M to generate the TP–M signal which conditions input-output device TTY–M to receive a character. The CBS pulse also cooperates with the SCAN–M signal in output unit 40–M to strobe the SBON signals into temporary storage flip-flops having outputs connected to the TN–M signal lines that are connected to input-output device TTY–M and to generate a TS–M signal for energizing a distributor clutch therein. The character represented by the combination of signal present on the SBON signal lines is accordingly entered into input-output device TTY–M. After the character is entered, the input-output device TTY–M sends a TX–M signal back to output unit 40–M to unset the temporary storage flip-flops. The trailing edge of signal TX–M indicates that the character has been assimilated by the TTY and the temporary storage may be destroyed.

The TFCA pulse causes the generation of an RCC pulse in memory control 32 which clears the counters in character addresser 26 so that the CAZZ signal associated with the selection of control characters is again generated.

The third of the subsequent read-write cycles occurs and the control characters are merely recirculated, it being assumed that the character transferred to the input-output device TTY–M was not an end of word character. In particular, during the read portion of the read-write cycle the signals representing the control characters are on the lines DRFN. The CAZZ signal cooperates with a PTCB′ signal (present except during the processor-to-buffer transfer operation) in memory input selector 30 to connect the DRFN signal lines respectively to the CWDN signal lines. The ACC2 pulse is then generated in the usual manner causing character addresser 26 to generate the CAZB signal which will select the address character digits in character addresses 02 and 03 for the next read-write cycle. After this cycle has been triggered the DBTT terminates by virtue of the cooperation of a DLYA signal from memory 28, the CAZZ and RCY signals unsetting the associated flip-flop. During the read portion of the cycle the signals representing the digits are on the DRFN signal lines. The CAZB, CBTT and RCY signals cooperate in memory input selector 30 to connect these lines via the parallel unit adder to the CWDN signal lines so that the signals on the lines CWDN represent the address characters that have been updated by one. In the case under consideration, the DRFN signals represent the address characters 04 and the signals on the lines CWDN represent the address characters 05. During the write portion of the read-write cycle the new character address 05 is written into the address character locations 02 and 03.

The IHC pulse of this read-write cycle cooperates with the CAZB signal and the RCY signal to unset the flip-flop in memory control 32 that was generating the CBTT signal which accordingly terminates. The termination of the CBTT signal unsets the flip-flop in memory control 32 which is generating the RCY signal which accordingly terminates. Since the DBTT signal is no longer present, there is no further read-write cycles. However, before the RCY signal ends it cooperates with the CAZB signal in memory control 32 to generate an SADV pulse which steps scanner 24 to the next terminal and initiates the interrogation of this next terminal in the usual manner. When the scanner 24 again reaches the terminal M after interrogating all the intervening terminals and performing the required transfer operations another buffer-to-input-output transfer operation is performed since control bit 2 is still present. This transfer operation is identical in all respects to the transfer operation associated with the contents of character address 04 except that there is a transfer of the contents of character address 05. Remember that the character address cells now contain address characters 05. Accordingly, during the first subsequent read-write cycle the signals representing address characters 05 are fed via the DRFN lines to character addresser 26 which generates the appropriate combination of CAMM signals to select the column in the memory 28 containing the pair of character addresses 04 and 05. However, since the contents of an odd character address are to be transferred, i.e., character address 05, the CCA signal is generated by character addresser 26. During the next read-write cycle the CCA signal is fed to odd-even character selector 22 which insures that the DRF8 to DRF14 signal lines instead of the DRF1 to DRF7 signal lines are connected to the SBON signal lines. This is the only difference between the buffer-to-input-output transfer of the contents of an odd character address and an even character address. The remainder of this character transfer routine is the same as that described for the contents of an even character address such as character address 04.

Subsequent buffer-to-input-output transfer operations associated with generalized terminal M proceed in this manner until the character being transferred is an end of word character.

There are two end of word characters, only one of which is present at the end of any word. The fig. s end of word character when received by the input-output device TTY–M will cause it to switch to the send mode. The ¢ end of word character when received by the input-output device TTY–M will cause it to stay in the receive mode. In either case, control bit 2 of the control characters must be destroyed. In the case of the fig. s end of word character, control bit 10 of the control characters must also be marked and the address characters must be preset to 04.

Accordingly, it should be recalled that during the second subsequent read-write cycle of the buffer-to-input-output transfer operation the actual information character transfer takes place. If the fig. s character is being transferred, then, when the usual TFCA pulse is generated by memory control 32 it cooperates with the appropriate combination of DRFN signals representing fig. s to set in memory control 32 two flip-flops which start generating respectively the RCLA and RCLC signals which are fed to memory input selector 30 shown for simplicity in FIG. 2 as being transferred via the RCLN cable. During the next read-write cycle when the control characters are recirculated the connection between the DRF2 and the CWD2 lines is blocked by the coincidence of the RCLC and CAZZ signals, effectively destroying control bit 2, and a signal is introduced on line CWD10 by the presence of the RCLA signal, effectively marking control bit 10. During the next read-write cycle, i.e., the one usually associated with the updating by 1 of the address characters, the RCLA signal inhibits the switching in of the parallel unit adder in memory input 30 preventing any connections between the DRFN and CWDN lines, thus destroying the address characters, and instead, the RCLA signal cooperates with the usual RCY and CAZB signals to cause the generation of a signal on the CWD3 line which is equivalent to binary-coded decimal 04. The usual termination of the CBTT signal unsets the flip-flops generating the RCLA and RCLC signals. If, on the other hand, the ¢ end of word character was transmitted only the RCLC signal is generated. Hence, from the above described role of the RCLA and RCLC signals it is apparent that only control bit 2 is destroyed.

INPUT-OUTPUT-TO-BUFFER TRANSFER OPERATION (FIGS. 1 AND 2)

Whenever an input-output device such as the generalized input-output device TTY–M is in the send mode and is transferring a character it transmits a coded combination of signals on the TN–M lines to input unit 36–M to set a group of temporary storage flip-flops whose outputs among other things alert a timing flip-flop therein. The next occurring SADV pulse generated by memory control 32 sets this flip-flop. When the scanner 24 finally generates a SCAN–M signal in its usual course of events, indicating terminal M is under scan or interrogation, the output of the timing flip-flop and the SCAN–M signal cooperate to generate an RSC–M signal which strobes the outputs of the temporary storage flip-flops to transmit a coded combination of signals via the DIN–M signal lines, the terminal junction 38 and the TTBN lines to memory input 30. The RSC–M signal is also fed via line RSC–M, terminal junction 38 and line RSC to memory control 30. The RSC signal cooperates with the usual CAZZ signal (the read-write cycle associated with the control characters is in progress), the presence of the PTCB′ signal (no processor-to-buffer transfer operation is in progress) and a DRF10 signal (control bit 10) to generate an STTB signal and set two flip-flops. The first flip-flop starts generating the TTCB signal; the second flip-flop starts generating the DTTB signal. It should be noted that if the DRF10 signal is not present then no input-output-to-buffer transfer takes place because the interrogation indicates that no transfer is required. Similarly, if the RSC signal is not present no such transfer takes place because actually the input-output device TTY associated with the terminal under scan does not have a character ready for transfer. In either case, the STTB signal is not generated and the scanner 24 advances to the next terminal. If this is the case, the signals on lines DIN–M terminate as is hereinafter more fully described.

However, assume that both the RSC and DRF10 signals are generated, therefore the single character on the TTBN lines will be stored in the storage register during this transfer operation. In particular, it should be recalled that the system is in the read portion of the read-write cycle associated with the control characters which are represented by a coded combination of signals on the DRFN signal lines that are connected respectively via the memory input 30 by virtue of the presence of the CAZZ signal to the CWDN lines. The IHC pulse of the read-write cycle causes the control characters to be rewritten. The TTCB and the CAZZ signals cooperate in memory control 32 to generate an ACC2 pulse that is fed to character addresser 26 to update the counter by two, i.e., from 00 to 02, causing the generation thereby of the CAZB signal which selects the column in memory 28 which includes the two address character cells.

The contents of the address character cells will be the address characters 04 since they were preset to that value at the end of a previous buffer-to-input-output transfer which ended with a fig. s end of word character. The DTTB signal is fed to memory 28 and as long as it is present read-write cycles continue. During the read portion of the next read-write cycle the address characters are read out and are present on the DRFN signal lines. The TTCB and CAZB signals cooperate in memory input selector 30 to connect the lines via the unit adder to the CWDN signals so that the address characters are updated by one when rewritten. The IHC pulse associated with this read-write cycle cooperates with the CAZB and TTCB signals in memory control 32 to generate a JMPR pulse which is sent to character addresser 26 to gate the address characters on the DRFN signal lines thereinto. In other words, the address characters are fed to character addresser 26 and are also updated by one and rewritten. Character addresser 26 starts generating the appropriate combination of CAMM signals for selecting the column assigned character addresses 04 and 05, and also generates the CAA′ signal. During the read portion of the next read-write cycle the characters in character addresses 04 and 05 are read out and are present on lines DRFN. The CCA′ signal cooperates with the TTCB and ZOT′ signals in memory input selector 30 to connect the DRF8 to DRF14 signal lines to the CWD8 to CWD14 signal lines, and the TTBN signal lines to the CWD1 to CWD7 signal lines so that during the write portion of the cycle a new character is written into the even address, i.e., character address 04 and the character in the odd address, i.e., character address 05 is recirculated.

The TTCB signal also cooperates with the ZOT′ signal to generate an RTCB signal in memory control 32. When the IHC pulse associated with this read-write cycle occurs it cooperates with the RTCB signal to unset the flip-flops in memory control 32 that have been generating the TTCB and DTTB signals which accordingly terminate. The termination of the DTTB signal prevents further read-write cycles. The TTCB and RTCB signals cooperate in memory control 32 to generate an SADV pulse that is fed to scanner 24 in the usual manner and is also fed to input unit 36–M where it cooperates with the SCAN–M signal to unset the timing and temporary storage flip-flops therein, terminating the DIN–M signals.

The next time the Terminal M is interrogated and it contains a character for transmission, another similar transfer operation is performed. It should be noted that the scanning rate is so fast with respect to the input rate of the input-output devices TTY that several unfruitful interrogations may be performed before another character is loaded and ready for transfer.

In any event, when the next transfer operation occurs it will concern the loading of character address 05, an odd character address. Everything is the same as for the previously described loading of the even character address 04 except that character addresser 26 now transmits the CCA signal instead of the CCA′ signal during the read-write cycle associated with the transfer of the character from input-output device TTY–M into memory 28. In particular, the CCA signal cooperates with the TTCB and ZOT′ signals in memory input selector 30 to connect the DRF1 to DRF7 signal lines to the CWD1 to CWD7 signal lines, and the TTBN signal lines to the CWD8 to CWD14 signal lines. Accordingly, the character in the even character address, for the case under discussion, character address 04, is recirculated and a new character is written into the odd character address, i.e., character address 05.

The other characters from the input device TTY–M are loaded into the associated storage register in this manner until a special end of word character, a "carriage return" is present on the lines TTBN. This character is stored and also initiates an operation which destroys control bit 10 and marks control bit 3 of the control characters.

In particular, the TTBN signals are also fed, in addition to memory input selector 30, to memory control 32, and if the special coded combination of signals is present it generates a CRET signal which is fed to memory input selector 30. During the usual read-write cycle associated with the control characters, the CRET signal cooperates with a DRF10 signal (control bit 10), a CAZZ signal (control character time), a PTCB′ signal (no processor-to-buffer transfer operation in progress) and an RSC signal to block the connection between the line DRF 10 and the CWD10 line, effectively destroying control bit 10, and to mark line CWD3, effectively recording control bit 3.

BUFFER TO PROCESSOR TRANSFER OPERATION (FIGS. 1 AND 2)

During the course of the interrogations of the terminals, if any terminal has the control bit 3 of its control characters in its storage register marked, it indicates that the terminal is loaded with a word for transfer to the processor P. Regardless of which terminal has the control bit 3 marked, the reading out of this control bit causes the generation of a BMSG signal by memory 28 which is fed to input-output mode control 20 where it cooperates with the usual CAZZ signal and the DLYA pulse from memory 28 to generate an SMRI pulse which sets a flip-flop that starts generating MSGI and BIRQ signals. The BMSG signal terminates on the next SADV pulse. The BIRQ signal is fed via interface 34 and the BIR signal line to processor P informing it that communications buffer CB has a word available for transfer. Sometime thereafter, in response to the BIR signal, processor P transmits CIM, CSL and RTBU signals via interface 34 and the CHIM, CHSL and RYTB signal lines to input-output mode control 20 where they cooperate to generate a CIMS pulse which sets a synchronizing flip-flop therein. A delayed SADV signal is transmitted on the DSAD signal line following each SADV signal. The next occurring delayed SADV signal cooperates with the output of the synchronizing flip-flop to set another flip-flop which starts generating an ENT signal. Interrogations of the terminals continue during which other transfer operations concerning the input-output devices can be performed as described above, until the control characters of a terminal are read which contain a marked control bit 3. Control bit 3 is destroyed, the BSMG signal again is generated and the transfer starts. In other words during the read portion of the read-write cycle concerned with the control characters, a signal is present on the DRF3 line. The DRF3 signal cooperates with the usual CAZZ signal, a PTCB' signal (no processor-to-buffer transfer) and the ENT signal to block any connection between the DRF3 and CWD3 lines so that control bit 3 is effectively destroyed. The BMSG, ENT and CAZZ signals cooperate in memory control 32 to generate an SBTP signal which sets a flip-flop which stays set for one read-write cycle and generates a DDTP signal which is fed to memory 28 to permit this next read-write cycle.

The BMSG signal causes the generation in input-output mode control 20 of an SMRI pulse. The SMRI pulse this time cooperates with the ENT signal to unset the flip-flop that is generating the MSGI and BIRQ signals which accordingly terminate. The SRMI pulse also cooperates with the ENT signal in input-output mode control 20 to unset the synchronizing flip-flop and the flip-flop generating the ENT signal, and to set another flip-flop which starts generating the CBTP signal. The CBTP signal is fed among other places to memory control 32 to set a flip-flop which starts generating the DBTP signal which is fed among other places to memory 28. As long as the DBTP signal is present, read-write cycles continue.

The IHC pulse during the read-write cycle associated with the control characters cooperates with the BMSG, ENT, and ZOT signals in memory control 32 to transmit an ACC2 pulse to character addresser 26 which starts selecting the column associated with the address character cells.

During the next read-write cycle, character addresser 26 is selecting the column containing character addresses 04 and 05 and the CCA' signal is generated since there is a count of 04, an even address.

Accordingly, during the read portion of the read-write cycle the coded combination of signals on the lines DRFN represents the two information characters that were in character addresses 04 and 05. The DRFN signal lines are connected to odd-even character selector 22 and memory input selector 30. The CBTP signal is fed to memory input selector 30 to effectively connect the DRFN signal lines respectively to the CWDN signal lines so that the characters are recirculated. The CCA' signal is fed to odd-even character selector 22 to connect the DRF1 to DRF7 signal lines to the BTPN signal lines which are connected via the interface 34 and the FBBN signal lines to processor P. Therefore, the character in the even character address, i.e., character address 04 is fed to processor P. The IHC pulse associated with this read-write cycle cooperates with the CBTP signal and the ZOT' signal in memory control 32 to generate a STTP strobe pulse that is fed via interface 34 and the BUS line to processor P for strobing therein the signals on the FBBN signal lines. In addition, the IHC pulse cooperates with the CBTP and ZOT' signals in memory control 32 to generate an ACC1 pulse that is fed to character addresser 26 to update the stored character address by one. Accordingly, character addresser 26 still generates the same combination of CAMM signals to select the same column but now generates the CCA signal since the contents of an odd character address, i.e., character address 05 is to be transferred. Everything is the same as for the transfer of the contents of an even character address, i.e., both characters are recirculated and the STTP strobe pulse is generated, except now the contents of the odd character address of the pair is transferred to the processor P, by virtue, the CCA signal connecting the DRF8 to DRF14 signal lines in odd-even character selector 22 to the BTPN signal lines. When the next ACC1 pulse is fed to character addresser 26 it will select the next column, i.e., the column containing character addresses 06 and 07.

This transfer of the characters continues until the special end of word character is detected. In particular, the BTPN signals representing the character being transferred are also fed to memory control 32 and if the particular special coded combination is present an ECTP signal is generated which unsets the flip-flop generating the DBTP signal. The termination of the DBTP signal prevents further read-write cycles. The ECTP signal also cooperates in memory control 32 with the CBTP signal, the ZOT' signal and the IHC pulse to generate the TFLO and NEOT pulses. The NEOT pulse is fed to input-output mode control 20 to generate an EOPT pulse which unsets the flip-flop generating the CBTP signal. The termination of the CBTP signal is sensed in memory control 32 to cause the generation of an SADV signal which advances the scanner 24 to interrogate the next terminal, and to cause the generation of an ETTP pulse which is fed via interface 34 and the BET signal line to processor P to indicate therein the end of the buffer-to-processor transfer operation.

AUTOMATIC SCANNING OF THE TERMINALS (FIGS. 1 AND 2)

It will be recalled that whenever memory control 32 generated a SADV pulse it stepped scanner 24 to the next terminal, i.e., caused it to generate a new combination of SCAN-M signals which selected the next row, i.e., storage register in the memory 28. A read-write cycle involving the control characters of the new row was performed and the control characters were interrogated for an indication of transfer operation activity. If no activity was detected another SADV pulse was generated to advance scanner 24 to the next terminal. If activity was detected, the transfer operation was performed and after being completed, memory control 32 generated a SADV pulse. There will now be described how the SADV pulse is generated for each of these possible conditions.

The generation of the very first SADV pulse at the start of operations is performed by the momentary closing of switch SW2 in memory control 32. Thereafter, if no activity is detected at any terminal the PTCB, SBTP, STTB and SBTT signals will be absent during the occurrence of the CAZZ signal, while the RCY' signal is present and an SADV pulse will be generated. The time indicated by the presence of the CAZZ signal is the time of read-write cycle of the control bits. The presence of the RCY' signal insures that the second read-write cycle of the control bits during a buffer-to-input-output transfer operation is not considered. The absence of the PTCB signal indicates that the characteristic processor-to-buffer transfer operation signal PTCB is not being generated. Therefore, no processor-to-buffer transfer operation is being called for. It will be recalled that the SBTP signal initiates a buffer-to-processor transfer operation. Therefore, if this signal is not generated no such operation is called for. Similarly, the SBTT signal was generated during CAZZ signal time to initiate the buffer-to-input-output transfer operation. Therefore, if no such operation is called for, the SBTT signal is not generated. Likewise, the STTB signal was generated to initiate the buffer-to-input-output transfer operation. Therefore, if this signal is not generated or present, no such transfer operation is to be performed. If any one of these signals is present a transfer operation is to be performed and the SADV pulse is not generated at this time. However, it will be generated at the end of the transfer operation in the following manner: if a processor-to-buffer transfer operation is called for, it will be recalled that the PTCB signal is present and will terminate at the end of the operation; the termination of the PTCB signal triggers a monostable multivibrator which causes the generation of the SADV pulse; if a buffer-to-processor transfer operation is called for it will be recalled that the CBTP signal is present and terminates at the end of the operation. The termination of the CBTP signal also triggers the monostable multivibrator to cause the generation of the SADV pulse. It will be recalled that the input-output-to-buffer transfer operation is terminated by a RTCB signal, this signal is used to cause the generation of the SADV pulse; and, finally, the coincidence of the RCY and CAZB signals which it will be recalled only occurs at the end of the buffer-to-input-output transfer is used to cause the generation of the SADV pulse.

DETAILED DESCRIPTION OF THE BLOCKS

Each of the blocks of FIGS. 1 and 2 will now be described in detail. However, before starting the description, it is worthwhile to summarize some general logical concepts used throughout the blocks. Signals and pulses swing between two voltages, i.e., ground and a negative voltage. Ground is equivalent to binary 0 and the negative voltage to binary 1. A signal or a pulse is present when it is at the negative voltage; a signal or a pulse is absent when it is at ground potential. The basic logical elements are the gates, AND gates, "mixer" gates and OR gates, amplifiers, either inverting, non-inverting or both, and flip-flops. Both the AND gates and the mixer gates perform an AND function or logical conjunction, i.e., they transmit a negative voltage (binary 1) from their output, if, and only if, all of its inputs each receive a negative voltage (are at binary 1). OR gates perform an OR function (logical disjunction), i.e., they have a negative voltage (binary 1) at their outputs if at least one of their inputs is at a negative voltage (binary 1). It should be noted that the AND and mixer gates can perform inverse OR functions, i.e., they will have a ground potential (binary 0) at their output if at least one of the inputs is at ground potential (binary 0). Similarly, the OR gates can perform inverse AND functions, i.e., they will have a ground potential (binary 0) at their output if, and only if, all of their inputs are at ground potential (binary 0).

The flip-flops each having a "1" and a "0" output and set, reset and allow set input terminals; a flip-flop can be set when ground potential is present at the allow set input terminal and the voltage at the set terminal shifts from the negative voltage to ground.

A flip-flop can be unset when the voltage at the reset terminal shifts from a negative voltage to ground. When a flip-flop is set, the "1" output is at the negative voltage and the "0" output is at ground potential. When a flip-flop is unset the signals at the "1" and "0" output terminals are the opposite of when the counter is set.

Each of the flip-flops has an internal connection to an operating voltage which permits an initial clear at the start of operations. Some of the flip-flops may be provided with a clear input terminal which will set the flip-flop to zero when a negative signal is received at the clear input terminal. Such flip-flops are also called counters.

The amplifiers have an input and inverting and/or non-inverting outputs. A non-inverting output is called for convenience the positive output of the amplifier because it transmits a replica of the signal or pulse present at its input. An inverting output is called a negative output because it performs a logical negation, i.e., it transmits an inverted replica of the signal or pulse present at its input.

Several other elements are employed to produce delayed pulses of varying time duration. These elements are denoted either as blocking oscillators or delay-flops. Either device will transmit a negative going pulse whenever its input switches to binary 1, i.e., the voltage on its input terminal switches from ground to the negative voltage.

INPUT-OUTPUT MODE CONTROL 20 (FIG. 3)

The input-output mode control 20 includes: a one character buffer storage for characters received from the processor P; a decoder for decoding the end of word character received from the processor P; means for generating an acknowledge signal whenever a character is accepted by the one character buffer storage; means for generating the PTCB signal indicative of the processor-to-buffer transfer operation; means for generating the CBTP signal which is characteristic of a buffer-to-processor transfer operation; and means for generating the BIRQ signal which is used to indicate to the processor P that the communications buffer CB has at least one word to transfer to the processor P.

The one character buffer storage includes the seven one-bit storage units SUA to SUG which respectively receive the DFPA to DFPG signals via the interface 34 from the processor P and generate respectively the ORAA to ORAG signals. Since each of the bit storage units is identical, only bit storage unit SUA will be described in detail. Bit storage unit SUA centers around flip-flop 1H22A having: its set terminal connected to the negative or inverting output of amplifier 1E18F; its allow set terminal connected to the negative output of amplifier 1J20D and its reset (unsetting) terminal connected to the output of AND gate 1H23A. AND gate 1H23A has one input connected to the "positive" (non-inverting) output of amplifier 1E18F and another input connected to the negative output of amplifier 1J20D whose input is connected to the DFPA signal line. The amplifier 1H18F is the strobe amplifier which when, as hereinafter described, it receives an interrogation pulse transmits a strobe pulse to each of the bit storage units SUA to SUG.

In particular, when the strobe pulse is received by bit storage unit SUA, four situations are possible: flip-flop 1H22A is set and no bit is being transferred to bit storage unit SUA; flip-flop 1H22A is not set and no bit is being transferred; the flip-flop is not set and a bit is being transferred; and the flip-flop is set and a bit is being transferred. For the first situation, no signal is present on the DFPA line; accordingly, the negative output of amplifier 1J20D is at binary 1 and gates the strobe pulse via AND gate 1H23A to the reset terminal unsetting flip-flop 1H22A. For the second situation, the action is the same as the first situation but since the flip-flop is unset the pulse received at the reset terminal is merely superfluous. For the third situation, since the DFPA signal is present, the negative output of amplifier 1J20D is at ground, alerting the allow terminal of flip-flop 1H22A so that when the strobe pulse is received at the set terminal flip-flop 1H22A sets and generates the ORAA and ORAA' signals. It should be noted that the binary zero at the negative output of amplifier 1J20D also blocks AND gate 1H23A to prevent a pulse from reaching the reset terminal of flip-flop 1H22A so that it cannot be unset. The fourth situation is similar to the third but since the counter is set, the pulse received at the set terminal is merely superfluous. The remainder of the one-bit storage units SUB to SUG operate in a similar manner.

The strobe amplifier 1E18F has its input connected to the output of OR gate 1Z6A which has one input connected to the COMS signal line to permit the initial strobing of the character representing the address of the storage register which is to receive a word from the processor P, and another input from the output of AND gate 1C6A which generates the usual interrogating pulses INT. Generally, an interrogating pulse INT is generated during each read-write cycle of the memory 28 (IHC pulse), except control character time (CAZZ' signal) when a processor-to-buffer transfer operation is in progress (PTCB signal) provided the end of word character has not been detected (ECFP' signal).

The logical operation of AND gate 1C6A can be defined by the Boolean equation:

$$(1)\qquad IHC\cdot PTCB\cdot CAZZ'\cdot ECFP'=INT$$

where the "·" implies logical conjunction.

The logical operation of OR gate 1Z6A can be defined by the Boolean equation:

$$(2)\qquad COMS+INT=ST$$

where the "+" implies logical disjunction.

Now Equation 2 can be rewritten $$(3)\qquad COMS+[IHC\cdot PTCB\cdot CAZZ'\cdot ECFP']=ST$$

Equation 3 thus simply expresses the logical element comprising OR gate 1Z6A and AND gate 1C6A.

Since Boolean equations can concisely define the required logical operations and since the equations are readily translatable to combinations of AND gates and OR gates, quite often throughout the specification, only a block called a logical element will be shown and will be described in terms of its Boolean equation. For example, logical element LE1 is a decoder which is used to decode the two types of end of word characters received from the processor P. The logical element LE1 can be described by the following Boolean equations:

$$ORAG'\cdot ORAF'\cdot ORAE\cdot ORAD\cdot ORAC\cdot ORAB'\cdot ORAA'=FIG\ S$$

$$ORAG'\cdot ORAF'\cdot ORAE\cdot ORAD'\cdot ORAC'\cdot ORAB'\cdot ORAA'=CENTS(¢)$$

It is apparent that each of the equations can be mechanized by an AND gate having inputs coupled to the appropriate ORAA to ORAG signal lines as indicated by the left hand sides of the equations.

The FIG S and CENTS signals are fed via OR gate 1J25B to amplifier 1E2H to become the ECFP and ECNR signals indicating that an end of word character has been received from the processor P.

It should be noted that the ST pulse which is received by amplifier 1E18F not only generates a strobe pulse but is also used to generate an acknowledge pulse that is fed back to the processor P to indicate the character has been accepted so that a new character may be transferred. Accordingly, the output of amplifier 1E18F is fed to one input of AND gate 1L6C whose other input receives the PTCB signal so that during processor-to-buffer transfer operations the strobe pulse is fed via amplifier 1J20F to blocking oscillator 1H10F which generates an ACKD pulse for each received strobe pulse.

The generation of the PTCB signal is accomplished by the flip-flops 1H7B and 1H4A and their associated circuits. Whenever there is a coincidence of the CHSL, CHOM and RYTB signals from processor P via interface 34 indicating the processor P is ready to transfer a word, AND gate 1J26C passes a signal which triggers blocking oscillator 1F26C which generates the COMS pulse. It should be noted that the COMS pulse is fed to OR gate 1Z6A to generate the first strobe pulse whereby the address of the storage register which is to receive the word is gated into the storage units SUA to SUG. The trailing edge of the COMS pulse sets flip-flop 1H7B. It should be recalled that the ORAA to ORAG signals now representing the address of the desired storage register are fed to scanner 24 where they are compared with the addresses of the presently available storage register and when a coincidence is reached, scanner 24 returns a COMP signal to one input of AND gate 1H15F. Since the other input of the AND gate is already at binary 1, the gate presents binary 1 to the input of amplifier 1H6A which transmits a ground potential to the allow input of flip-flop 1H4A. Accordingly, when the next DSAD pulse is received from memory 28 by the set input, flip-flop 1H4A is set and starts generating the PTCB signal. At the same time, the PTCB' signal line which is connected to the reset input of flip-flop 1H7B, goes from a negative voltage to ground. Therefore this flip-flop is unset. Flip-flop 1H4A will remain set until an NEOT pulse is received by amplifier 1H2D from memory control 32, which converts it to an EOPT pulse that is fed to the reset input of flip-flop 1H4A.

During the scanning of the control characters of each storage register, it will be recalled, a test is made for the presence of control bit 3 indicating the storage register under scan contains a word which is to be transferred to processor P. The presence of this control bit is manifested by the generation of the BMSG signal. The coincidence of the BMSG signal, the CAZZ signal (control character time) and the DLYA pluse from memory 28 at AND gate 2H21E causes amplifier 2E24D to generate an SRMI pulse that sets flip-flop 1F2A which generates the MSGI and BIRQ signals that are used to indicate to the processor P that it should send a command to initiate a buffer-to-processor transfer operation. The processor P sometimes thereafter transmits via interface 34 the CHIM, CHSL and RYTB signals which when received at AND gate 1J26D triggers the blocking oscillator 1H10D that generates a CIMS pulse. The CIMS pulse sets flip-flop 1J21A and alerts AND gate 1J23F so that the next occurring DSAD pulse from memory 28 passes through the gate to set flip-flop 72A which starts generating the ENT signal. The next time the SRMI pulse is generated, it cooperates with the ENT signal at AND gate 1F7H to unset flip-flop 1F2A terminating the MSGI and BIRQ signals. It should be noted that the ENT signal now present at the allow input terminal of flip-flop 1F2A prevents an ambiguous setting to occur. The SRMI pulse and ENT signal at AND gate 1H11J cooperate to transmit a pulse which sets flip-flop 1H4B that starts generating the CBTP signal and unsets flip-flop 1J21A which in turn unsets flip-flop 72A terminating the ENT signal.

ODD-EVEN CHARACTER SELECTOR 22 (FIG. 4)

The odd-even character selector comprises seven identical memory output units MOU1 to MOU7 each handling one bit of a character. They only differ with respect to the bit positions of the characters received from memory 28 via the DRF1 to DRF14 signal lines. Accordingly, only the memory unit MOU1 will be described in detail.

It will be recalled that memory 28 simultaneously reads out two characters but only one is to be transferred. The least significant bit of the odd character is on the DRF1 signal line that is fed to one input of mixer gate 2H12A; the least significant bit of the even character is on the DRF8 signal line which is fed to one input of mixer gate 2H12B. If the odd character is to be transferred the CCA' signal from character addresser 26 is present at the other input of mixer gate 2H12A; and if the even character is to be transferred the CCA signal is present at the other input of mixer gate 2H12B. Since the presence of the CAA and CAA' signals are mutually exclusive, either the bit on the DRF1 or DRF8 signal lines is transferred to amplifier 2H10A to become the SBOA and SBOA' signals that are fed to the output units 40–M. In addition, the SGOA signal is fed to one input of mixer gate 1J6A whose other inputs receive the CBTP and ZOT' signals so that the bit passes to amplifier 7J3A to become the BTPA' signal during the transfer of information characters during a buffer-to-processor transfer operation. The positive output of amplifier 7J3A is gated by the CHSL signal at mixer gate 1J4A to become the BTPA signal transmitted by amplifier 1J3A via the interface 34 to the processor P.

SCANNER 24 (FIG. 5)

Figure 5:
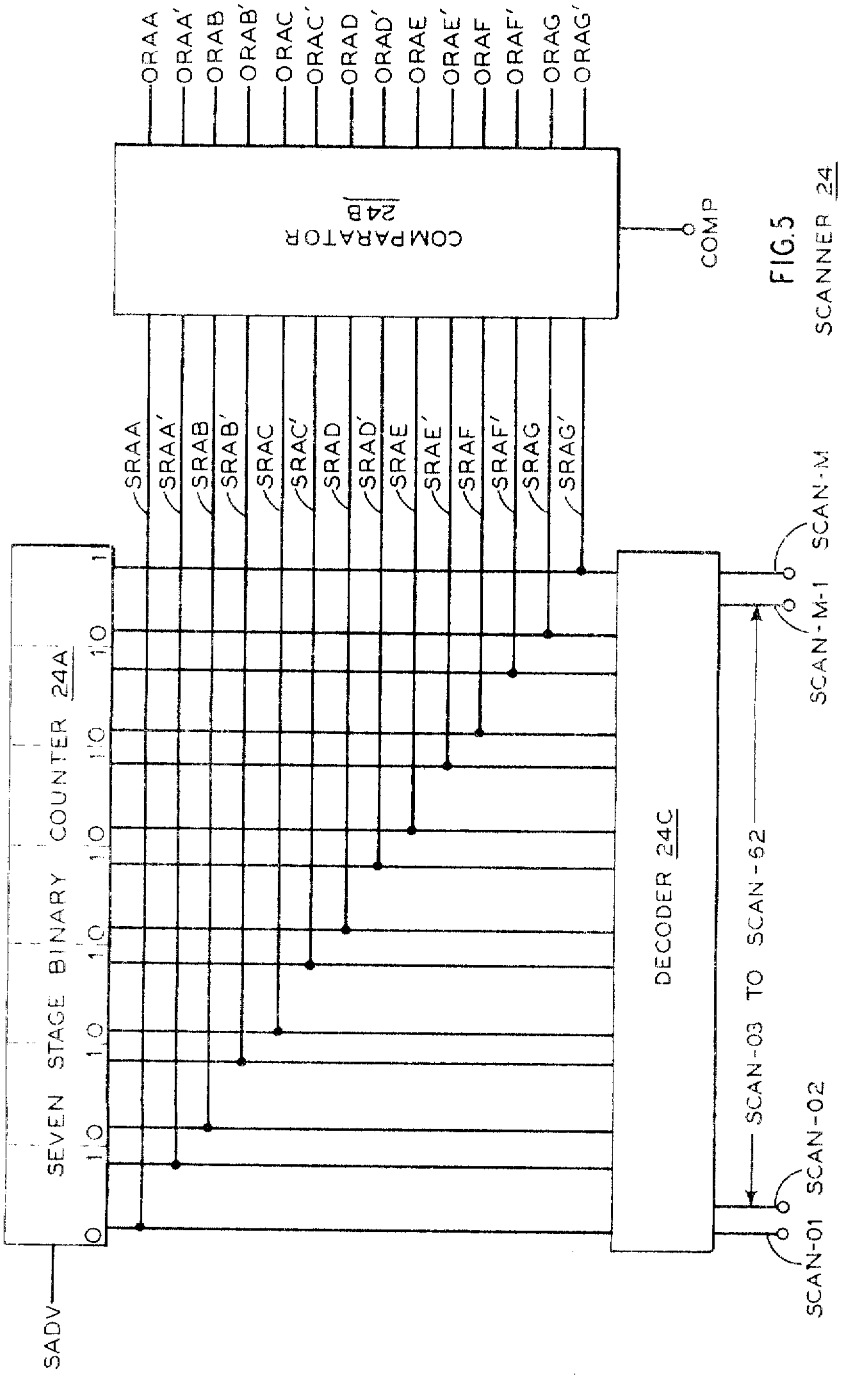
FIG. 5 shows logically the scanner 24.
Figure 6:
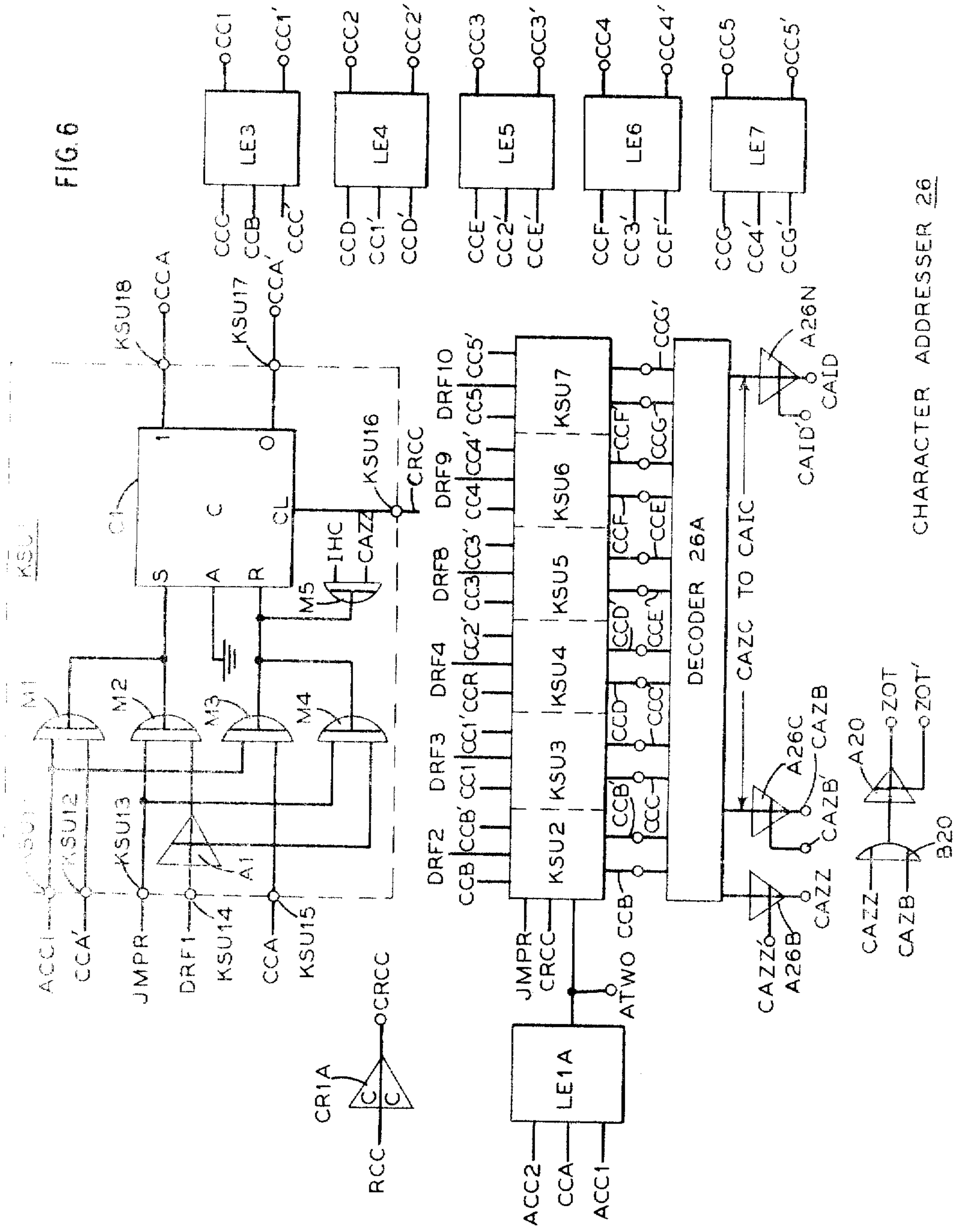
FIG. 6 shows logically the character addresser 26.

The scanner 24 shown in FIG. 5 includes a seven-stage binary counter 24A which counts SADV pulses received from memory control 32. The details of the counter are hereinafter more fully described in the Appendix. The 0 and 1 outputs of each stage of the counter genreate the SRAA, SRAA′, . . . , SRAG, and SRAG′ signals. Each different coded combination of these signals represents a different input-output unit and its associated storage register. Decoder 24C which is described in detail in the Appendix receives the SRAA to SRAG′ signals and decodes the coded combinations into distinctive SCAN–01 to SCAN–M signals that are fed to memory 28 to select the row associated with the storage register whose input-output device is under scan and to the input units 36–M and output units 40–M respectively.

The SRAA to SRAG′ signals are also fed to one series of inputs or comparator 24B whose other series of inputs receives the ORAA to ORAG′ signals from Input-Output Mode Control 20. During a processor-to-buffer transfer operation, when the coded combination of SRAA to SRAG′ signals representing the storage register under scan equals the coded combination of ORAA to ORAG′ signals representing the storage register into which the processor P wants to enter a word, the COMP signal is generated and fed to input-output mode control 20.

CHARACTER ADDRESSER 26 (FIG. 6)

The character addresser 26 centers around seven character-bit storage units KSU1 to KSU7 which are cascaded to count in binary-coded decimal notation. The count can occur by counting by ones represented by the ACC1 pulses or by counting by twos represented by the ACC2 pulses from memory control 32. The units can be initially cleared to 00 and the sequential counting then performed or the units can be preset to a particular count.

The coded combinations of the outputs of the character-bit storage units KSU2 to KSU7 are fed to decoder 26A (see appendix) to generate the CAZZ to CAID′ signals that are used in memory 28 to select the columns associated with the pairs of character cells being handled. The character-bit storage unit KSU1 is used to indicate that the odd or the even character cell of the pair is the one desired.

Since the first and second pair of characters cells in each storage register are always treated in pairs (control bits and address characters) the ZOT signal is generated by amplifier A20 in response to the receipt of the CAZZ signal (associated with the control character pair of character cells) or the CAZB signal (associated with the address characters cells) by OR gate B20.

Since the character-bit storage units KSU1 to KSU7 are logically identical except for the input and output signals only the unit KSU1 will be described in detail. The unit centers around counter C1 which operates as a presettable binary counter that counts ACC1 pulses. If counter C1 is unset the CCA′ signal is generated by its 0 output terminal. The CCA′ signal passes the ACC1 pulse through mixer gate M1 to the set input of counter C1. If counter C1 is set however, the CCA signal is generated by its 1 output terminal and gates the ACC1 pulse through mixer gate M3 to the reset input of counter C1. In this manner, character bit-storage unit KSU1 counts ACC1 pulses. It should be noted that the terminal KSU11 is the counting input.

The presetting of unit KSU1 is accomplished by mixer gates M2 and M4. When the counter is to be preset a JMPR pulse is present at one input of each of these mixer gates. If counter C1 is to be preset to 1 then the DRF1 signal is present at the preset input KSU14 and passes via the positive output terminal of amplifier A1 to permit the passage of the JMPR pulse through mixer gate M2 to the set terminal of counter C1. If the counter C1 is to be unset then the DRF1 signal is not preesnt and the negative or not inverting output of amplifier A1 permits the JMPR pulse to pass through mixer gate M4 to the reset terminal of counter C1. When the counter C1 is set the CCA signal is present at the output KSU18. When the counter C1 is unset the CCA′ signal is present at the output KSU17. It should be noted that before any operation of the character addresser 26, the CRCC pulse which is received at the initial clear input KSU16, initially clears the counter C1.

The inputs to the remaining character bit-storage units KSU1 to KSU7 will now be summarized. Terminals KSU13, KSU23, KSU33, KSU43, KSU53, KSU63, KSU73 of the units KSU1 to KSU7 inclusive all receive the JMPR pulse. Terminals KSU16, KSU26, KSU36, KSU46, KSU56, KSU66 and KSU76 of the units KSU1 to KSU7 inclusive all receive the CRCC pulse from counter reset CR1A. The terminal KSU11 of unit KSU1 receives the ACC1 signal while the corresponding terminals KSU21, KSU31, . . ., KSU71 of the units KSU2, KSU3, . . ., KSU7 received the ATWO signal from logical element LE1A. The terminals KSU14, KSU24, . . ., KSU74 of the units KSU1, KSU2, . . ., KSU7 receive respectively the DRF1, DRF2, DRF3, DRF4, DRF8, DRF9 and DRF10 signals. The terminals KSU12, KSU22, . . ., KSU72 of units KSU1, KSU2, . . ., KSU7 respectively receive the CCA′, CCB′, CC1′, CC2′, CC3′, CC4′ and CC5′ signals; and the terminals KSU15, KSU25, . . ., KSU75 received respectively the CCA, CCB, CC1, CC2, CC3, CC4 and CC5 signals. The terminals KSU17 and KSU18, KSU27 and KSU28, . . ., KSU77 and KSU78 or units KSU1, KSU2, . . ., KSU7 respectively transmit the CCA and CCA′, CCB and CCB′, . . ., CCG and CCG′ signals.

The CCB and CCB′, CCC and CCC′, . . ., CCG and CCG′ are fed to the input of decoder 26A where the different coded combinations are decoded into the CAZZ′, CAZB′, CAZD, . . ., CAZH, CAAZ, CAAB, CAAD, . . ., CAAH, CABZ, CABB, CABD, . . ., CABH, CACZ, CACB, . . ., CACH, CADZ, . . ., CADH, CAEZ, . . ., CAEH, CAFZ, . . ., CAFH, CAGZ, . . ., CAGH, CAHZ, . . ., CAHH, CAIZ, CAIB and CAID signals and their inverses which are used for column selection in memory 28.

The logical element LE1A performs the following Boolean operation:

$$(ACC2)+(CCA \cdot ACC1)=ATWO$$

The logical element LE3 performs the following Boolean operations:

$$CCC \cdot CCB=CC1'; \; CCB \cdot CCC'=CC1$$

The logical element LE4 performs the following Boolean operations:

$$CC1' \cdot CCD=CC2'; \; CC1' \cdot CCD'=CC2$$

The logical element LE5 performs the following Boolean operations:

$$CC2' \cdot CCE=CC3'; \; CC2 \cdot CCE'=CC3$$

The logical element LE6 performs the following Boolean operations:

$$CC3' \cdot CCF=CC4'; \; CC3' \cdot CCF'=CC4$$

The logical element LE7 performs the following Boolean operations:

$$CC4' \cdot CCG=CC5'; \; CC4' \cdot CCG'=CC5$$

Amplifier A20 generates the ZOT signal whenever either the CAZZ or CAZB signals are received from decoder 26A to indicate the character addresser 26 is selecting one of the first four character-storage locations of a storage register.

MEMORY 28 (FIG. 7)

Figure 7:
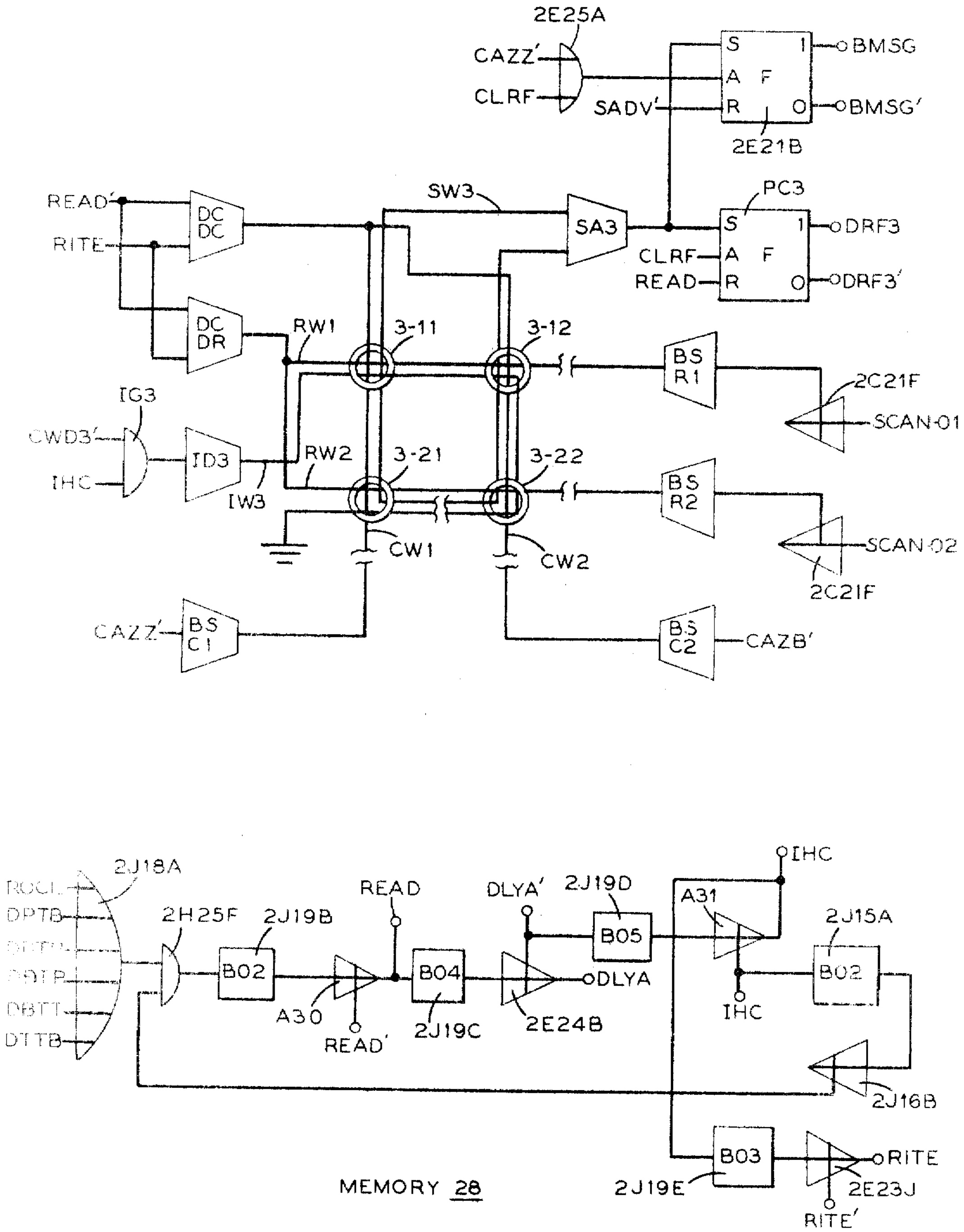
FIG. 7 is the logical diagram for the memory 28.
Figure 8A:
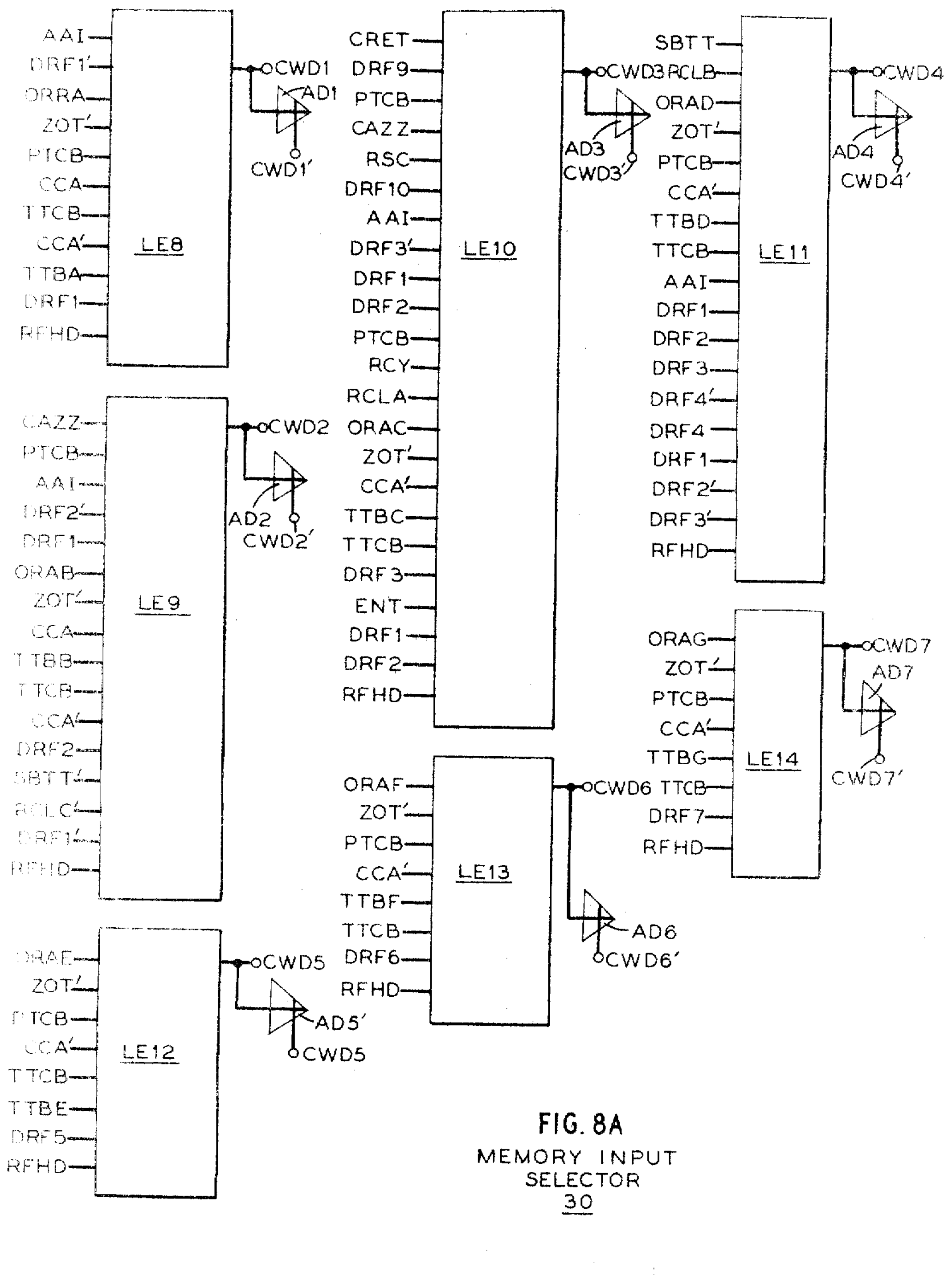
FIGS. 8A and 8B show the logical diagram of the memory input selector 30.
Figure 8B:
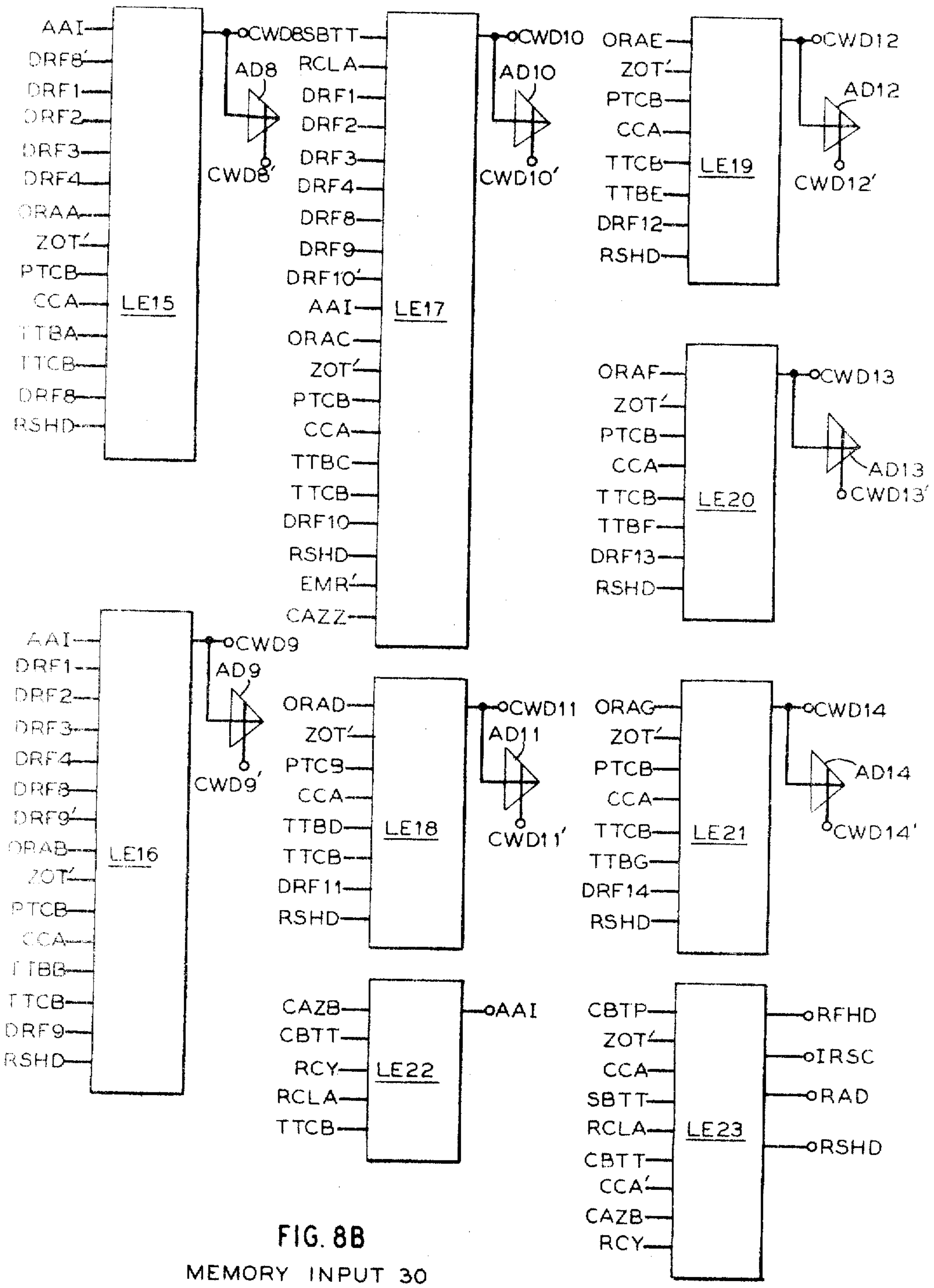

FIGURE 7 shows the memory comprising the circuitry for generating the sequence of pulses associated with a read-write cycle, and also a portion of the magnetic core matrix with its associated circuitry.

The read-write cycle pulse generator includes the pulse recirculation circuitry shown on the bottom of the figure.

At the start of the first read-write cycle of any series, a pulse is received from memory control 32 via the ROCL signal line and passes through OR gate 2J18A and AND gate 2H25F to trigger blocking oscillator 2J19B which generates a two microsecond pulse that is amplified and phase split by amplifier A30 to become the READ and READ′ pulses. The leading edge of the READ pulse triggers the blocking oscillator 2J19C which transmits a four microsecond pulse that is amplified and phase split by amplifier 2E24B to become the DLYA and DLYA′ pulses. The trailing edge of the DLYA′ pulse triggers blocking oscillator 2J19D which transmits a five microsecond pulse that is amplified and phase split by amplifier A31. The leading edge of the IHC pulse triggers blocking oscillator 2J19E which transmits a three microsecond pulse that is amplified and phase split by amplifier 2E23J to become the RITE and RITE′ pulses. The trailing edge of the IHC′ pulse triggers blocking oscillator 2J15A which transmits a two microsecond feedback pulse to amplifier 2J16B for inversion. The inverted feedback pulse is fed to the lower input of AND gate 2H25F. Only if a signal is present at the output of OR gate 2J18A, will the trailing edge of inverted feedback pulse trigger blocking oscillator 2J19B to start another read-write cycle. Thus, the number of read-write cycles is dependent on the presence of the DPTB, DDTP, DBTP, DBTT and DTTB signals which are selectively fed to inputs of OR gate 2J18A from memory control 32 in accordance with the type of transfer operation to be performed.

The upper portion of the FIGURE 7 shows four typical magnetic cores in one plane of the magnetic core matrix and their associated circuitry. The magnetic cores may be toroids having a "square" hysteresis loop. The magnetic core matrix may comprise by way of example, 14 planes of magnetic cores wherein each plane has a plurality of columns and rows of magnetic cores. However, the operation of the matrix can simply be described with respect to the four shown magnetic cores.

The magnetic cores 3–11, 3–12, 3–21, and 3–22 are typical cores in the third plane of the matrix. The cores 3–11 and 3–21 are the first two cores in the first column; the remaining cores of the first column are not shown. The cores 3–12 and 3–22 are the first two cores in the second column whose remaining cores are not shown. Alternatively, the cores 3–11 and 3–12 are the first two cores in the first row, the remaining cores of the row not being shown; and the cores 3–21 and 3–22 are the first two cores of the row, the remaining cores of said row are not being shown. Cores 3–11, 3–12, . . . , 3–1*n* . . . of the first row are threaded by row winding RW1. Cores 3–21, 3–22, . . . , 3–2*n*, . . . , of the second row are threaded by row winding RW2. Similarly, generalized row winding RWN threads the Nth row. Likewise column winding CW1 threads all the cores in the first column, i.e., cores 3–11, 3–21, . . . , 3–*m*1, . . . ; and column winding CW2 threads all the cores in the second column, i.e., cores 3–12, 3–22, . . . , 3–*m*2, . . . . Similarly, generalized column winding CWM threads all the cores in the Mth column. One end of each of the row and column windings is connected to the output of a bi-lateral switch. For example, row windings RW1, RW2 and RWN are connected respectively to the outputs of bi-lateral switches BSR1, BSR2 and BSRN, and column windings CW1, CW2 and CWM are connected respectively to the outputs of bilateral switches BSC1, BSC2, and BSCM. The other ends of the row and column windings are connected to a read-write amplifier means, i.e., the other ends of the column windings being connected to the ouput of core driver DCDC, and the other ends of the row windings being connected to core driver DCDR. A sense winding SW3 threads all the cores in the plane and is connected to the input of sense amplifier SA3 whose ouput is connected to the input of a temporary storage flip-flop PC3. An inhibit winding IW3 also threads all the cores in the plane and has one end grounded and the other end connected to the output of inhibit driver ID3 whose input is connected to AND gate IG3 which particularly receives the CWD3′ signal.

The remaining planes are similarly constructed. Each has its own sense windings, SWK, associated sense amplifier SAK and temporary storage flip-flop PCK, and inhibit winding IWK and associated inhibit driver IDK driven by an AND gate IGK which particularly receives an CWDK′ signal. The row windings RWN of each plane are connected in parallel between the output of bi-lateral switches BSRN and the output of core driver DCDR; and the column windings CWM are connected in parallel between the outputs of bi-lateral switches BSCM and the output of core driver DCDC, When a character address is to be accessed, the appropriate column and row bilateral switches are energized. For example, assume that the control characters cells of the storage register associated with the first input-output device are to be accessed The CAZZ′ signal is fed to the input of bilateral switch BSC1 and the SCAN–01 signal is fed via inverting amplifier 2C21F to the input of bilateral switch BSR1. These energized bilateral switches permit current to flow in either direction in column winding CW1 and row winding RW1 respectively. When the READ′ pulse is received at the inputs of core drivers DCDC and DCDR current will flow, say, into the outputs of these drivers. The only current path is that established by virtue of the energization of bilateral switches BSC1 and BSR1. Accordingly, current only flows in winding RW1 and CW1 and any magnetic core in the group K–11 will be driven to, say, clockwise magnetization. If a "1" bit had been stored in a core it would have a counterclockwise magnetization, whereas the storage of a "0" bit is represented by a clockwise rotation. Accordingly, when the coincidence of currents in the intersecting row and column windings drive the core K–11 in each plane which is at the intersection to the clockwise magnetization, only those cores which were storing a "1" bit will switch from counterclockwise to clockwise magnetization. The transition of magnetization is manifested by a pulse on the associated sense winding SWK and fed via sense amplifier SAK to set counter PCK which starts generating the DRFK signal. Additionally, for plane 3, if a "1" bit is stored in core 3–11 then during the read portion of the read-write cycle, sense amplifier SA3 will also set the flip-flop 2E22B which starts generating the BMSG.

The read portion of the cycle is always followed by a write portion characterized by the RITE signal that is also fed to inputs of core drivers DCDC and DCDR which drive current from their outputs. The cores at the intersection of the selected row and column, for the example under consideration, the cores K–11, will be driven to a state of counterclockwise rotation if nothing further is simultaneously occurring. In other words, there is an attempt to store "1" bits in each of the selected cores. To record "0" bits it is necessary to keep the state of magnetization in the cores clockwise. Accordingly, in any plane where a "0" bit is to stored, the associated inhibit driver IDK is energized and transmits a current into the associated inhibit winding IWK which negates the effect of the current in the windings RWR and CWK. For example, if a "0" bit is to be recorded in core 3–11 at this time the CWD3′ signal will be present at AND gate IG3 and will pass an IHC pulse to the input of inhibit driver ID3 which will override only the effect of the RITE pulse fed to the core drivers DCDC and DCDR on the core 3–11.

MEMORY INPUT SELECTOR 30 (FIG. 8)

The memory input selector 30 comprises primarily fourteen switching units divided into two pluralities of seven each. One plurality is associated with the first group of planes in the memory 28 and comprises logical elements LE8 to LE14 inclusive, and the second plurality is associated with the second group of planes in the memory 28 and comprises logical elements LE15 to LE21 inclusive. Each of the switching units comprises a recirculation gating means, a processor output output gating means and input-output gating means, and most of the switching units include a unit-add gating means. The outputs of these gating means are coupled together in an OR function to provide the output of the switching unit. Each gating means has at least one information bit signal input and several control signal inputs.

The typical switching unit comprising logical element LE8 will now be described in detail. The output is the CWD1 CWD1' signal terminals. The recirculation gating means includes a logical unit which satisfies the following Boolean equation: $DRF1 \cdot RFHD$, where the RFHD signal is a control signal which is generated by a logical element LE23 and controls the gating of the DRF1 bit signal from a sense amplifier to the output.

The processor output gating means is a logical unit satisfying the following Boolean equations:

$$ORAA \cdot WDCW \text{ where } WDCW = ZOT' \cdot PTCB \cdot CCA'$$

It should be noted for the description of succeeding switching units that the processor output gating means is characterized by the WDCW signal. The PTCB signal it will be recalled is characteristic of a processor-to-buffer transfer and is the processor output control signal. The CCA' signal is the odd-even control signal.

The input-output output gating means is a logical element which satisfies the following Boolean equations:

$$TTBA \cdot WDCY \text{ where } WDCY = ZOT' \cdot TTCB \cdot CCA'$$

It should be noted for the description of succeeding switching units that the input-output gating means is characterized by the WDCY signal. The TTCB signal is the input-output control signal and the CCA' signal is the odd-even control signal. The TTBA signal is a bit signal.

The unit-add gating means satisfies the Boolean equation:

$$AAI \cdot DRF1$$

It should be noted that the unit-add gating means always has associated with it the unit-add control signal AAI. The DRF1 signal is the bit from the first plane sense amplifier of the memory 28. By virtue of the foregoing explanation the logical element LE8 which is a switching unit can be satisfied by combining the above equations into an OF function, i.e., $$CWD1 = [DRF1 \cdot RFHD] + [ORAA \cdot WDCW] + [TTBA \cdot WDCY] + [AAI \cdot DRF1]$$

where the first bracketed term represents the recirculation gating means, the second bracketed term the processor output gating means, the third bracketed term the input-output output gating means and the last bracketed term the unit-add gating means.

The second switching unit of the first group is logical element LE9 which satisfies the Boolean equation:

$$CWD2 = [DRF1 \cdot RFHD] + [ORAB \cdot WDCW] + [TTBB \cdot WDCY] + [AAI \cdot (DRF1' \cdot DRF2 + DRF1 \cdot DRF2')] + [CAZZ \cdot PTCB] + [CAZZ \cdot DRF2 \cdot SBTT']$$

It should be noted that the last two bracketed terms are concerned with modifying only the control bit 2 of the control characters.

The third switching unit of the first group is logical element LE10 which satisfies the Boolean equation:

$$CWD3 = [DRF3 \cdot RFHD] + [ORAC \cdot WDCW] + [TTBC \cdot WDCY] + [(AAI \cdot DRF1 \cdot DRF2 \cdot DRF3') + (AAI \cdot DRF3 \cdot \{DRF1' + DRF2'\})] [CAZB \cdot (PTCB + \{RCY \cdot RCLA\})] + [CRET \cdot PTCB' \cdot CAZZ \cdot RSC \cdot DRF10] + [DRF3 \cdot ENT' \cdot PTCB' \cdot CAZZ]$$

It should be noted that: the fifth bracketed term is concerned with presetting the address characters to an initial character address of four; and the sixth and seventh bracketed terms are concerned with the control bit 3 of the control characters. Logical element LE11 is the fourth switching unit of the first group and satisfies the following Boolean equation:

$$CWD4 = [DRF4 \cdot RFHD] + [ORAD \cdot WDCW] + [TTBD \cdot WDCY] + [AAI \cdot DRF1 \cdot DRF2 \cdot DRF3 \cdot DRF4') + (AAI \cdot DRF4 \cdot \{DRF1' + DRF2' + DRF3'\})] + [SBTT \cdot RCLB]$$

The logical element LE12 is the fifth switching unit of the first group and satisfies the Boolean equation:

$$CWD5 = [DRF5 \cdot RFHD] + [ORAE \cdot WDCW] + [TTBE \cdot WDCY]$$

The logical element LE13 is the sixth switching unit of the first group and satisfies the following Boolean equation:

$$CWD6 = [DRF6 \cdot RFHD] + [ORAF \cdot WDCW] + [TTBF \cdot WDCY]$$

The logical element LE14 is the last switching unit of the first group and satisfies the following Boolean equation:

$$CWD7 = [DRF7 \cdot RFHD] + [ORAG \cdot WDCW] + [TTBG \cdot WDCY]$$

The first switching unit of the second group is logical element LE15 which satisfies the Boolean equations:

$$CWD8 = [DRF8 \cdot RSHD] + [ORAA \cdot WDCX] + [TTBA \cdot WDCZ] + (AAI \cdot FTEN \cdot DRF8') + (AAI \cdot DRF8 \cdot FTEN)]$$

where the RSHD signal which controls recirculation is generated by logical element LE23 as is hereinafter more fully described, and $$WDCX = ZOT' \cdot PTCB \cdot CAA$$

$$WDCZ = ZOT' \cdot TTCB \cdot CAA$$

and $$FTEN = DRF1' + DRF2' + DRF3' + DRF4'$$

The second switching unit of the second group is logical element LE16 which is defined by the Boolean equation:

$$CWD9 = [DRF9 \cdot RSHD] + [ORAB \cdot WDCX] + [TTBB \cdot WDCZ] + (AAI \cdot DRF9 \cdot \{FTEN' + DRF8'\}) + (AAI \cdot DRF9' \cdot FTEN \cdot DRF8)]$$

The third switching unit of the second group is logical element LE17 which satisfies the Boolean equations:

$$CWD10 = [DRF10 \cdot RSHD] + [ORAC \cdot WDCX] + [TTBC \cdot WDCZ] + [(AAI \cdot FTEN \cdot DRF8 \cdot DRF9 \cdot DRF10') + (AAI \cdot DRF10 \cdot \{FTEN' + DRF8' + DRF9'\})] + [SBTT \cdot RCLA] + [DRF10 \cdot PTCB' \cdot CAZZ \cdot EMR']$$

where $$EMR' = CRET \cdot PTCB' \cdot CAZZ \cdot RSC \cdot DRF10$$

It should be noted that the fifth and sixth bracketed terms are only concerned with control bit 10 of the control characters.

The fourth switching unit of the second group is logical element LE18 which satisfies the following Boolean equation:

$$CWD11 = [DRF11 \cdot RSHD] + [ORAD \cdot WDCX] + TTBD \cdot WDCZ]$$

Logical element LE19 is the fifth switching unit of the second group and is defined by the following Boolean equation:

$$CWD12=[DRF12\cdot RSHD]+[ORAE\cdot WDCX]+[TTBE\cdot WDCZ]$$

Logical elements LE20 and LE21, the sixth and seventh switching units of the second group, are defined by the Boolean equations:

$$CWD13=[DRF13\cdot RSHD]+[ORAF\cdot WDCX]+[TTBF\cdot WDCZ]$$

$$CWD14=[DRF14\cdot RSHD]+[ORAG\cdot WDCX]+[TTBG\cdot WDCZ]$$

The remainder of the Memory Input Selector 30 includes other logical elements that are related to the switching units. In particular, the logical element LE22 generates the unit-add AAI control signal and is defined by the Boolean equation:

$$AAI=[CAZB\cdot CBTT\cdot RCY\cdot IFOL'\cdot RCLA']+[TTCB\cdot CAZB]$$

The logical element LE23 generates the RFHD and RSHD control signals that determine which character of a pair is recirculated. If the RFHD signal is generated the even character recirculates; if the RSHD signal is generated the odd character of the pair recirculates. If both signals are generated then both characters of the pair recirculate. In any event, logical element LE23 is defined by the following Boolean equations:

$$RAD=CAZB\cdot CBTT\cdot RCY'$$

$$IRSC=SBTT\cdot RCLA$$

$$RFHD=[ZOT'\cdot CCA]+[CBTP\cdot ZOT']+[RAD]+[ZOT'\cdot CBTT]$$

$$RSHD=[ZOT'\cdot CCA']+[CBTP\cdot ZOT']+[RAD]+[ZOT'\cdot CBTT]$$

It should be noted that the term CBTP·*ZOT'* and the term CBTT·ZOT' is in both the equation for the RFHD and RSHD recirculation control signals. Therefore, whenever information characters are being transferred from the buffer to the processor P as defined by *CBTP·ZOT'* condition and whenever information characters are being transferred from the buffer to an input-output unit as defined by the *CBTT·ZOT'* condition, there is a recirculation of a pair of characters.

INTERFACE 34 (FIG. 9)

Figure 9:
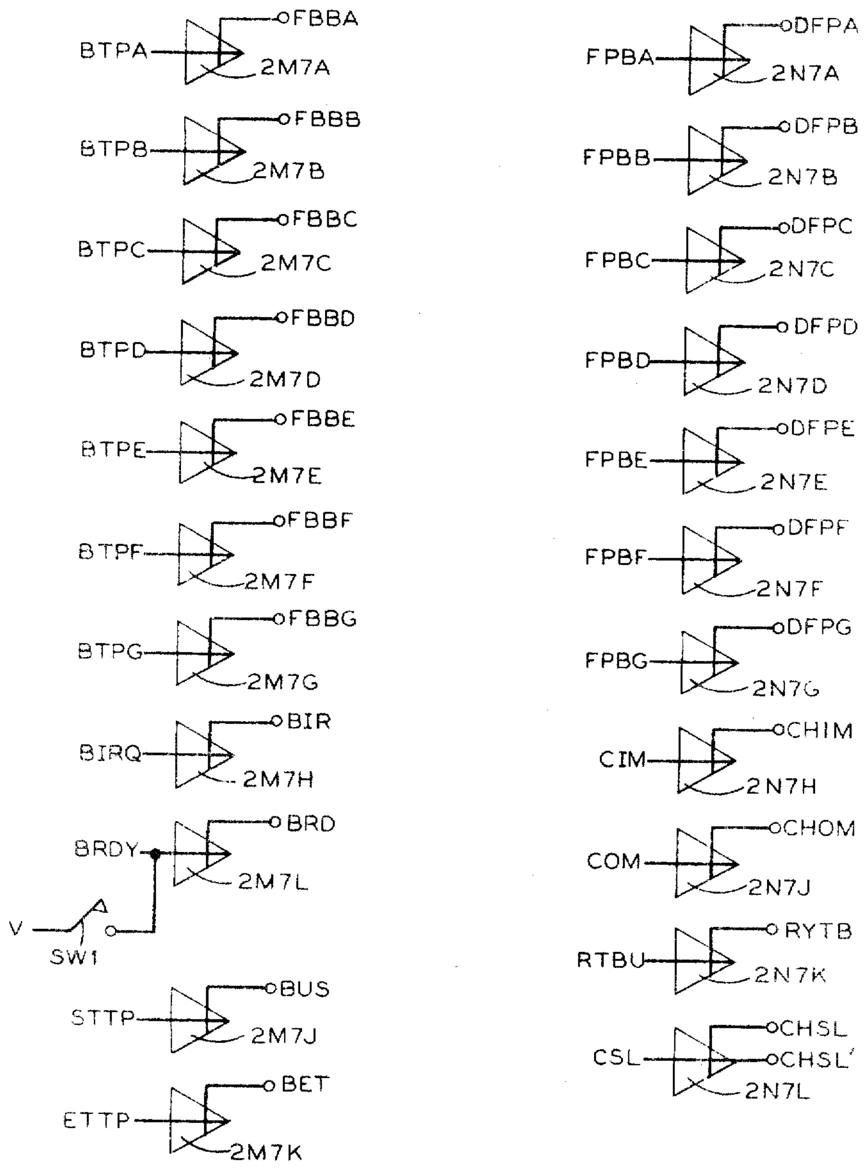
FIG. 9 shows the logical diagram of the interface 34.

The interface 34 includes two pluralities of amplifiers which provide phase inversion and level shifting for the signals passing between the communications buffer CB and the processor P. The left column of amplifiers in FIG. 9 inverts and level shifts signals transmitted by the communications buffer CB to the processor P. The right column of amplifiers inverts and level shifts signals transmitted by the processor P to the communications buffer CB.

It should be noted that the switch SW1 when closed generates the BRDY signal which indicates to the processor P that the communications buffer CB is ready to operate.

MEMORY CONTROL 32 (FIG. 10)

The first portion of the memory control 32 is concerned with the advancing of the scanner 24 and the generation of the pulse which initiates the first read-write cycle of the memory 28 when the control characters of the storage register under scan are interrogated to determine if a transfer operation is to be performed, and if so, what kind.

Initially, the switch SW2 is momentarily closed causing: the generation of the GCL signal which clears every flip-flop in the system to its unset condition; and the triggering of delay flop DF60 which 60 milliseconds later sets the flip-flop 2J20B which starts generating the CLRF signal that forces all information on read from the memory 28 to be zeros. The RESY' output of delay flop DF60 triggers blocking oscillator 2J15B which transmits a PRO pulse to OR gate 2J24A. The PRO signal after inversion by amplifier 2E24F sets flip-flop 2J22A. At the end of the RESY' pulse AND gate 2H25D triggers blocking oscillator 2H24D which transmits a pulse that unsets flip-flop 2J22A. The pulse is also amplified by amplifier 2M16B to become the SADV pulse which steps the scanner 24 to storage register 02. It should be noted that the initial clear set the scanner 24 to storage register 01. The SADV pulse is also fed via OR gate 2H16D and amplifier 2H18E to blocking oscillator 2H24A which generates the RCC pulse which is used to set the character addresser 26 to select the control character column of the memory 28. The SADV' pulse triggers blocking oscillator 2H24E which generates the DSAD pulse that passes via OR gate 1J24B and amplifier 2J23D to trigger blocking oscillator 2J19A which generates the ROCL pulse that is fed as an initiate-read-write cycle pulse to memory 28 causing the reading of the control characters from storage register 02. Since the CLRF signal is being generated, no transfers can take place. Accordingly, as is hereinafter described, an ASCT pulse is generated and passes through OR gate 2J24A and another scan advance or interrogation cycle is performed. This operation continues until the scanner 24 again reaches storage register 01 characterized by the SCAN-01 signal which cooperates with an IHC pulse from memory 28 to unset flip-flop 2J20B terminating the CLRF signal. In this manner, the control characters of all the storage registers are initially cleared.

Thereafter, the scan advances are automatically generated by virtue of an ASCP pulse or an ASCT pulse recived at OR gate 2J24A which causes the generation, as described above, of primarily the SADV, RCC and ROCL pulses. The ASCP pulse is generated at the end of any transfer operation involving the processor P. In particular, when the PTCB' signal becomes present at the end of a processor-to-buffer transfer operation it passes a transient through AND gate 2H25B to trigger blocking oscillator 2H25Z which generates a pulse whose trailing edge after inversion by amplifier 2H24B triggers blocking oscillator 2H24C which generates the ASCP pulse. At the end of a buffer-to-processor transfer operation, the occurrence of the CBTP' pulse at AND gate 2H25B causes the same chain of events. The ASCT pulse is generated in three cases: the first case is at the end of an input-output-to-buffer transfer operation; the second case is at the end of a buffer-to-input-output transfer operation; and the third case when the interrogation of the control characters indicate no transfer operation is to take place. The ASCT pulse is generated by blocking oscillator 2J15C in response to a trigger from amplifier 2J8D. The first case is detected by mixer gate 2J5B; the second case by mixer gate 2J5A and the third case by mixer gate 2J21F. More particularly, the third case occurs during the interrogation of control characters (at CAZZ time) when all the signals are present at inputs to the AND gate 2J10B. If any signal is absent, then the NACT signal is not generated and an IHC pulse is not passed through mixer gate 2J21F.

The second group of circuits in memory control 32 is concerned with the transfer operations. Each transfer operation generally has three signals associated with it; a start transfer operation signal; a control signal characteristic of the transfer operation; and a read-write cycle control signal. For example, the input-output-to-buffer transfer operation is started by the generation of the inverted STTB' signal generated by coincidence of the absence of the PTCB signal and the presence of the CAZZ′, RSC′ and DRF10′ signals at OR gate 2K6A. When this condition is present, an input-output-to-buffer transfer is called for. (The presence of the CAZZ′ and RSC′ signals indicate an interrogation of control characters, the DRF10′ signal indicates the control characters contain control bit 10 requiring an input-output-to-buffer transfer, and the absence of the PTCB signal indicates that the higher priority processor-to-buffer transfer operation is not called for.) The inverted STTB′ signal is fed to AND gate 2J10B where it blocks the generation of an ASCT pulse and prevents an automatic "no action" stepping of the scanner 24 as described above. The STTB′ signal is also fed to the allow-set terminals of flip-flops 2K7A and 2K10A which set when the usual DLYA pulse is received from the memory 28 during the read-write cycle associated with the control characters. Both of the flip-flops 2K7A and 2K10A set and generate respectively the TTCB and DTTB signals. The TTCB signal is the characteristic control signal of an input-output-to-buffer transfer operation and is fed throughout the system to alert various control circuits for this type of transfer operation. The DTTB signal is the read-write cycle control signal and is fed to memory 28 to continue the generation of read-write cycles. During the first information read-write cycle, the ZOT′ signal disappears causing the generation of the RTCB signal which gates an IHC pulse through AND gate 2K6B to unset flip-flop 2K7A terminating the TTCB signal, and gates a DLYA pulse through gate 2K6E, unsetting flip-flop 2K10C terminating the DTTB signal.

For a buffer-to-input-output transfer operation, the equivalent signals performing equivalent functions on the SBTT′, CBTT and DBTT signals generated respectively by the amplifier 2E24F and the flip-flops 2H23B and 2H23A. The signals are first generated by the coincidence of the presence of the CAZZ, RFC, DRF2 and the absence of the PTCB′ signals at mixer gate 2F14M. After one character has been transferred, the absence of the ZOT′ signal gates a DLYA pulse via mixer gate 2K16E to unset the flip-flop 2H23A. However, it will be recalled that on this type of transfer operation it may be necessary to update the control characters. Accordingly, the RCY and CAZZ signals at mixer gate 2F19A again cause the flip-flop 2H23A to set. After the control characters are again read and written the disappearance of the CAZZ signal at mixer gate 2H19E unsets flip-flop 2H23A. At the same time the RCY and the CAZB signals gate an IHC pulse through AND gate 2F20E to unset counter 2H23B ending this transfer operation. The generation of the RCY signal is described below.

During a buffer-to-processor transfer operation, the start signal is the SBTP′ signal generated by the coincidence of the absence of the BMSG′, ENT′ and CAZZ′ signals at OR gate B19. The SBTP′ signal is fed to AND gate 2J10B to prevent the automatic generation of the stepping pulse. The characteristic control signal CBTP is generated by the input-output mode control 20. When the CBTP signal is generated, the CBTP′ signal disappears causing the setting of flip-flop 2F18F which generates the DBTP signal that controls read-write cycles for the transfer. Flip-flop 2H23C is unset when an end character signal ECTP gates a DLYA pulse to the reset terminal of flip-flop 2F18F. The generation of the ECTP signal is hereinafter described.

At the start of a processor-to-buffer transfer operation, the PTCB characteristic control signal is generated as hereinabove described with respect to the input-output mode control 20. When this signal is generated, the PTCB′ signal disappears, blocking the AND gate 2J10B and also setting the flip-flop 2H22A which generates the DPTB signal that controls read-write cycles for this type of transfer operation. The flip-flop 2H22A is unset by the gating of a DLYA pulse by the end character signal ECFP from input-output mode control 20 at AND gate 2F18F to the reset terminal of flip-flop 2H22A.

The logical element LE24 is concerned with transferring address characters to the character addresser 26, and for causing the updating of the address count stored therein by one or by two. The transfer of address characters from memory 28 to character addresser 26 is under control of the JMPR signal which is generated by circuitry satisfying the following Boolean equation:

$$JMPR=[IHC \cdot TTCB \cdot CAZB]+[RCY' \cdot CBTT \cdot IHC \cdot CAZB]$$

The updating by one and by two are performed by the ACC1 and ACC2 signal respectively which are generated by circuits which respectively satisfy the following Boolean equations:

$$ACC1=IHC \cdot ZOT' \cdot (PTCB+CBTP)$$
$$ACC2=IHC \cdot [(ZOT \cdot PTCB)+(BMSG \cdot ZOT)+(CAZZ \cdot CBTT)+(CAZZ \cdot TTCB)]$$

The logical element LE25 is concerned with generating control signals RCV fed to the output units 40–M and strobe pulses STTP fed to interface 34. The circuitry which generates the RCV control signals satisfies the Boolean equation:

$$RCV=CBS \cdot CAZD \cdot CBTT$$

The circuitry which generates the STTP strobe pulses satisfies the following Boolean equations:

$$STTP=CHSL \cdot STPU$$

where $$STPU'=[CBTP \cdot ZOT' \cdot IHC]+ACKD+COMS$$

The circuitry leading to flip-flop 2K8A is concerned with the buffer-to-processor transfer operation and is used to initiate the generation of the strobe pulse sent to the output units 40, and to generate the control signal establishing the time for updating control characters. The presence of the CBTT and absence of the ZOT′ signals at AND gate 2K12B gate an IHC pulse which becomes a TFCA pulse that triggers blocking oscillator 2K9A whose output is coupled via amplifier 2K12C to the input of blocking oscillator 2K9B. Blocking oscillator 2K9B which is triggered by the trailing edge of the pulse generated by blocking oscillator 2K9A generates a CBS pulse which is fed to: logical element LE25 to cause generation of the RCV signal; to an input of OR gate 1J24B to cause the generation of an ROCL pulse which initiates a read-write cycle; and to set the flip-flop 2K8A which generates the RCY signal. It should be noted that the termination of the CBTT signal unsets flip-flop 2K8A.

The circuitry resulting in the generation of the NEOT pulse is concerned with indicating the end of the transfer of a word between the processor P and the communications buffer CB. The NEOT pulse is the TFLO pulse amplified by amplifier 2H17H. The TFLO pulse is generated by the blocking oscillator 2H24F which is triggered by an inverted STFLO pulse generated by logical element LE27 which satisfies the Boolean equation:

$$STFLO=[CBTP \cdot ECTP \cdot IHC \cdot ZOT']+[PTCB \cdot ECFP \cdot IHC \cdot ZOT']$$

The circuitry driven from logical element LE26 is primarly concerned with detecting the end of word characters. In particular, ECTP signal indicates the end of word character in a buffer-to-processor transfer. The CRET signal indicates end of message from an input-output device TTY, while the SRCLA, SRCLB, and SRCLC signals indicate respectively that the input-output device TTY is to now transmit, the input-output device TTY is to be turned off, and the end of the message character is being transmitted to the input-output device TTY.

Logical element LE26 satisfies the following Boolean equations:

$$CRET = TTBE \cdot TTBD \cdot TTBC \cdot TTBB' \cdot TTBA'$$
$$ECTP = SBOG \cdot SBOF \cdot SBOE \cdot SBOD \cdot SBOC \cdot SBOB' \cdot SBOA'$$
$$SRCLA = SBOG' \cdot SBOF' \cdot SBOE \cdot SBOD \cdot SBOC \cdot SBOB' \cdot SBOA'$$
$$SRCLB = SBOG \cdot SBOF \cdot SBOE \cdot SBOD \cdot SBOC \cdot SBOB' \cdot SBOA'$$
$$SRCLA = SRCLA + SRCLB + [SBOG' \cdot SBOF' \cdot SBOE \cdot SBOD' \cdot SBOC' \cdot SBOB' \cdot SBOA']$$

INPUT UNIT 36–1 (FIG. 11)

There are as many input units 36 as there are input-output devices TTY coupled to the communications buffer CB. Since they are all substantially identical, only the typical input unit 36–1 will be described in detail and the differences will be noted.

The primary function of the input unit 36–1 is to receive characters asynchronously, a character at a time, from the associated input-output device TTY–1, temporarily store it and upon demand of the scanner 24 transmit it to the memory input selector 30.

Whenever the input-output device TTL–1 transmits a character, the bits of the character are fed as a coded combination of signals via the lines TA–1 to TE–1 to inputs of the level shifting and phase inverting amplifiers A22A to A22E respectively to become IA–1′ to IE–1′ signals respectively. The IA–1′ to IE–1′ signals are fed to the allow terminals of the bit units B11A to B11E respectively to alert flip-flops therein.

The IA–1′ to IE–1′ signals are also fed to AND gate A18A to generate a strobe pulse. Whenever the first of these signals is received at AND gate A18A it is inverted by amplifier B19A for triggering 80 millisecond delay flop B15A which immediately triggers 8 millisecond delay flop B15B. Eight milliseconds after triggering (to permit "contact" bounce to settle down on the lines TA–1 to TE–1) delay flop B15B triggers blocking oscillator B17A which transmits an RSS–A strobe pulse to the set inputs to each of the bit units B11A to B11E. Delay flop B15A is provided to render the circuit insensitive to "trailing edge bounce" on the lines. Whichever of these units is then receiving its respective IA–1′ to IE–1′ signals it is set and starts storing a bit as indicated by the generation of the FA–1′ to FE–1′ signals respectively. The FA–1′ to FE–1′ signals are fed to inputs of AND gate B23A which transmits a signal to the allow input of flip-flop B11F. The next occurring scanner stepping pulse SADV sets flip-flop B11F, alerting AND gates B22A and B26A. Nothing further happens until the storage register associated with input-output device TTY–1 is interrogated by the SCAN–01 signal. This signal passes through the AND gate B22A and is amplified by amplifier B40 to become the RSC–A signal that is fed back to the communications buffer CB via terminal junction 38 to indicate that the input unit 36–1 is transmitting a character thereto. The RSC–A signal is also fed to sampling inputs of gates in the bit units B11A–B11E such as the AND gate BG1 in bit unit B11A. Accordingly, whichever of the bit units B11A–B11E are storing bits of the character, then transmit DIA–2 to DIE–2 signals respectively to terminal junction 38 for transmission to communications buffer CB.

At the same time the SCAN–01 signal passed through AND gate B22A, it passed through AND gate B26A to trigger blocking oscillator B17B which generates an eight microsecond CRS–1 pulse. The trailing edge of the CRS–1 pulse unsets flip-flop B11F and also unsets the flip-flops in the bit units B11A to B11E. At this time, the character has been transferred and the input unit 36–1 is cleared and ready to receive another character from the input-output device TTY–1.

The only differences in a typical input unit 36–M are: that it receives TA–M to TE–M signals at amplifiers equivalent to amplifiers A22A to A22E; that it transmits signals DIA–M to DIE–M from bits units equivalent to bit units B11A to B11E of input unit 36–1; that AND gates equivalent to AND gates B22A and B26A receive a SCAN–M signal from scanner 24; and it transmits an RSC–M signal in response thereto instead of an RSC–A signal.

TERMINAL JUNCTION 38 (FIG. 12)

Terminal junction 38 merely serves as a signal collector for the input units 36 and the output units 40.

In particular, the RSC–A, RSC–B, . . . RSC–M signals generated by the respective input units 36–1, 36–2, . . . 36–M are fed to inputs of OR gate 3J26D whose output is connected to the input of amplifier 3H3F which generates the RSC signal to prime the communications buffer CB to receive a character from one of the input units 36. The character is a coded combination of TTBA to TTBE signals that are generated by amplifiers 3H3A to 3H3E respectively. The inputs of these amplifiers are respectively connected to outputs of OR gates 3H4A to 3H4E respectively.

The inputs of OR gate 3H4A receive the least significant bit signals DIA–1, DIA–2, . . . DIA–M from the input units 36–1, 36–2, . . . 36–M respectively. The inputs of OR gate 3H4B receive the second least significant bit signals DIB–1, DIB–2, . . . DIB–M from the input units 36–1, 36–2, . . . 36–M respectively, etc.

Request for character signals RFC–A, RFC–B, . . . RFC–M signals from the output units 40–1, 40–2, . . . 40–M are received at inputs of OR gate 3J26C and are fed to the amplifier 3H3J to become the RFC signal sent to the communications buffer CB.

OUTPUT UNIT 40–1 (FIG. 13)

There are as many outputs units 40 as there are input-output devices TTY coupled to the communications buffer CB. Since they are all substantially alike, only the typical output unit 40–1 will be described in detail and the minor differences which uniquely determine the other output units 40–2, . . . 40–7 will be pointed out.

The output unit 40–1 serves as the output connection between the communications buffer CB and the input-output device TTY–1. Its roles are: to indicate to the communications buffer CB when the unit can receive a character; and to serve as a one character buffer storage.

Whenever the input unit 40–1 can receive a character, i.e., is not temporarily storing a character for transmission to input-output device TTY–1, the flip-flop B9B is unset. Therefore, when the SCAN–01 signal associated with input-output device TTY–1 is generated by scanner 24, mixer gate B20C passes the request for character signal RFC–A which is fed via terminal junction 38 as the RFC signal to memory control 32. If the control characters of the associated storage register indicate a buffer to input-output transfer operation is to take place, a character is read from the memory 28 and fed via the odd-even character selector 22 as the SBON′ signals to allow inputs of buffer units A27A to A27E respectively. Since the buffer units are identical circuits, only buffer unit A27A is shown in detail and only its operation will be completely described. It is seen that the SBOA′ signal is fed to the allow input of flip-flop C10. Sometime thereafter memory control 32 generates a CBS strobe pulse which is fed to AND gate B22D where it cooperates with the SCAN–01 signal to generate a SFS–1 pulse that is fed to the set inputs of buffer units A27A to A27E. In particular, the SFS–1 pulse is fed to the set terminal of flip-flop C10. If the SBOA′ signal is not present, i.e., is at ground potential, at the allow terminal, flip-flop C10 sets and the least significant bit is a binary "1" and is stored therein. At the same time, the flip-flop B8B and B9B are set by the SFS–1 pulse. With flip-flop B9B set, mixer gate B20C is blocked and the RFC–A signal terminates. Accordingly, input unit 40–1 indicates it cannot accept another character at this time. After the character is stored in the buffer units, memory control 32 transmits an RCV pulse which cooperates with the SCAN–01 pulse at AND gate B24A to trigger the 200 millisecond delay-flop B13C which drives a heavy duty amplifier A23A that transmits a TP–1 signal which turns on the motor in input-output device TTY–1.

The scanner 24 now proceeds to interrogate other storage registers.

When the flip-flop B8B is set it turns on the quasi flip-flop comprising OR gate B13, amplifier A21 and AND gate G17. Amplifier A21 drives heavy duty amplifier A21A which generates a TS–1 signal that energizes a distributor clutch in the input-output device TTY–1 which permits a parallel to serial conversion of the bits of a character.

The "1" output of flip-flop B8B is also fed to one input of AND gate B22E which will trigger blocking oscillator B17C provided flip-flop B8A is unset. (This is a safety interlock to insure that the input-output device TTY–1 will not receive a new character until it has accepted the previous character.) Blocking oscillator B17C generates an RFS–1 pulse whose leading edge is used to gate the bits stored in the flip-flops of buffer units A27A to A27E, such as C10 of buffer unit A27A into the quasi flip-flops of buffer units A27A to A27E, such as the one comprising mixer gate M7, amplifier A5 and mixer gate M8 of buffer unit A27A, and whose trailing edge unsets the flip-flops of buffer units A27A to A27E, such as C10 of buffer unit A27A. With the quasi flip-flop set, heavy duty amplifier A5A starts transmitting a TA–1 signal to input-output device TTY–1.

The trailing edge of the RFS–1 pulse also unsets flip-flop B8B. The unsetting of flip-flop B8B alerts AND gate B22H to pass the next occurring SADV pulse which unsets flip-flop B9B terminating the blocking of mixer gate B20C. The next time the SCAN–01 signal is generated, mixer gate B20C generates an RFC–A signal which will result in a character being stored in the flip-flop portions of buffer units A27A.

Therefore, buffer units A27A to A27E can store two characters. It should be noted once the second character enters, flip-flop B8A is set (the interlock is in force) and input unit 40–1 cannot request another character until flip-flop B8A is unset as is hereinafter described.

It will be recalled that when flip-flop B8B set, it set the quasi flip-flop comprising OR gate B13, amplifier A21 and AND gate G17 which starts transmitting the TS–1 signal to input-output device TTY–1 to energize its distributor clutch so that it can receive the character transmitted as the TA–1 to TE–1 signals from quasi flip-flops of buffer units A27A to A27E. When this character has been accepted the distributor of the input-output device transmits a TX–1 signal. The leading edge of this signal is fed via amplifier B19 and AND gate B24B to trigger delay-flop B15C. Delay-flop B15C generates a DFA–1′ pulse which unsets the quasi flip-flop centered around amplifier A21 by blocking AND gate G17 and the distributor clutch TTY–1 is released.

The trailing edge of the pulse on the TX–1 signal line passes through AND gate B24C to trigger delay-flop B13A which passes a signal via AND gate G97 to become the RRC–1 reset signal that resets the quasi flip-flops in the units A27A to A27E. For example, the RRC–1 signal at mixer gate M8 blocks recirculation of the TA–1 signal.

The only differences in the other output units such as output unit 40–M are that: the AND gates equivalent to the AND gates B22D, B20C and B24A, receive the SCAN–M signal instead of the SCAN–01 signal; the mixer gates equivalent to the mixer gate B20C transmits an RFC–M signal; the amplifier equivalent to amplifier B19B receives a TX–M signal from input-output device TTY–M; the equivalent of the amplifier A23A transmits a TP–M signal to input-output device TTY–M; the equivalent of the quasi flip-flop comprising OR gate B13, amplifier A21 and AND gate G17 transmits a TS–M signal to input-output device TTY–M; and the equivalents of the buffer units A27A to A27E transmit TA–M to TE–M signals to input-output device TTY–M.

INPUT-OUTPUT DEVICE TTY

A typical input-output device is Type 28KSR Teletypewriter, manufactured by the American Telephone and Telegraph Company. The Teletypewriter has several minor modifications. First, since the conventional teletypewriter generally accepts the bits of the character serially and the communications buffer CB transmits the bits of the characters in parallel, it is necessary to order the device with a 28J Distributor and a TT 173881 Set of Code Reading Contacts for a KSR. The clutch of the distributor is wired to receive the TS–M signal from an output unit 40–M. The distributor at the end of its cycle automatically sends a TX–N signal to the output device 40–M. The Set of Code Reading Contacts for the KSR are connected to the TA–M, TB–M, TC–M, TD–M and TE–M signal lines to provide bi-directional parallel-communication between the Teletypewriter Input-Output Device TTY–M and its associated Input Unit 36–M and Output Unit 40–M.

The Type 28KSR Teletypewriter is further modified to accept a TP–M signal which controls the turning on of the motor therein and also puts it in the receive mode.

In addition, the Stunt Box in the Type 28KSR Teletypewriter is wired so that when it receives a Fig. S (upper case S) character, it is switched into the send mode. The Stunt Box, when it receives a Fig. H turns the motor off. And finally, when the Stunt Box receives a carriage return character (CR) from the keyboard, it will switch the Teletypewriter to the receive mode.

Of course, it should be apparent that the Stunt Box can be arranged to perform these functions for any other desired characters.

It should also be apparent that other types of input-output devices such as TWX Terminal, IBM 358, and IBM 1001, etc., can be employed and that the Type 28KSR Teletypewriter is given, by way of example.

DATA PROCESSOR P

The data processor P can be any processor which has facilities to communicate with a separate input-output unit. A typical processor is the IBM 1410 Data Processing System, manufactured by International Business Machines Corporation, wherein one of its input-output channels is connected to the communications buffer CB. If such a processor as the IBM 1410 is employed, then the signal lines and associated ground leads from the interface 34 are fed to the connector 1411 therein according to the following table.

WIRING TABLE

| | | | |
|---|---|---|---|
| CIM | L24AB | BIR | L04EF |
| COM | L24CD | BRD | L05JK |
| RTBU | L05AB | FBBA | L08BC |
| CSL | L06CD | FBBB | L08DE |
| FPBA | L07BC | FBBC | L08FG |
| FPBB | L07DE | FBBD | L08HI |
| FPBC | L07FG | FBBE | L08JK |
| FPBD | L07HI | FBBF | L08LM |
| FPBE | L07JK | FBBG | L08NP |
| FPBF | L07LM | BOS | L07QR |
| FPBG | L07NP | BET | L05GH |

COMPONENTS

The schematic equivalents of the symbols which have been employed to simplify the detailed description of the units of the system which have been illustrated in block form are shown in FIGURES 14 to 28. For convenient reference, all positive and negative supply buses will generally be identified with a number corresponding with their voltage. The circuitry terminals corresponding to the same symbol terminals are identified by the same character reference numbers.

AND GATE (FIGURE 14)

The AND gates used in the disclosed system are of the "coincidence" type, each comprising a crystal diode network which functions to receive input signals via a plurality of input terminals and to pass the most positive signal.

Figure 14A:
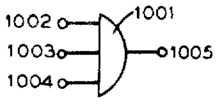
FIG. 14A is the symbol for an AND gate.

The symbol for a representative AND gate 1001, having by way of example, three input terminals 1002, 1003, and 1004 is shown in FIGURE 14A. Since the signal potential levels in the system are minus six volts and zero volts, the potentials of the signals which may exist at the input terminals 1002, 1003, 1004 are thereby limited.

If a potential of zero volts is present at one or more of the input terminals 1002, 1003, 1004, a potential of zero volts will exist at the output terminal 1005. Therefore, if one of the input signals to the input terminals 1002, 1003, 1004 is "negative" (minus six volts) and one or more of the other signals are "positive" (zero volts), the positive signals are passed and the negative signal is "blocked."

When there is a coincidence of negative signals at all three input terminals 1002, 1003 and 1004, a negative signal is transmitted from the output terminal 1005. In such case, it may be stated that a negative signal is "gated" or "passed" by the gate 1001. When all of the input signals to a gate except one are made negative, in preparation for passing a negative signal when the remaining input signal is made negative, the gate may be described as being "primed."

Figure 14B:
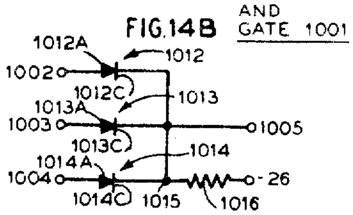
FIG. 14B shows the schematic drawing for the AND gate of FIG. 14A.

The schematic details of the gate 1001 are shown in FIGURE 14B. Gate 1001 includes the crystal diodes 1012, 1013 and 1014. The input terminals 1002, 1003, 1004 are respectively coupled to the crystal diodes 1012, 1013, 1014. The latter diodes comprise respectively in order: anode 1012A and cathode 1012C, anode 1013A and cathode 1013C, and anode 1014A and cathode 1014C. More particularly, the input terminals 1002, 1003, 1004 are respectively coupled to the anodes 1012A, 1013A, 1014A of respective crystal diodes 1012, 1013, 1014. The cathodes 1012C, 1013C, 1014C are interconnected at the junction 1015, which in turn is connected to the negative voltage bus −26 via a resistor 1016.

The negative supply bus −26 tends to make the cathodes 1012C, 1013C, 1014C more negative than the anodes 1012A, 1013A, 1014A, respectively, causing all three crystal diodes 1012, 1013, 1014 to conduct.

When negative six volt signals are simultaneously present at all three input terminals 1002, 1003, 1004, the crystal diodes 1012, 1013, 1014 are conductive, and the potential of the cathodes 1012C, 1013C, 1014C approaches the potential of the anodes.

If the potential at one of the input terminals 1002, 1003, 1004 increases to zero volts, the potential at the junction 1015 approaches zero volts level, as this voltage is passed through the conducting diode 1012, 1013 or 1014 to which the zero volt potential is applied. The other two diodes stop conducting, since their anodes become more negative than the junction 1015. As a result, a "positive" potential of zero volts appears at the output terminal 1005.

If zero volt potentials are simultaneously fed to two or all three of the input terminals 1002, 1003, 1004, a zero volt potential will appear at the output terminal 1005, since respectively two or all three diodes 1012, 1013, 1014 will remain conducting. Thus the gate 1001 functions to pass the most positive signal received via the input terminals 1002, 1003, 1004.

In the above described manner, the gate 1001 is frequently used as a switch to govern the passage of one signal by the presence of one or more signals which control the operation of the gate 1001.

It should be understood that the potentials of zero volts and minus six volts used for purpose of illustration are approximate, and the exact potentials will be affected in two ways. First, they will be affected by the value of the resistance 1016 and its relation to the impedances of the input circuits connected to the input terminals 1002, 1003, 1004. Second, they will be affected by the fact that a crystal diode has some resistance (i.e., is not a perfect conductor) when its anode is more positive than its cathode. Nevertheless, the assumption that signal potentials are either zero or minus six volts is sufficiently accurate to serve as a basis for the description of the operation taking place in the disclosed system. Although the gate 1001 is shown as having three input terminals 1002, 1003, 1004 connected through diodes 1012, 1013, 1014 respectively to junction 1015, it will be understood that any reasonable number of terminals may be similarly connected through diodes to junction 1015 and that the junction will remain at the voltage of the most positive source connected to any of the input terminals. Many of the gates in the description are shown as having two or more than three input terminals and such gates are to be taken as having a similar number of diodes connected to an output terminal as 1015.

It should be noted that the disclosed system employs "negative" logic. Therefore, the AND gate described in this section is deemed "open" when all its input signals are negative, whence its output signal will also be negative. The AND gate is "closed," when at least one input signal is positive, whence the output signal is also positive. The AND gate thus corresponds to an OR gate of "positive" logic systems. Conversely, the OR gate of the disclosed negative logic system corresponds to the AND gate of positive logic systems. The buffer utilized in the disclosed system is described in the next section.

OR GATE (FIGURE 15)

An OR gate comprises a crystal diode network which functions to receive input signals via a plurality of input terminals and to pass the most negative signal.

Figure 15A:
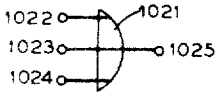
FIG. 15A is the logical symbol for an OR gate.

The symbol for a representative OR gate 1021, having by way of example three input terminals 1022, 1023, 1024, and output terminal 1025, is shown in FIGURE 15A. Since the signal potential levels of the system are minus six volts and zero volts, either one of these potentials may exist at the input terminals 1022, 1023, 1024.

If a potential of minus six volts is present at one or more of the input terminals 1022, 1023, 1024, a potential of minus six volts exists at the output terminal 1025. Therefore, if one or more of the input signals to input terminals 1022, 1023, 1024 is negative, the negative signal is passed to the output terminal 1025, and the OR gate is said to be open, notwithstanding the fact that the input signals to the remaining input terminals are "positive" (zero volt potential).

When there is a coincidence of "positive" (zero volt) signals at all three input terminals 1022, 1023, 1024, a "positive" signal is transmitted from the output terminal 1025, and the OR gate is said to be closed.

Figure 15B:
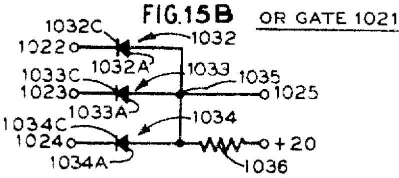
FIG. 15B is the schematic drawing for the OR gate of FIG. 15A.

The schematic details of the OR gate 1021 are shown in FIGURE 15B. OR gate 1021 includes the crystal diodes 1032, 1033, 1034. The input terminals 1022, 1023, 1024 are respectively coupled to the crystal diodes 1032, 1033, 1034. The latter diodes comprise respectively in order: cathode 1032C and anode 1032A, cathode 1033C and anode 1033A, and cathode 1034C and anode 1034A. More particularly, the input terminals 1022, 1023, 1024 are respectively coupled to the cathodes 1032C, 1033C, 1034C of respective diodes 1032, 1033, 1034. The anodes 1032A, 1033A, 1034A of respective diodes 1032, 1033, 1034 are interconnected at the junction 1035 which is coupled to output terminal 1025, and which connects to the positive supply bus +20 via a resistor 1036.

If negative potentials are simultaneously present at all three input terminals 1022, 1023, 1024, all three diodes 1032, 1033, 1034 will conduct, since the positive supply bus +20 tends to make the anodes 1032A, 1033A, 1034A more positive. The voltage at the junction 1035 will then be minus six volts since, while conducting, the anodes 1032A, 1033A, 1034A of the crystal diodes 1032, 1033, 1034 assume the potentials of the associated cathodes 1032C, 1033C, 1034C.

When a positive signal is fed to one or two, but not all three of the input terminals 1022, 1023, 1024, the respective one or two of cathodes 1032C, 1033C, 1034C are raised to potential of zero volts and therefore more positive than their respective anodes. However, the cathode of the remaining one or two crystal diodes remains at the negative potential of minus six volts, and therefore the potential of the junction 1035 also remains at minus six volts.

When the signals present at all three input terminals 1022, 1023, 1024 are positive, the anodes 1032A, 1033A, 1034A are raised to approximately the same potentials of zero volts as their respective cathodes 1032C, 1033C, 1034C, and the potential at the junction 1035 rises to zero volts.

The potential which exists at the junction 1035 is transmitted from the buffer 1021 via the connected output terminal 1025.

The showing herein of an OR gate with two or more than three input leads is to be understood to mean that there are as many diodes having their anodes connected to an output terminal as there are input leads.

MIXER GATE (FIGURE 16)

Figure 16A:
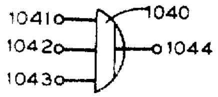
FIGS. 16A and 16B show respectively the symbol for a mixer gate and its schematic details.
Figure 16B:
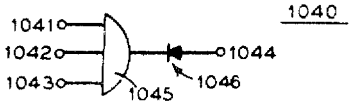

The symbol for a representative mixer gate 1040, having by way of example three input terminals 1041, 1042, 1043, and output terminal 1044, is shown in FIGURE 16A. The schematic details are shown in FIGURE 16B, wherein a regular AND gate 1045 is illustrated in the symbolic form previously employed. The practice of representing the circuit details of a unit shown in symbolic form, by symbols representing previously described units, will be followed hereinafter.

As may be seen from FIGURE 16B, the input terminals 1041, 1042, 1043 serve as input terminals for AND gate 1045, and the output of AND gate 1045 is coupled to the cathode of a diode 1046, whose anode is in turn coupled to the output terminal 1044. The mixer gate is generally utilized in conjunction with one or more further mixer gates each having two or more input terminals. The output terminals of the several mixer gates are coupled together. Hence the individual AND gates (corresponding to AND gate 1045) of the several mixer gates function in the usual AND circuit fashion. The several diodes corresponding to diode 1046 constitute an OR gate common to the individual AND gates.

AMPLIFIER (FIGURE 17)

Figure 17A:
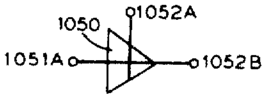
FIGS. 17A and 17B show the symbol and schematic details of a typical amplifier.

The symbol for a representative amplifier 1050 having input terminal 1051A, "negative" or "inverse" output terminal 1052A, and "positive" output terminal 1052B, is shown in FIGURE 17A. Output terminal 1052A is negative in the sense that it delivers an output signal that is reversed in polarity with respect to an input signal applied to input terminal 1051A. By the same token, the output signal at positive output terminal 1052B will be in phase with an input signal applied to terminal 1051A.

Figure 17B:
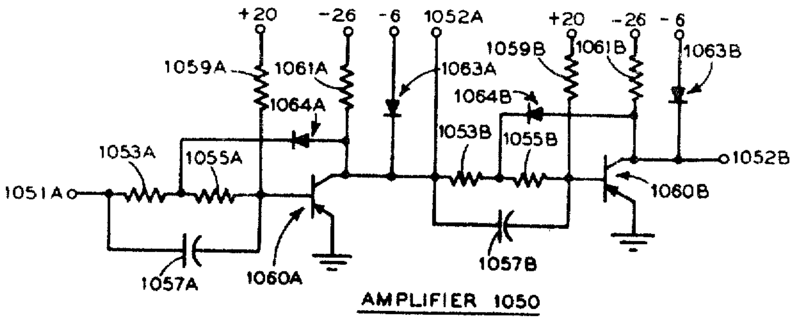

The circuitry of amplifier 1050 is shown in FIGURE 17B. Amplifier 1050 is essentially a two-stage transistor amplifier. It comprises pnp transistors 1060A and 1060B, each connected as a grounded emitter stage. Consistent with the usual convention, pnp junction transistors, such as transistors 1060A and 1060B are illustrated with an arrow at the emitter electrode pointing toward the base electrode. On the other hand, npn junction transistors encountered hereinafter are shown with the arrow at the emitter electrode pointing away from the base electrode. The type of transistor, that is pnp or npn may be recognized from the illustration and will not be explicitly stated except where warranted.

The two stages of amplifier 1050 are structurally similar. The members of the first stage are identified by reference numerals followed by the letter A, and the corresponding parts of the second stage are represented by like reference numerals followed by the letter B. Only the first stage will be described explicitly; the description of the second stage is by way of implicit substitution of the letter B for the letter A. It should be observed that the output terminal 1052A of the first stage constitutes the input terminal 1051B of the second stage.

The input signal that is to be amplified is applied from a source external of amplifier 1050, to input terminal 1051A, from which it is transmitted to the base of transistor 1060A via series connected resistors 1053A and 1055A. These signals utilized in the disclosed system are generally of the pulse type, and as such have steep leading and trailing edges. To maintain the sharp pulse shape, there is provided a speed-up capacitor 1057A which shunts the series combination of resistors 1053A and 1055A. Quiescent base current is established by means of a resistor 1059A, which intercouples the base of transistor 1060A and the +20 volt bus.

The emitter of transistor 1060A is grounded, whereas its collector connects through load resistor 1061A to the −26 volt bus. To limit the negative voltage swing of the collector to −6 volts, the collector of transistor 1060A is coupled to the cathode of a clamping diode 1063A, whose anode connects to the −6 volt bus. Positive voltage swing of the collector is reduced by means of a diode 1064A whose anode is coupled to the collector of transistor 1060A and whose cathode is coupled to the junction of resistors 1063A and 1055A. Diode 1064A thus provides unidirectional and therefore nonlinear degenerative feedback for positive output signals at the output terminal 1052A which is tied to the collector of transistor 1060A.

COUNTER RESET (FIGURE 18)

Figure 18A:
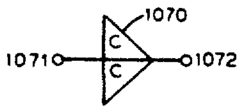
FIGS. 18A and 18B show the symbol and circuit details for a typical counter or flip-flop.

The "counter reset" is a special purpose amplifier which is utilized in the disclosed system as a source of clearing signals for flip-flops and counters described in the following sections, and occasionally for other purposes. It is a non-inverting amplifier in the sense that the output signal is in phase with the input signal. The symbol for a representative counter reset 1070, having a single input terminal 1071 and a single output terminal 1072, is shown in FIGURE 18A.

Figure 18B:
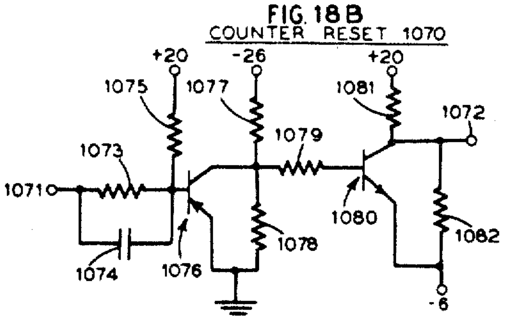

The circuitry of counter reset 1070 is shown in FIGURE 18B. The counter reset is also a two-stage direct coupled common emitter amplifier; however, the two stages are somewhat dissimilar; in particular, the first stage includes pnp transistor 1076, whereas the second stage includes npn transistor 1080. Therefore both stages will be explicitly described.

The input signal applied to input terminal 1071 is transmitted to the base of transistor 1076 via the shunt combination of resistor 1073 and speed-up capacitor 1074. Quiescent base current is established by means of a resistor 1075 which intercouples the base of transistor 1076 and the +20 volt bus. The collector load impedance is formed of a voltage divider that includes resistors 1077 and 1078, which are connected serially from the −26 volt bus to ground and whose junction is tied to the collector of transistor 1076. The emitter of transistor 1076 is grounded.

The amplified output voltage appearing at the collector of transistor 1076 is inverted with respect to the input signal at terminal 1071, and is reinverted by means of the second stage of the counter reset 1070. The collector output signal of transistor 1076 is coupled to the base of transistor 1080 via resistor 1079. The emitter of transistor 1080 is returned to the −6 volt bus. The collector load impedance for transistor 1080 consists of a voltage divider which is comprised of serially connected resistors 1081 and 1082 which span the +20 volt and −6 volt buses. The collector of transistor 1080 is coupled to the junction of resistors 1081 and 1082, and also to the output terminal 1072.

COUNTER (FIGURE 19)

Figure 19A:
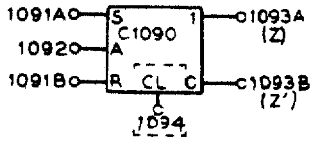
FIGS. 19A and 19B show respectively the symbol and circuit details for a typical counter or flip-flop.

The symbol for a representative counter (1090) is shown in FIGURE 19A. Counter 1090 is provided with a set (S) input terminal 1091A, a reset (R) input terminal 1091B, an allow (A) input terminal 1092, a "1" or set output terminal 1093A, a "0" or unset output terminal 1093B, and a clear (CL) input terminal 1094. It is a bistable device; that is, it admits of two stable states of operation, the set state and the unset state. When the counter 1090 is in the unset state, the output signal at the "0" terminal 1093B will be "negative" (at a potential of −6 volts) and the output signal at the "1" terminal 1093A will be "positive" (at a potential of 0 volts). The output signals are also specified as complimentary pairs upon occasion, as for example by Z for the set terminal output signal 1093A and by Z' at the unset output terminal 1093B in FIGURE 19A. In the unset condition of the counter 1090 the Z' signal is deemed to be present or "on." The Z signal is deemed to be absent or "off," although then "positive." In the set state, the Z' signal will be "positive" (at a potential of 0 volts) and deemed absent or "off"; the Z signal will be deemed present or "on," even though then "negative."

The "normal" potential prevailing at the set input terminal 1091A, the reset input terminal 1091B, and the allow input terminal 1092, is 0 volt. Under these conditions the set and unset signals are deemed to be absent, and the allow signal to be present. The clear input signal is "normally" absent and at a potential level of 0 volt. When present, the clear signal terminal 1094 assumes a negative potential value of −6 volts, or even below −6 volts.

While in the unset stage, changes in the conditions of the unset or allow input signal levels will not alter the unset state of counter 1090. Assuming that the allow signal has been present for at least four microseconds, application of a (negative) set pulse at input terminal 1091A of at least four microseconds duration will transfer the counter 1090 to the set state at the termination of such set pulse, that is at its positive-going trailing edge. The Z signal will be "on" and the Z' signal will be "off."

Once in the set state, changes in the conditions of the set and allow input signals will not alter the set state of counter 1090. However, application of a (negative) unset input signal to terminal 1091B of at least four microseconds duration will transfer flip-flop 1090 to the unset state at the termination of such unset pulse, that is at its positive-going trailing edge. The Z signal will be "off" and the Z' signal will be "on." Application of the (negative) clear signal will place counter 1090 in the unset state.

Figure 19B:
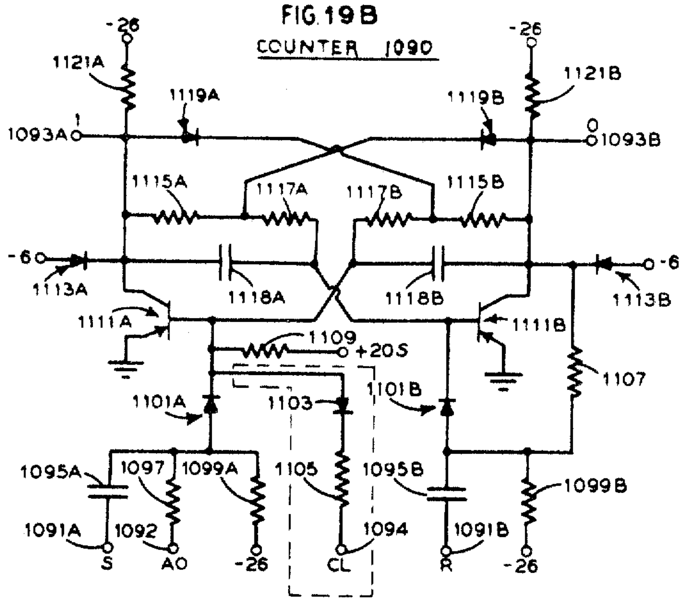

The schematic details of counter 1090 are shown in FIGURE 19B. The circuit is a transistor type Eccles-Jordon circuit which includes grounded emitter connected transistors 1111A and 1111B. Regenerative cross-coupling is provided between the collector of each transistor and the base of the other transistor. The counter circuit is composed of two half-circuits, one associated with transistor 1111A and the other with transistor 1111B. The half circuits are to a greater extent symmetrical; the symmetrical components of the two half-circuits may be recognized by inspection in that a component of the left half-circuit is identified by a given reference numeral followed by the letter A and its symmetrical component in the right half-circuit is identified by the same reference numeral followed by the letter B. Therefore the following explicit description of the half-circuits is basically given for only one half-circuit, and the description of the other is given implicitly by substitution of "A" for "B," and "B" for "A." Unsymmetrical parts are labeled by reference numeral without suffix letter, and are explicitly described for both half-circuits.

In the unset state transistor 1111A conducts at collector current saturation, and its collector electrode which constitutes the "1" terminal is at 0 volt potential. Such collector potential is transmitted via series resistors 1115A and 1117A to the base of transistor 1111B, thereby placing transistor 1111B in a non-conducting state (collector current cut-off). The collectors are coupled to the −26 volt bus through respective resistors 1121A and 1121B. To limit the potential of the collector of transistor 1111B to −6 volts, such collector connects to the −6 volt bus through the cathode and then the anode of a clamping diode 1113B. The collector of transistor 1111B constitutes the "0" output terminal 1093B. The series combination of resistors 1115A and 1117A is shunted by a speed-up capacitor 1118A to accelerate switching from one counter state to the other. To prevent deep saturation of the conducting transistor, the collector of transistor 1111A connects through the anode and then the cathode of a diode 1119A to the junction of resistors 1115B and 1117B, so as to provide nonlinear degenerative feedback for positive-going collector potential from collector to base of transistor 1111A via diode 1119A and resistor 1117B.

The set signal is applied at set input terminal 1091A via differentiating capacitor 1095A and the diode and then the cathode of diode 1101A to the base of transistor 1111A. A differentiating resistor 1099A connects from the anode of diode 1101A to the −26 volt bus. Diode 1101A blocks the differentiated negative-going leading edge of the incoming set signal, and transmit the positive-going leading edge to initiate the flipping action, assuming that the counter is then unset. The rise in base potential decreases the collector current of transistor 1111A, so that its collector potential decreases. Such decrease in collector potential is coupled via resistors 1115A and 1117A to the base of transistor 1111B to initiate its collector current flow and rise in collector potential. Such latter rise in collector potential is coupled via resistors 1115B and 1117B to the base of transistor 1111A to reinforce the initial action of the set pulse. The effect is cumulative and ultimately transistor 1111A is cut off and transistor 1111B is saturated. The counter 1090 is now in the set state. It may be unset by application of an unset pulse to the reset input terminal 1091B through an analogous chain of events, noting the symmetrical components 1095B, 1099B, 1101B. When a set and an unset pulse are applied concurrently, the counter 1090 will change its state. This is because the set pulse will not affect a previously set counter, but the unset pulse will. Similarly the unset pulse will not affect a previously unset counter, but the set pulse will. This phenomenon forms the basis of the operation of a binary counter, described in the next section.

The allow terminal 1092 is coupled to the anode of diode 1011A through a resistor 1092. Application of a −6 volt potential to the allow terminal 1092 will place the anode of diode 1101A at a potential below that of its cathode and thereby preclude the set pulse from reaching the base of transistor 1111A, and consequently setting of the counter 1090. The allow signal thus may be used to gate the set signal.

The clear terminal 1094 is coupled to the base of transistor 1111A via resistor 1105 and the anode and then the cathode of diode 1103. Application of the (negative) clear signal will initiate conduction of a previously cutoff transistor 1111A. This will be followed by the usual regenerative flipping action previously described to reset counter 1090. The clear signal will override a concurrent setting signal, noting that the clear signal is applied without differentiation.

The base of transistor 1111A is additionally coupled through a resistor 1109 to a potential source +20S, which is normally maintained at a potential of +20 volts. However, when power is first turned on to the system, or at any other time when it is desired to clear the counter, the potential of source +20S is momentarily changed to −26 volts through a suitable switch (not shown) to clear initially the counter 1090 to the reset state.

The collector of transistor 1111B is coupled to the anode of diode 1101B through a resistor 1107 to off-set the unbalance of the two half-circuit due to unsymmetrical components 1097, 1105, 1109 in the left half-circuit.

Figure 10:
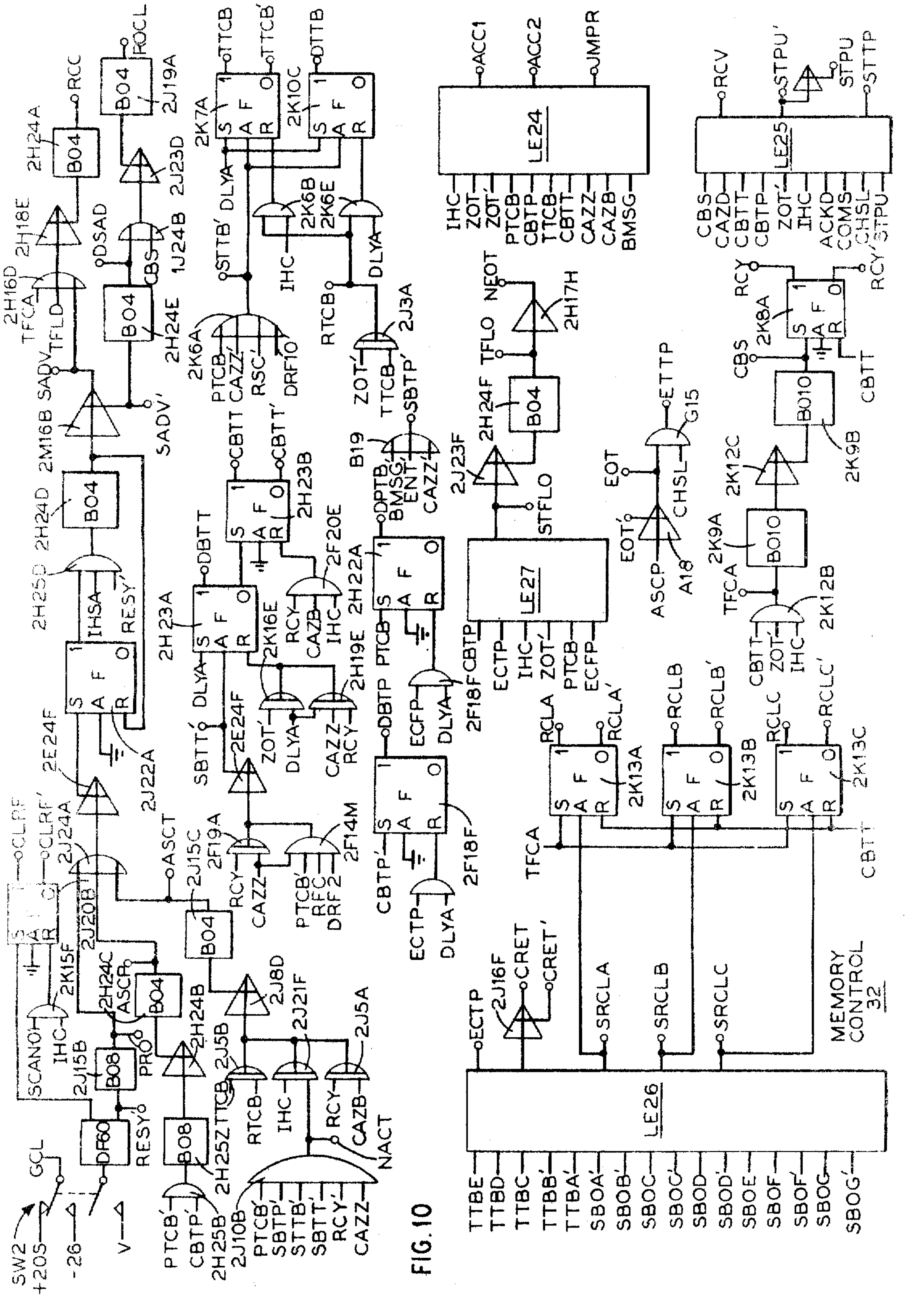
FIG. 10 shows the logical diagram of the memory control 32.
Figure 11:
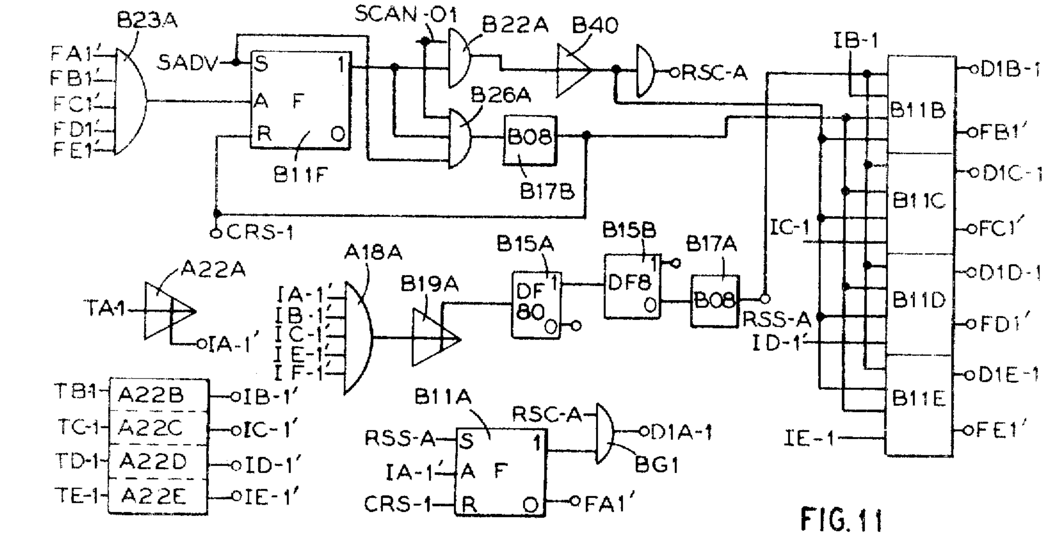
FIG. 11 is the logical diagram for typical input unit 36-1.
Figure 12:
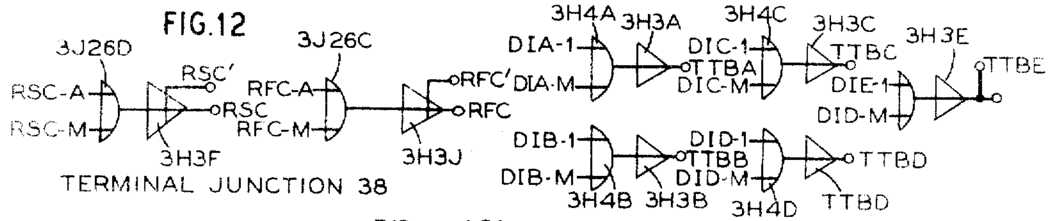
FIG. 12 is the logical diagram for terminal junction 38.
Figure 13:
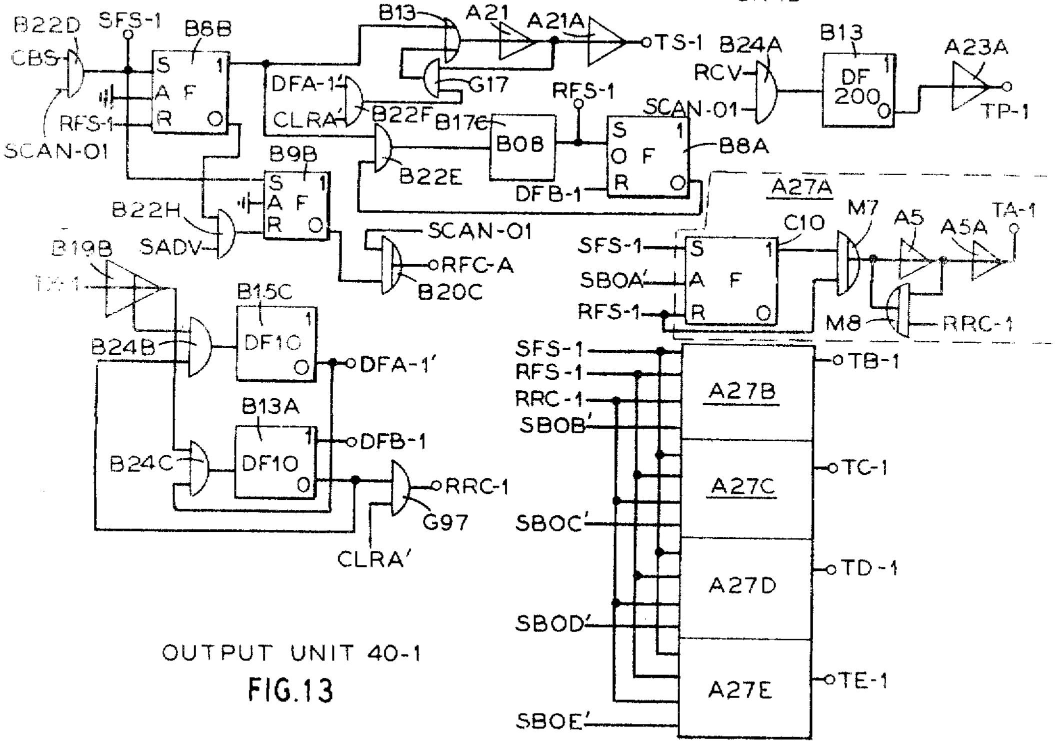
FIG. 13 is the logical diagram for typical output unit 40-1.

The system also includes units called flip-flops such as flip-flop 2K10C (FIG. 10). The flip-flops are identical to the described counter C1090 except that the CL terminal is deleted along with its associated diode 1103 and resistor 1105.

BINARY COUNTER (FIGURE 20)

The exemplary binary counter 1130 is shown symbolically in FIGURE 20 and in block form in FIGURE 20A as composed of two stages 1131 and 1132. It has a counting capacity of four numbers (zero to three). A binary counter may be composed of a single stage with a counting capacity of two numbers (zero to one). Each additional stage doubles the capacity of the binary counter; thus a three-stage counter will have a capacity of eight numbers (zero to seven).

As may be seen from FIGURE 20B each binary counter stage includes a counter whose set input and reset input terminals are tied together, and whose set output ("1") terminal and allow terminal are tied together. The "1" output of a given stage is tied to the set input terminal of the next higher stage in the counting chain. The input terminal 1133 of counter 1130 is also identified as the count terminal; it is connected to the set and reset input terminals of the initial stage 1131. The "1" and "0" terminals of stage 1131 are deemed to be the sources of signals A and A′ respectively; those of stage 1132 the source of signals B and B′ respectively, and so forth for any added stages. The alphabetically ordered signals are a concept that is useful in the description of binary counter 1130 and of the decoder given in subsequent sections.

The several counter stages may be cleared to zero by application of a negative signal to the input terminal 1137 of counter clear 1138, whose output terminal is coupled via line 1139 to the clear terminals of the several counter stages, thus clearing (unsetting) them. Initial clearing can also be performed in the same way that the individual counter of FIGURE 19 is initially cleared. Accordingly, when only an initial clear of the binary counter is required at the start of operation, the counter clear 1138 feeding line 1139 is not required. The fact of unset states prevailing in all counter stages is interpreted as the number zero. In such unset state, each counter stage is in an allow set condition by virtue of intercoupling of the "1" and allow terminals. Therefore, the positive-going trailing edge of the next incoming signal applied to the terminal 1133 will set stage 1131, even though it is applied to both the set and reset input terminals of stage 1131. This follows from the discussion of simultaneous application of set and reset signals to a counter given in the preceding section.

The "1" terminal of stage 1131 is now at negative potential; that is, the A signal is now present. This is of significance in several respects. The A signal serves as setting signal for the second stage 1132, but not at this time as yet, recalling that it is the positive-going trailing edge of a setting signal which is effective to cause setting. Thus stage 1132 remains unset and the fact of stage 1131 set and stage 1132 unset is interpreted as the number one. Secondly, the allow terminal of stage 1131 is now at negative potential, so that the positive-going trailing edge of the next incoming second signal cannot stage 1131, but will unset it.

The unsetting of stage 1131 by the second signal terminates the A signal, which is now positive-going and therefore set stage 1132, even though the A signal is applied to both the set and reset terminals of stage 1132. The fact of stage 1132 set and stage 1131 unset is interpreted as the number two. It is seen that stage 1132 is in exactly the same condition as stage 1131 upon receipt of the first signal. The B signal is now present. Also stage 1131 is now in exactly the same condition as it was prior to the first A signal. Therefore the next (third) signal will set stage 1131. The attendant initiation of the A signal does not affect stage 1132 (termination of the A signal subsequently will). Stage 1132 therefore remains set, and the fact of both stages 1131 and 1132 being set is interpreted as the number three. It is thus seen that the counter 1130 counts the number of signals.

The counter 1130 has now reached the limit of its two-stage capacity. The next (fourth) signal will unset stage 1131. The attendant termination of the A signal now also resets the second stage 1132, so that the binary counter 1130 has reverted to the initial condition corresponding to the count of zero. However, the attendant termination also of the B signal would set a third counter stage coupled to stage 1132, and such set state coupled with the unset state of stages 1131 and 1132 would be interpreted as the number four. Stages 1131 and 1132 are now ready for another cycle of counts one, two, three, zero as before. In the case of an added third stage, such counts would be interpretable as five, six, seven, zero respectively.

MONOSTABLE MULTIVIBRATOR TYPE CIRCUITS

Figures 22A, 22B, 23A, 23B:
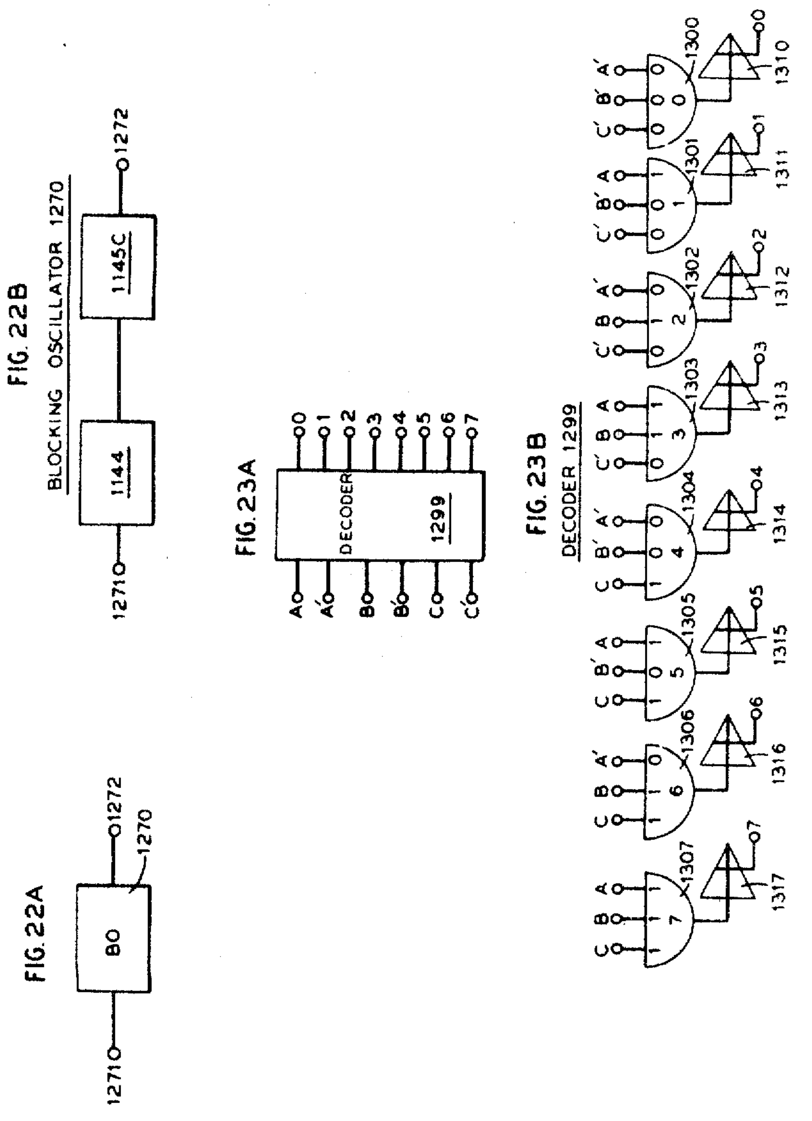
FIGS. 22A and 22B show respectively the symbol and logical details of a block oscillator.
FIGS. 23A and 23B show the symbol and logical details of a decoder.

The disclosed system utilizes several monostable type multivibrator circuits, namely a delay flap (FIGURE 21) and a blocking oscillator (FIGURE 22). These circuits function generally in the same manner, in that upon receipt of an input trigger signal they will generate an output pulse of predetermined duration. Structurally, the circuits are also similar to a certain extent. The delay flop circuit shown in FIGURE 21B is composed of two blocks desigated as 1144 and 1145A. The blocking oscillator circuit of FIGURE 22B is composed of block 1144 and of the basic delay flop circuit and of a block 1145C which is essentially a simple modification of block 1145A. Components individual to the blocks are designated by reference numeral without suffix letter. The following description will be simplified, having regard to the noted similarities.

THE DELAY FLOP (FIGURE 21)

The symbol for a representative delay flop 1140 is shown in FIGURE 21A. The delay flop includes input terminal 1141 and positive and negative output terminals 1142 and 1142A.

The schematic details of the delay flop 1140 are shown in FIGURE 22B. The input signal to terminal 1141 proper for operation of the delay flop 1140 is a positive signal of at least four microseconds duration. The delay flop responds to the negative-going trailing edge of such trigger input signal. The negative-going trailing edge must have a fall time of less than 0.5 microsecond. The mentioned time limitation of four and 0.5 microsecond will assure reliable triggering.

The proper operating level at input terminal 1141 is established by a resistor 1146, which connects from terminal 1141 to the −20 volt bus. The input signal is coupled by means of a capacitor 1148 to the base of transistor 1156 which is connected as an emitter follower. However, the input signal is modified by the action of a network which is connected from the base of transistor 1156 to ground and includes resistor 1154 shunted by the series combination of diode 1150 and resistor 1152. The anode of diode 1150 is tied to the base of transistor 1156.

The positive-going leading edge of the incoming trigger pulse is presented with a short-time constant differentiating network including capacitor 1148 and resistor 1152, and is therefore attenuated. The negative-going trailing edge cannot pass through diode 1150, and therefore the impedance it sees is that of coupling capacitor 1148 and resistor 1154 in shunt with the input impedance of the emitter follower transistor 1156, whose time constant is substantially greater. The negative-going trailing edge is therefore not attenuated to substantial degree.

The collector of transistor 1156 is coupled to the −6 volt bus, whereas its emitter is coupled through load resistor 1158 to the +20 volt bus. This completes the description of the elements constituting block 1144. The emitter of transistor 1156 produces a replica of the signal voltage appearing at its base, and this is passed to the cathode of a diode 1160A in block 1145A.

Diode 1160A suppresses transmission of the residual positive swing of the signal developed at the emitter of transistor 1156, but passes the negative-going trailing edge part to an integrating network composed of shunt-connected resistor 1162A and capacitor 1164, whose ends are respectively connected to the anode of diode 1160A and the base of transistor 1166A, which is connected as a grounded emitter amplifier. Proper operating potential for transistor 1166A is established by means of a resistor 1165A which intercouples the transistor base and the +20 volt bus. The collector load resistor 1168A of transistor connects to the −26 volt bus. Transistor 1166A is normally biased to collector current cut-off, but is turned on by the incoming base signal.

The inverted (positive) integrated signal developed at the collector of transistor 1166A is passed through capacitor 1170A to the base of transistor 1176A, which functions as the monostable multivibrator proper. Capacitor 1170A in cooperation with series-connected resistors 1172A and 1174A constitute a charging network, which determine the duration of the output pulse at output terminal 1142. Capacitor 1170A is selected to provide the desired pulse duration which is expressed for a given delay flop in milliseconds (MS) in the symbolic form shown in FIGURE 21A.

Resistors 1172A and 1174A intercouple the base of transistor 1176A and the −26 volt supply. The base of transistor 1176A is grounded, while its collector is coupled through load resistor 1178A to the −26 volt bus and is conductor coupled to the output terminal 1142. The negative excursion of the collector potential is limited to −6 volts by means of a clamping diode 1180A whose anode is tied to the collector and whose cathode is tied to the −6 volt supply.

Resistors 1172A and 1174A normally bias transistor 1176A to saturation, so that its collector is at most positive potential. The positive signal applied to its base via capacitor 1170A initially reduces the collector current, so that the collector potential begins to drop, and such drop is regeneratively enhanced by means of a feedback diode 1182A whose anode is coupled to the collector and whose cathode is tied to the cathode of diode 1160A. The diodes 1160A and 1182A are connected as a buffer. By virtue of the regenerative feedback provided by diode 1182A through the integrating network (resistor 1162A and capacitor 1164), transistor 1166A, and capacitor 1170A, transistor 1176A is practically instantly driven to collector current cut-off. Its collector voltage drops and remains at the level of −6 volts until the circuit recovers. Such recovery is due to the charging of capacitor 1170A through resistors 1172A and 1174A. As capacitor 1170A charges, collector current begins to flow once more in transistor 1176A, and it rapidly returns to saturated condition. The regenerative feedback action ends. The collector voltage goes positive again, and to minimize overshoot, a non-linear negative feedback diode 1184A is provided. The anode of diode 1184A is tied to the collector of transistor 1176A, and its cathode to the junction of resistors 1172A and 1174A. The negative feedback path is from the collector via diode 1184A and resistor 1172A to the base of transistor 1176A. The circuit recovery is not complete until capacitor 1170A is charged to normal voltage and such charging depends on the resumption of normal collector potential of transistor 1166A, which in turn depends on the time constant of the integrating network composed of resistor 1162A and capacitor 1164.

The output terminal 1142 is connected to a phase inverting amplifier A1500 to provide the second phase of output.

BLOCKING OSCILLATOR (FIGURE 22)

The symbol for a representative blocking oscillator 1270, having input terminal 1271 and output terminal 1272, is shown in FIGURE 22A. The corresponding details are shown in symbolic form in FIGURE 22B from which it may be seen that the blocking oscillator 1270 is structurally and functionally similar to the basic delay flop of FIGURE 21. The blocking oscillator 1270 is composed of blocks 1144 and 1145C. Block 1144 is structurally the same as the like-numbered block in FIGURE 21. Block 1145C is also structurally the same as block 1145A, except that a resistor is added between the collector of transistor 1166A and ground. Functionally, the blocking oscillator is the same as the basic delay flop of FIGURE 21; however, its circuit constants are selected to produce output pulse of substantially shorter duration than that of the basic delay flop. The duration of the output pulse in microseconds is indicated by the number following the BO designation in the block symbol. For example, if the block contains the designation BO8 then the blocking oscillator will generate an eight microsecond pulse.

DECODER (FIGURE 23)

The symbol for a representative decoder 1299 is shown in FIGURE 23A. In the description of the decoder 1299 it will be convenient to identify terminals and the signals that are applied to or delivered at such terminals by one and the same reference characters. For example, decoder 1299 accepts pairs of complementary input signals A and A′, B and B′, and C and C′. It delivers output signals 0 to 7. The input signals A and A′ are deemed to be applied to input signal terminals A and A′ respectively.

The decoder is commonly used in conjunction with a binary counter of the kind described in a previous section, or with some similar static register, and its purpose is to provide an output signal at that one of the particular output terminals which corresponds numerically to the count stored in the static register. Thus, the decoder 1299 is deemed to derive its signals by way of example from a three-stage binary counter of counting capacity 0 to 7. The complementary signal pairs, A, B, C are deemed to be derived from the three stages respectively, as described in connection with the binary counter. The following description of the details of decoder 1299 (FIGURE 23B) will further elucidate this concept.

Decoder 1299 includes eight AND gates 1300 to 1307, whose outputs are connected to the input terminals of eight amplifiers 1310 to 1317 respectively. The latter amplifiers deliver at their negative output terminals the count pulses 0 to 7 respectively.

Each of the gates 1300 to 1307 has three inputs to which are applied one or the other signal in each of the pairs A, B and C. All like labeled input terminals are deemed to be interconnected, although the interconnections are omitted in the interest of clarity. For example, input terminals A′ are shown for gates 1300, 1302, 1304 and 1306, and are deemed to be interconnected. It should be recalled that the A signal is derived from the first stage of the binary counter and therefore represents the least significant bit (binary digit) of the stored count; similarly the B signal represents the second least significant bit, and the C signal the third least significant bit.

Also, the primed signal corresponds to the bit 0 and the absence of the primed signal represents the bit 1 (recall the designations of the output terminals of a counter stage as "0" and "1"). The functioning of the decoder may now be determined by inspection, since in each of gates 1300 to 1307 the stored number passed by a given gate is indicated in binary representation, least significant bit vertically below the A input terminal, second least significant bit vertically below the B input terminal, and third least significant bit vertically beow the C input terminal. Additionally there is inscribed in each gate the passed number in decimal representation. Consider gate 1303 which passes the count 3. The binary representation for 3 is 011. For this number to be passed, the A and B signals must be present and the C signal absent, which means that the C′ signal must be present, as shown. The remaining gates follow the same pattern.

It will be recalled that an AND gate, when transmissive, passes a negative output signal. The fact that the output signal from amplifiers 1310 to 1317 is taken from the negative output terminals, implies that when a given gate is open, its associated amplifier will produce a positive output count signal. This is desirable when decoder 1299 feeds positive logic circuits. If negative logic circuits are to be driven, the in-phase outputs of amplifiers 1310 to 1317 may be utilized.

COMPARATOR 1600 (FIGURE 24)

Figure 24B:
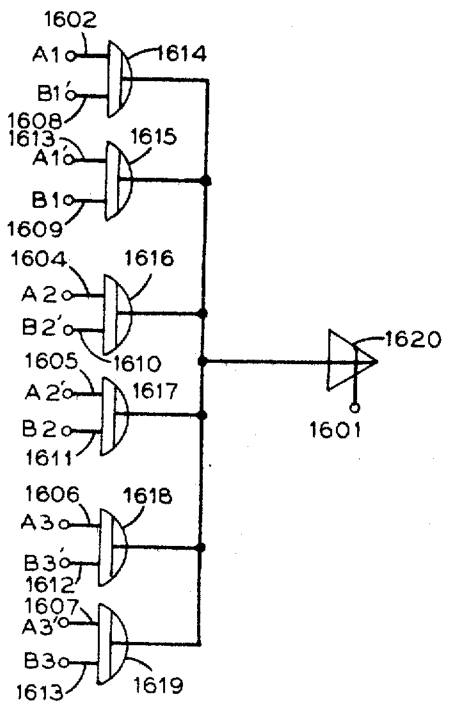
FIGS. 24A and 24B show the symbol and logical details of a comparator.
Figure 24A:
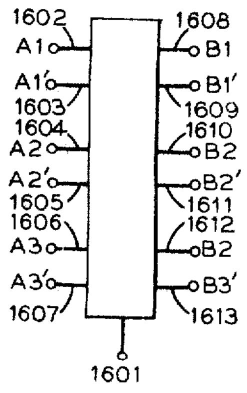

Comparator 1600 shown symbolically in FIGURE 24A is used to compare for equality between two words, each represented by a coded combination of bits in the form of signals. The first word comprises, for example, the bit positions A1, A2, A3; the second word bit positions B1, B2, B3. The signals representing the bits and their inverses are fed to input terminals 1602 to 1613 of comparator 1600 and if an equality exists it transmits a signal from the output terminal 1601.

FIGURE 24B shows the circuitry for the comparator for comparing two words of three bits each. It should be apparent for the following description that the comparator can easily be expanded to handle larger words. In any event, associated with each bit position of the words are two mixer gates which are "cross connected." For example, the mixer gates 1614 and 1615 are associated with the least-significant bit positions of the words A and B. The mixer gate 1614 receives the A1 and B1′ signals; and the mixer gate 1615 receives the A1′ and B1 signals. In other words, each mixer gate receives one inverted signal and one non-inverted signal. One of the signals is associated with the least-significant bit of word A and the other signal is associated with the least significant bit of word B. The only time both of the mixer gates 1614 and 1615 will simultaneously not transmit a signal is when the least-significant bits of both words are equal (remembering that binary one is represented by the presence of a signal and binary zero by the absence of a signal). If both are binary ones then the B1′ signal (binary zero) blocks mixer gate 1614; and the A1′ signal (binary zero) blocks mixer gate 1615. If both are binary zeros then the A1 signal (binary zero) blocks mixer gate 1614; and the B1 signal (binary zero) blocks mixer gate 1615. If one is binary one and the other is binary zero then one of the mixer gates will transmit a binary one. For example if A1 is binary one and B1 binary zero, then the coincidence of A1 and B1′ (binary one) will cause mixer gate 1614 to transmit binary 1.

The pair of mixer gates 1616 and 1617, and the pair of mixer gates 1618 and 1619 respectively operate in the same manner for the second-least and the most-significant bits of the words A and B.

Since the outputs of all the mixer gates feed to the input of inverting amplifier 1620 a signal will be present at the output 1601 only when all of the mixer gates 1614 to 1619 are not transmitting signals, i.e., when the words A and B are equal.

AMPLIFIERS FOR THE MAGNETIC CORE MEMORY

The magnetic core memory of the disclosed system is of the coincident current type employing rows and columns of magnetic core windings arranged in a succession of "planes," and inhibit and sense windings. A so-called core driver, described in detail below, connects to commoned ends of all the row windings. The free end of each row winding is connected to a so-called bilateral switch, also described in detail below. Similarly, one set of ends of the column windings is commoned to a core driver, while the other ends are connected to individual bilateral switches.

Memory selection is accomplished by grounding through the associated bilateral switches one of the non-common ends of the row windings and one of the non-common ends of the column windings. The core drivers apply read pulses to the selected windings during a read cycle, and write pulses during a write cycle of the memory. A read pulse switches the selected cores (one per plane) to the "0" state. If the core was previously in a "1" state, the transition is accompanied by a flux change which induces a voltage pulse in the sense winding which threads all the cores in a particular plane. If the selected core previously contained a "0," a much smaller and briefer voltage is induced in the sense winding. The sense amplifier, as will be seen from its description below, functions to produce output only on switching to "0" from a previous "1."

The write pulse will switch the selected cores to "1," and this will be permitted in those planes where the intent is to write "1." Where "0" must be written, an inhibit pulse is applied to the inhibit winding from an inhibit driver described below. The inhibit pulse envelopes the write pulse, and inhibits writing of a "1," and therefore leaves the selected core in the "0" state it had at the end of the read cycle. There is one inhibit driver and one sense amplifier per core plane.

Further details will be given in the course of the description of the amplifiers (drivers). The amplifiers are structurally very similar to the amplifier 1050 and counter reset 1070 previously described. To simplify the description it will be limited to points of difference with respect to the amplifier 1050 and counter reset 1070.

CORE DRIVER (FIGURE 25)

Figures 25A, 25B, 26:
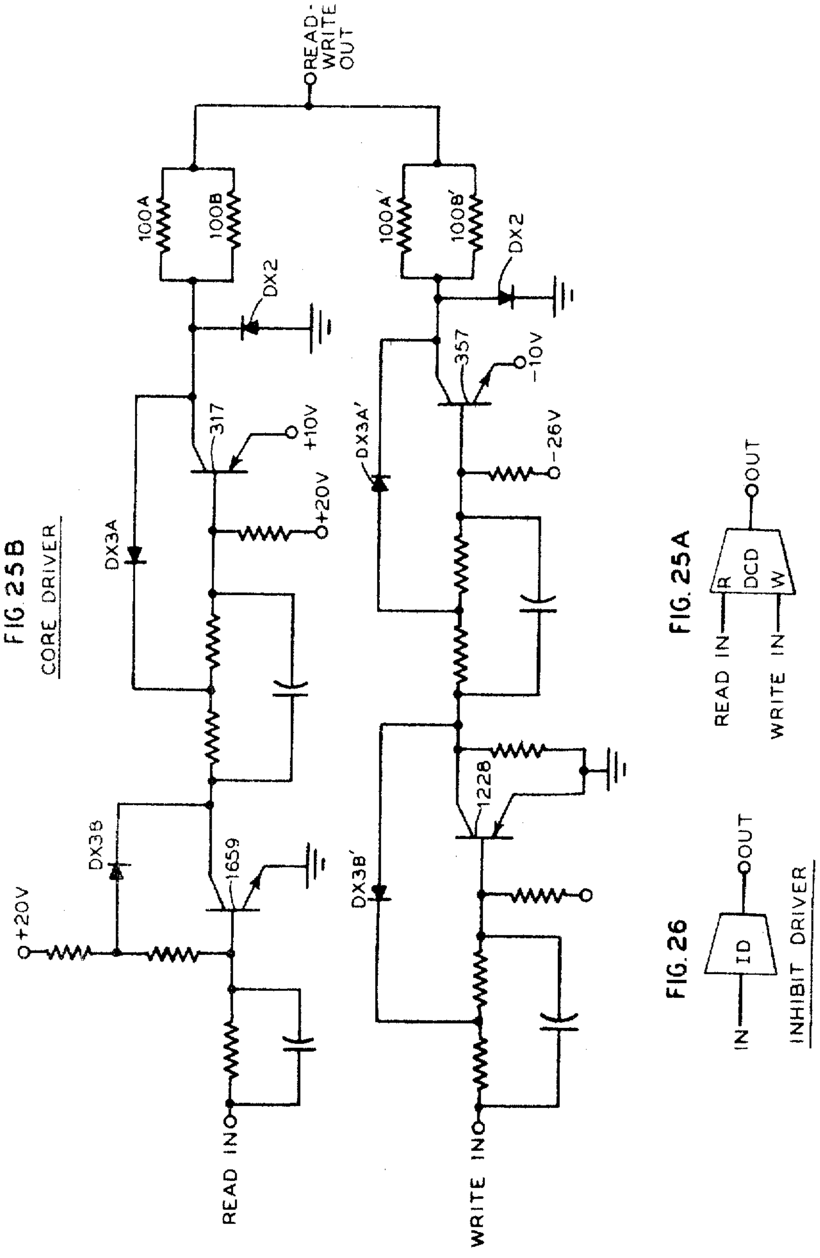
FIGS. 25A and 25B show respectively the symbol and schematic details of a core driver.
FIG. 26 shows the symbol of an inhibit driver.

The symbol for a representative core driver DCD is shown in FIGURE 25A. The core driver is provided with a read input terminal, a write input terminal, and a common output terminal which is connected to the commoned ends of row or column windings.

The circuit details of the core driver are shown in FIGURE 25B. The read input terminal is intended to be connected to a source of read pulse voltage of positive polarity. A two stage direct coupled amplifier spans the read input terminal and the output terminal. The resultant negative voltage pulse at the collector of npn transistor 1659 turns on the previously off second stage (pnp transistor 317). Current flows from the +10 volt source through the emitter and then the collector of transistor 317, then through the paralleled resistors 100A and 100B to the output terminal into the selected winding and its associated bilateral switch to ground. The feedback diodes DX3B and DXA are oppositely poled.

The write channel from the write input terminal to the common output terminal is similar to the read channel, except for the inversion of transistor conductivity type to accommodate negative write input voltage pulses. Here the output current path is the reverse of that given for the read channel; it begins at ground at the bilateral switch and terminates at the −10 volt source connected to the emitter of npn transistor 357.

INHIBIT DRIVER (FIGURE 26)

The symbol for a representative inhibit driver ID is shown in FIGURE 26. The circuit is the same as the write channel of the core driver. The input terminal is intended to be connected to an external exciting source, and the output terminal to an end of the inhibit winding whose other end is grounded. The input inhibit pulses are of six microsecond duration and envelop corresponding *write* pulses.

BILATERAL SWITCH (FIGURE 27)

Figure 27B:
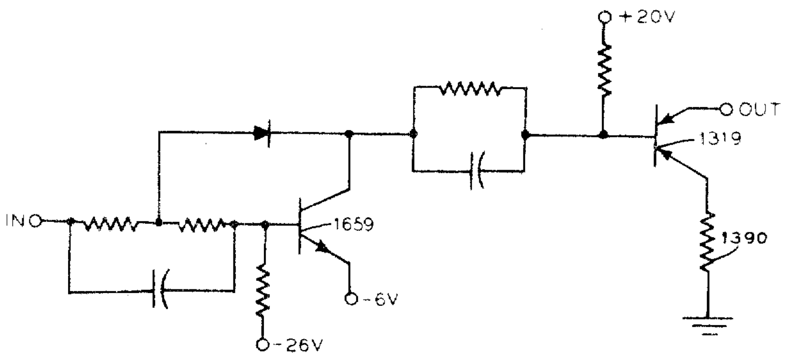
FIGS. 27A and 27B show the symbol and schematic details of a bilateral switch.
Figure 27A:
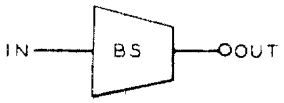

The symbol for a representative bilateral switch BS is shown in FIGURE 27A, and the corresponding circuit in FIGURE 27B. The circuit is similar in structure to the amplifier circuits previously described; however the output transistor 1319 is a bidirectional germanium alloy junction transistor having emitter and collector electrodes which in a sense are interchangeable, that is the current amplification from base to emitter is the same as that from base to collector. Actually, there is no distinct emitter and collector in the usual sense. Therefore, the electrode which is connected to the output terminal may be deemed the collector/emitter; it is intended to be connected to the sense winding whose other end is grounded. The electrode which is connected to the resistor 1390 is deemed the emitter/collector. The latter resistor is provided for current monitoring purposes with the use of a cathode ray oscilloscope.

In operation, the bilateral transistor is kept normally non-conducting by the collector resistor of npn transistor 1659. When the latter is turned on by switching the input from minus six volts to zero volts, the bilateral switch is supplied with base current and thus conducts. The base current short circuits the bilateral switch allowing current passage in either direction while absence of base current leaves the switch open.

SENSE AMPLIFIER (FIGURE 28)

Figure 28B:
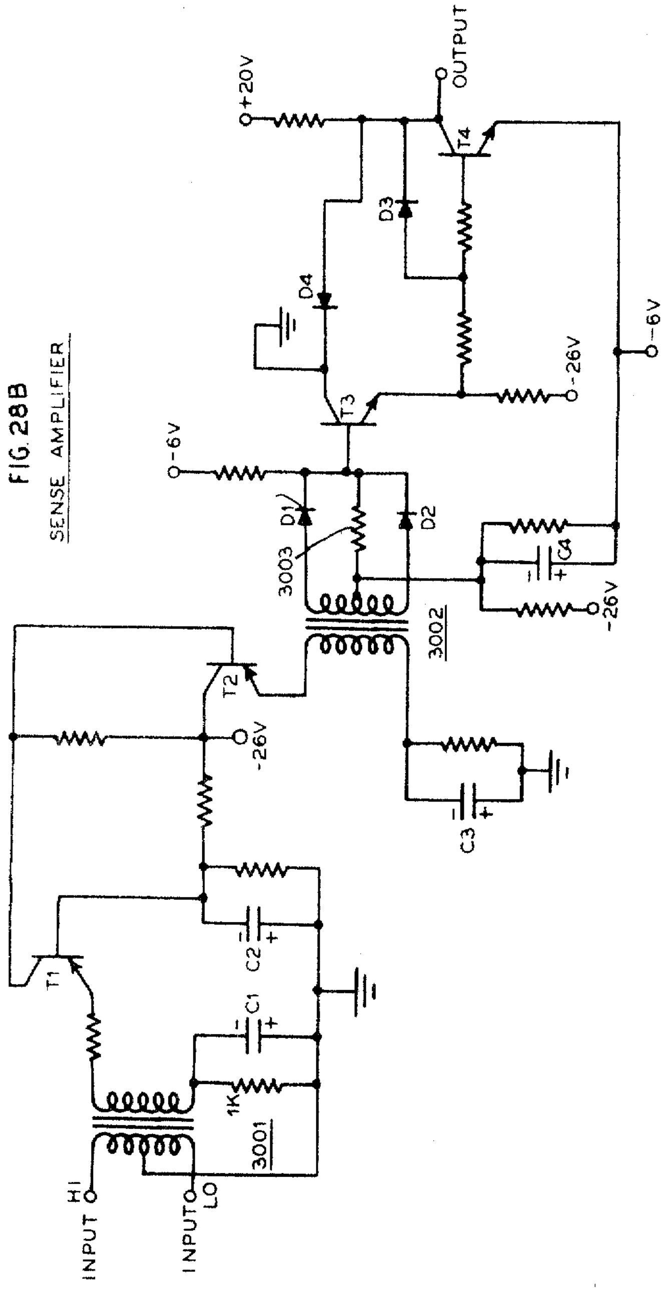
FIGS. 28A and 28B show the symbol and schematic diagram of a sense amplifier.
Figure 28A:
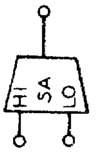

The symbol for the representative sense amplifier SA is shown in FIGURE 28A and the corresponding circuitry in FIGURE 28B. The sense amplifier has double-ended input terminals HI and LO, to which the ends of the magnetic core memory sense winding are connectable, and an output terminal.

The sense winding which threads one core plane delivers signals to sense amplifier SA which are on the order of millivolts, very low impedance and of either polarity. The signals are pulses of lobe shape, those corresponding to binary "0" being of appreciably lesser amplitude than those corresponding to binary "1." The sense amplifier functions to suppress the lower amplitude input signals. The larger amplitude input signals are amplified, converted to pulse signals of single polarity, and shaped to the desired square shape.

Referring to FIGURE 28B, input terminal HI and LO are connected to the primary of a transformer 3001, the center tap of the primary being grounded. The transformer secondary winding is included in the emitter input circuit of a grounded base amplifier including transistor T1. The amplified output is applied from the collector of T1 to the base of an emitter follower stage including transistor T2, the emitter including the primary winding of a second transformer 3002, whose secondary winding drives a full wave rectifier including diodes D1 and D2. The diodes are biased so as to pass only the desired full amplitude signals and to block passage of the lesser amplitude signals. This is accomplished by means of resistor 3003, which interconnects the diode cathodes and the center tap of the secondary winding of transformer 3002, in association with the other indicated resistors connected to resistor 3003. The bias network also properly biases the base of transistor T3, also connected to the diode cathodes for further suppression of any residual low amplitude signals, and for shaping of the desired signals in association with the final output stage including transistor T4. Transistor T3 is connected in an emitter follower circuit, while transistor T4 is connected in a grounded emitter circuit. Output is obtained from the collector of transistor T4.

SUMMARY

The basic system may be summarized as follows: In combination with (a) a data processor which transmits and receives words of information as groups of information characters, each comprising a plurality of bits, which transmits input and output control signals to indicate when it will transmit a word of information and when it will receive a word of information and which transmits storage register address signals, and (b) a plurality of input-output devices each of which transmits and receives information characters, each comprising a plurality of bits, and is responsive to input and output control signals indicating when it can transmit or receive a character of information, a communications buffer comprising:

(I) a memory having a plurality of multicharacter storage registers which comprises:

- (1) a multiplane array of magnetic cores each of of which has two states of residual magnetization for storing a bit of information wherein the magnetic cores in each plane are arrayed in rows and columns,
  - (a) the magnetic cores in each plane aligned with the intersection of a given row and column being two addressable character-storage locations for the storage of a pair of multibit characters wherein the corresponding magnetic cores in a first group of said planes are assigned to store one of the pair of characters and the corresponding magnetic cores in a second group of said planes are assigned to store the other of the pair of character,
  - (b) each set of aligned rows of magnetic cores in said planes being assigned as a multicharacter storage register associated with a different one of said input-output devices,
  - (c) each of said multicharacter storage registers being divided into three groups of character-storage locations wherein
    - (i) the first group includes two distinct addressable character-storage locations for storing control bits related to different transfer operations between said data processor and said communications buffer, and between the associated input-output device and said communications buffer,
    - (ii) the second group includes two distinct addressable character-storage locations for storing address characters associated with the addressable character storage locations in the storage register, and
    - (iii) the third group includes the remaining addressable character-storage locations for storing information characters,
  - (d) a plurality of row windings, each of the row windings threading respectively all of the magnetic cores in one corresponding row of all of the planes,
  - (e) a plurality of column windings, each of the column windings threading respectively all of the magnetic cores in one corresponding column of all of the planes,
  - (f) a plurality of inhibit windings, each of the inhibit windings threading all of the magnetic cores in a given plane, (g) a plurality of sense windings, each of the sense windings threading all of the magnetic cores in a given plane, (2) a first plurality of bilateral switches each having a control input, a first terminal connected to one end of each of said row windings aligned in a row and a second terminal connected to a source of predetermined potential whereby when said control input receives a row-selection control signal current can flow between said first and second terminals, (3) a second plurality of bilateral switches each having a control input, a first terminal connected to one end of each of said column windings aligned in a column and a second terminal connected to a predetermined potential source whereby when said control input receives a control signal current can flow between said first and second terminals, (4) a read-write amplifier means having a read input, a write input, and an output connected to the other end of each row winding and column winding whereby a current having a first direction is transmitted from said output for driving said magnetic cores to a first state of residual magnetization when a signal is received at said read input, and a current having a second direction is transmitted from said output for driving said magnetic cores to a second state of residual magnetization when a signal is received at said write input, (5) a plurality of inhibit amplifier means each having first and second inputs and an output connected to one of said inhibit windings whereby when a signal is received at the first input and no signal is received at the second input a current is transmitted from said output which maintains said magnetic cores in said first state of residual magnetization, (6) a plurality of sense amplifier means each having an input connected to one of said sense windings and an output whereby a signal is transmitted from said output whenever any magnetic core threaded by said sense winding switches from said second state of residual magnetization to said first state of residual magnetization, (7) pulse generator means having an input responsive to an initiate read-write cycle control signal and an output means for generating a read pulse signal followed by a write pulse signal and an inhibit pulse signal overlapping said write pulse signal in time whenever a signal is received at said input, (8) means for transmitting said read pulse signal to the read input of said read-write amplifier, (9) means for transmitting said write pulse signal to the write input of said read-write amplifier, and

(10) means for transmitting said inhibit pulse signal to the first input of each of said inhibit amplifier means;

(II) memory row scanning means responsive to stepping signals (1) for sequentially transmitting control signals to the control inputs of said first plurality of bilateral switches for sequentially selecting multicharacter storage registers of said memory, and (2) for sequentially transmitting said control signals to the input-output devices associated with the selected multicharacter storage registers;

(III) character addresser means for selecting said addressable character-storage locations in said memory comprising (1) address-character storage means for storing address characters representing said character-storage locations, (2) means responsive to an initial character-storage location signal for causing said address-character storage means to store initial address characters, (3) add-one means responsive to an add-one control signal for increasing the address represented by the stored address characters by one, (4) add-two means responsive to an add-two control signal for increasing the address represented by the stored address characters by two, (5) connecting means for connecting the inputs of said address-character storage means to the outputs of said sense amplifier means whereby address characters in the storage registers are transferable to said character-addresser means, (6) decoding means having an input connected to the output of said address-character storage means for generating column-selection control signals in accordance with the character address stored in said address character storage means and an output for transmitting said control signals to the control inputs of said second plurality of bilateral switches in said memory for selecting memory columns, and (7) odd-even generating means for generating an odd-even control signal to indicate whether the stored address characters represent a character-storage location associated with the first group of planes or with a character-storage location associated with the second group of planes, said odd-even control signal being present when the character-storage address is associated with the second group of said planes;

(IV) odd-even character selector means for transmitting characters to either said data processor or said input-output device comprising a plurality of output gating means each having (1) a first input connected to the output of a sense amplifier means associated with said first group of planes, (2) a second input connected to the output of a corresponding sense amplifier means of said second group of planes, and (3) a control input for receiving the odd-even control signals from said odd-even generating means, whereby when an odd-even control signal is present at the control inputs of said plurality of output gating means the character from said second group of planes is transmitted to the outputs of said plurality of output gating beans and when an odd-even control signal is absent the character from said first group of planes is transmitted to the outputs of said plurality of output gating means;

(V) memory input selector means comprising (1) a first plurality of switching units associated with the first group of planes, (2) a second plurality of switching units associated with the second group of planes, (3) each of said switching units having an output connected to the second input of a corresponding one of said inhibit amplifier means, (4) each of said switching units comprising recirculation, processor output, input-output output and unit add gating means, (5) said recirculation gating means having (a) bit input connected to the output of a corresponding one of said sense amplifier means, (b) a recirculation control input responsive to a recirculation control signal, (c) an odd-even control signal input responsive to the presence of said odd-even control signal for transferring a bit signal present at said bit input to the output only if said recirculation gating means is part of first plurality of switching units and responsive to the absence of said odd-even control signal for transferring a bit signal present at said bit input to said output only if said recirculation means is part of said second plurality of switching units provided said recirculation control signal is present at said recirculation control input, and (d) a character pair control signal input responsive to a character pair control signal and in the presence of a recirculation control signal at said recirculation control input for transferring the bit signal irrespective of the presence or absence of an odd-even control signal, (6) said processor output gating means having (a) a bit input responsive to character bits transmitted by said data processor, (b) a processor output control input responsive to a processor output control signal, and (c) an odd-even control signal input responsive to the presence of said odd-even control signal for transferring a bit present at said bit input to said output only if said processor output gating means is part of said second plurality of switching units and responsive to the absence of said odd-even control signal for transferring a bit present at said bit input to said output only if said processor output means is part of said first plurality of switching units provided said processor output control signal is present, (7) said input-output output gating means having (a) a bit input-responsive to character bits transmitted by an input-output device, (b) an input-output output control input responsive to an input-output output control signal, and (c) an odd-even control input responsive to the presence of said odd-even control signal for transferring a bit present at said bit input to said output only if said input-output output gating means is part of said second plurality of switching units and responsive to the absence of said odd-even control signal for transferring a bit present at said bit input to said output only if said input-output output gating means is part of said first plurality of switching means providing said input-output output control signal is present, and (8) said unit-add gating means having (a) a bit input connected to the output of a corresponding one of said sense amplifier means, and (b) a unit-add control input responsive to a unit-add control signal for causing said unit-add gating means in cooperation with the unit-add gating means of other switching units to perform a unit addition to the address characters represented by the bit signals transferred from said sense amplifier means and for transferring the associated bit of the unit-added address characters to said output; and (VI) control means comprising (1) control sequence means including (a) means for transmitting stepping signals to said memory row scanning means for selecting storage registers, (b) means for transmitting an initial character-storage location signal to said character addresser means for selecting the control characters of the selected storage register, (c) means for transmitting an initiate read-write control signal to the pulse generator means of said memory, (d) a first character sensing means responsive to a first coded combination of bits of said selected control characters for generating a first character transfer control signal, (e) a second character sensing means responsive to a second coded combination of bits of said selected control characters for generating a second character transfer control signal, (f) word transfer sensing means responsive to a third coded combination of bits of said selected control characters for generating a word transfer control signal, (2) means responsive to said first or second character transfer control signals including (a) means for transmitting an add-two control signal to said character addresser means for selecting the address characters in a storage register, (b) means for reactivating said means for transmitting an initiate read-write control signal, (c) means for activating the connecting means of said character addresser means whereby when said address characters are read from said memory they are transferred to the address character storage means of said character addresser means for selecting another column of said memory, (d) means for transmitting unit-add control signals to the unit-add gating means of said memory input selector means whereby said address characters are rewritten after being updated by one, (e) means responsive to said first character transfer control signal for again activating said means for transmitting an initiate read-write control signal for transmitting recirculation and character pair control signals to each of the recirculation gating means of said memory input selector means and for transmitting a control signal to the input-output device associated with the selected storage register to cooperate with the control signal from said row scanning means whereby the two characters of the selected row and column are read from and rewritten into said memory and said two characters are also transmitted to said odd-even character selector means so that one of said characters is transferred to the input-output device associated with the selected storage register, (f) means responsive to said second character control signal for again activating said means for transmitting an initiate read-write control signal, transmitting recirculation control signals to each of said recirculation gating means and input-output output control signals to each of said input-output gating means of said memory input selector means and for transmitting a control signal to the input-output device associated with the selected storage register whereby one of the characters read from the memory is rewritten into the same selected character-address location and a character from said input-output device is written into the other selected character-address location, (3) means responsive to said word transfer signal and an input control signal from said data processor including (a) means for continually activating said means for transmitting an initiate read-write control signal whereby a series of initiate read-write control signals are transmitted to said memory, (b) means for transmitting a series of add-one control signals to said character addresser means, (c) means for transmitting control signals to said data processor whereby the characters of the word stored in the selected storage register are transferred to said data processor, (d) means for generating a transfer in progress signal as long as said characters are transferred, (4) means responsive to an output control signal and storage register address signals from said data processor and the control signals from said memory row scanning means including (a) means for continually activating the means for transmitting an initiate read-write control signal whereby a series of initiate read-write control signals are transmitted to said memory, (b) means for transmitting a series of control signals to the add-one means of said character addresser means, (c) means for transmitting recirculation control signals to each of said recirculation gating means and processor output control signals to each of said processor output gating means of said memory input selector means whereby a word of characters is transferred from said data processor to the selected storage register, and (d) means for generating a transfer in progress signal as long as characters are being transferred, and (5) means for energizing said control sequence means (a) whenever said first and second character transfer control signals and said word transfer control signal and said output control signal from said data processor are not detected, (b) after the transfer of a character between said communications buffer and an input-output means, and (c) at the end of a transfer in progress signal.

APPENDIX

Since the various elements shown in the system are made up of standard components, and standard assemblies, reference may be had to "High Speed Computing Devices," by the staff of Engineering Research Associates, Inc., (McGraw-Hill Book Company, Inc., 1950); and appropriate chapters in "Computer Handbook," edited by Harvey D. Huskey and Granino A. Korn (McGraw-Hill, 1962), and for detailed circuitry, to for example, "Principles of Transistor Circuits," edited by Richard F. Shea (John Wiley and Sons, Inc., New York, and Chapman and Hall, Ltd., London, 1953 and 1957).

In addition, other references are: for systems, organization and components: "Logical Design of Digital Computers," by M. Phister, Jr. (John Wiley and Sons, New York); "Arithmetic Operations in Digital Computers," by R. K. Richards (D. Van Nostrand Company, Inc., New York); for circuits and details, "Digital Computer Components and Circuits," by R. K. Richards (D. Van Nostrand Company, Inc., New York).

While only one embodiment of the invention has been disclosed and described in detail, there will now be obvious to those skilled in the art many modifications and variations satisfying some or all of the objects but which do not depart from the spirit of the invention as defined in the appended claims.

What is claimed is:

1. In combination with (a) a data processor which transmits and receives words of information as groups of information characters, each comprising a plurality of bits, which transmits input and output control signals to indicate when it will transmit a word of information and when it will receive a word of information and which transmits storage register address signals, and (b) a plurality of input-output devices each of which transmits and receives information characters, each comprising a plurality of bits, and is responsive to input and output control signals indicating when it can transmit or receive a character of information, a communications buffer comprising:

(I) a memory having a plurality of multicharacter storage registers, (II) means for selecting one of said multicharacter storage registers, (III) word transfer means for transferring a word of information as a group of information characters between a selected multicharacter storage register and said data processor, (IV) character transfer means for transferring a single information character between a selected multicharacter storage register and one of said input-output devices, and (V) control means for activating either said word transfer means or said character transfer means when a multicharacter storage register is selected.

2. The combination of claim 1 wherein each of said multicharacter storage registers is associated with one of said input-output devices and further comprising a type of transfer control memory associated with each of said multicharacter storage registers for storing control information indicative of the type of transfer to be performed when the associated multicharacter storage register is selected, and means for transferring the control information in the type of transfer control memory of the selected storage register whereby said control means activates said word transfer means or said character transfer means in accordance with the received control information.

3. the combination of claim 2 further including means in said control means for causing the selection of another of said multicharacter storage registers after the transfer has been completed in response to the received control information from the type of transfer control memory of the selected register or for causing the immediate selection of another of said multicharacter storage registers when the type of transfer control memory of the selected register transfers no control information.

4. The system of claim 2 further comprising a plurality of character selection memory means each associated with one of said multicharacter storage registers for storing character position information to indicate which character position of the associated multicharacter storage register is to participate in a character transfer, and wherein said control means is responsive to the character selection memory means of the selected multicharacter storage register after it receives control information from the associated type of transfer control memory indicating a character transfer for selecting the character position of the selected multicharacter storage register which is to participate in the character transfer.

5. The system of claim 2 wherein the control information includes indicia for indicating a character transfer from the selected multicharacter storage register to the associated input-output device or indicia for indicating a character transfer to the selected multicharacter storage register from the associated input-output device.

6. The system of claim 2 wherein the control information includes indicia for indicating a word transfer from the selected multicharacter storage register to the data processor.

7. In combination with (a) a data processor which transmits and receives words of information as groups of information characters, each comprising a plurality of bits, which transmits input and output control signals to indicate when it will transmit a word of information and when it will receive a word of information and which transmits storage register address signals, and (b) a plurality of input-output devices each of which transmits and receives information characters, each comprising a plurality of bits, and is responsive to input and output control signals indicating when it can transmit or receive a character of information, a communications buffer comprising:

(I) a memory having a plurality of multicharacter storage registers wherein each of said multicharacter storage registers has a plurality of addressable character-storage locations, (II) a plurality of type of transfer control memories associated with each of said multicharacter storage registers for storing control information for indication of the type of transfer to be performed when the associated multicharacter storage register is selected, (III) a plurality of address-character memory means each associated with one of said multicharacter storage registers for storing address characters representing said character-storage locations, (IV) a storage register selection means for sequentially selecting said multicharacter storage registers of said memory, (V) character addresser means for selecting said addressable character-storage locations in the multicharacter storage registers of said memory comprising:

(1) address-character storage means for storing address characters representing said character-storage locations, (2) means responsive to an initial character-storage location signal for causing said address-character storage means to store initial address characters, (3) add-one means responsive to an add-one control signal for increasing the address represented by the stored address characters by one, (4) connecting means for connecting the inputs of said address-character storage means to the outputs of said address-character memory means whereby address characters in the address-character memory means are transferable to said character-addresser means, and (5) means responsive to said address-character storage means for selecting the character-storage locations in the selected multicharacter storage register represented by the address characters stored in said address-character storage means, (VI) control means comprising:

(1) control sequence means including:

(a) means for transmitting an initial character-storage location signal to said character addresser means, (b) a first sensing means responsive to a first indicium from the type of transfer control memory of the selected multicharacter storage register for generating a first character transfer control signal, (c) a second sensing means responsive to a second indicium from the type of transfer control memory of the selected storage register for generating a second character transfer control signal, (d) a third sensing means responsive to a third indicium from the type of transfer control memory of the selected storage register for generating a word transfer control signal, (2) means responsive to said first or second character transfer control signals including:

(a) means for activating the connecting means of said character addresser means whereby address characters are read from the address-character memory means of the selected multicharacter storage register and are transferred to the address character storage means of said character addresser means for selecting the character-storage location indicated by said address character, (b) means responsive to said first character transfer control signal for initiating a transfer of the character in the selected character-storage location of the selected storage register and for transmitting a control signal to the input-output device so the character is transferred to the input-output device associated with the selected storage register, (c) means responsive to said second character control signal for transmitting a control signal to the input-output device associated with the selected storage register whereby a character from said input-output device is written into the selected character-address location, (3) means responsive to said word transfer signal and an input control signal from said data processor including:

(a) means for transmitting a series of add-one control signals to said character addresser means, and (b) means for transmitting control signals to said data processor whereby the characters of the word stored in the selected storage register are transferred to said data processor.

8. The combination of claim 7 wherein said storage register selection means is responsive to stepping signals and said control means further includes means for energizing said control sequence means:

(a) whenever said first and second character transfer control signals and said word transfer control signal and said output control signal from said data processor are not detected, (b) after the transfer of a character between said communications buffer and an input-output means, and (c) at the end of a transfer in progress signal.

9. In a data processing system including an information character handling means which handles information characters:

(I) a memory having a plurality of multicharacter storage registers, each of said multicharacter storage registers including two groups of character-storage locations wherein one of said groups includes control character-storage locations for storing at least one of a group of different control characters and the other of said groups includes information character-storage locations for storing information characters, (II) means for selecting one of said multicharacter storage locations, (III) means for reading out the control characters stored in the control character-storage locations of the selected multicharacter storage register, and (IV) control means responsive to the read out control characters for causing a transfer of information characters between said information handling means and the information character-storage locations of the selected multicharacter storage register, the type of transfer being dependent on which control characters of the group of different control characters was stored in the control character-storage locations of the selected multicharacter storage register.

10. The system of claim 9 wherein said control means causes a transfer of information characters from the information character-storage locations of the selected multicharacter register to the information character handling means when a first control character is read out from the control character storage locations of the selected multicharacter register and said control means causes a transfer of information characters to the information character-storage locations of the selected multicharacter register from the information character handling means when a second control character is read out from the control character storage locations of the selected multicharacter storage register.

11. The system of claim 9 wherein said control character-storage locations store at least one of a plurality of address characters, each of said address characters representing one of the information character locations of the associated multicharacter storage register; said control means including means responsive to the read out address character for causing the transfer of an information character between the information character location of the selected multicharacter storage register associated with said address character and said information character handling means.

12. In a data processing system including an information character handling means which handles information characters:

(I) a memory having a plurality of multicharacter storage registers, each of said multicharacter storage registers including three groups of character-storage locations wherein the first of said groups includes a control character storage location for storing one of two control characters, one control character for indicating a transfer from said information handling means the other control character for indicating a transfer to said information handling means, the second of said groups includes information character-storage locations for storing information characters, the third of said groups includes address character-storage locations for storing address characters from a plurality of address characters representing the information character-storage locations, (II) means for selecting one of said multicharacter storage registers, (III) means for reading out the control character stored in said control character-storage location and the address characters stored in said address character-storage locations, and (IV) control means responsive to the read out control character and the read out address characters for causing an information character transfer between the information character storage location of the selected multicharacter storage register indicated by the read out address characters in the direction indicated by the read out control character.

13. In a data processing system including an information processor for transmitting or receiving words of information comprising a plurality of information characters, and a plurality of input-output devices which transmit and receive information characters:

(I) a memory having a plurality of multicharacter storage registers each associated with one of said input-output devices, (1) each of said storage registers including three groups of character storage locations, (a) the first of said groups including at least one control character-storage location for storing a control character of a group of control characters, a first control character of said group indicative of a word transfer of the information characters between said information processor and the information character locations of the multicharacter storage register, a second control character of said group indicative of an information character transfer from an information character location of said multichannel storage register to the associated input-output device and a third control character indicative of transfer to an information character location of said multicharacter storage register from the associated input-output device, (b) the second of said groups including information character-storage locations for storing information characters, (c) the third of said group including address character-storage locations for storing address characters from a plurality of address characters representing the information character-storage locations, (II) means for selecting one of said multicharacter storage registers, (III) means for reading out the control character stored in said control character-storage location and the address characters stored in said address character-storage locations, (IV) control means comprising:

(a) means responsive to the read out control character for causing an information word transfer between said information processor and the information character positions of said selected multicharacter storage register when the read out control character is said first control character.

(b) means responsive to the read out control character and address characters for causing the character transfer from the character-storage location represented by the read out address characters of the selected multicharacter storage register to the associated input-output device when the read out control character is said second control character, and (c) means responsive to the read out control character and address characters for causing a character transfer to the character storage location represented by the read out address characters of the selected multicharacter storage register from the associated input-output device when the read out control character is said third control character.

14. The apparatus of claim 13 including means for changing the read out address characters to address characters representing a different information character storage location when a character has been transferred.

15. The apparatus of claim 13 including means for causing said selecting means to select another of said multichannel storage registers after there has been a transfer of information characters.

16. In combination with (a) a data processor which transmits and receives words of information as groups of information characters, each comprising a plurality of bits, which transmits input and output control signals to indicate when it will transmit a word of information and when it will receive a word of information and which transmits storage register address signals, and (b) a plurality of input-output devices each of which transmits and receives multibit information characters in response to input and output control signals indicating when it can transmit or receive a character of information, a communications buffer comprising:

(I) a memory having a plurality of multicharacter storage registers which comprises:

(1) an array of plural aligned planes of magnetic cores each of which cores has two states of residual magnetization for storing a bit of information wherein the magnetic cores are also arrayed in aligned rows and aligned columns, each row and also each column embracing all the planes, (a) the magnetic cores aligned with the intersection of a given row and column being two addressable multibit character-storage locations wherein the corresponding magnetic cores in a first group of said planes are assigned to store one of the two characters and the corresponding magnetic cores in a second group of said planes are assigned to store the other of the two characters, (b) there being as many rows as input-output devices with each particular row assigned as a multicharacter storage register to a corresponding particular input-output device, (c) each of said multicharacter storage registers being divided into three groups of character-storage locations wherein (i) the first group includes two distinct addressable character-storage locations for storing control bits related to different kinds of transfer operations be-between said data processor and said communications buffer, and between the associated input-output device and said communications buffer, (ii) the second group includes distinct addressable character-storage locations for storing address characters associated with the addressable character storage locations in the storage register, and (iii) the third group includes the remaining adddressable character-storage locations for storing information characters, (II) a storage register selection means for sequentially selecting said multicharacter storage registers of said memory, (III) character addresser means for selecting said addressable character-storage locations in said memory comprising:

(1) address-character storage means for storing address characters representing said character-storage locations, (2) means responsive to an initial character-storage location signal for causing said address-character storage means to store initial address characters, (3) add-one means responsive to an add-one control signal for increasing the address represented by the stored address characters by one, (4) connecting means for connecting the inputs of said address-character storage means to the outputs of said sense amplifier means whereby address characters in the storage registers are transferable to said character-addresser means, (5) means responsive to said address-character storage means for selecting the character-storage locations in the selected multi-character storage register represented by the address characters stored in said address-character storage means, (IV) control means comprising:

(1) control sequence means including:

(a) means for transmitting stepping signals to said memory row scanning means for selecting storage registers, (b) means for transmitting an initial character-storage location signal to said character addresser means, (c) a first character sensing means responsive to a first coded combination of bits of said selected control characters for generating a first character transfer control signal, (d) a second character sensing means responsive to a second coded combination of bits of said selected control characters for generating a second character transfer control signal, (e) word transfer sensing means responsive to a third coded combination of bits of said selected control characters for generating a word transfer control signal, (2) means responsive to said first or second character transfer control signals including:

(a) means for activating the connecting means of said character addresser means whereby the address characters are read from the address character storage locations of the selected multi-character storage register and are transferred to the address character storage means of said character addresser means for selecting the information character-storage location indicated by by said address characters, (b) means responsive to said first character transfer control signal for initiating a transfer of the character in the selected character-storage location of the selected storage register and for transmitting a control signal to the input-output device so the character is transferred to the input-output device associated with the selected storage register, (c) means responsive to said second character control signal for transmitting a control signal to the input-output device associated with the selected storage register whereby a character from said input-output device is written into the selected character-addresss location, (3) means responsive to said word transfer signal and an input control signal from said data processor including:

(a) means for transmitting a series of add-one control signals to said character addresser means, and (b) means for transmitting control signals to said data processor whereby the characters of the word stored in the selected storage register are transferred to said data processor.

17. The combination of claim 16 wherein said storage register selection means is responsive to stepping signals and said control means further includes means for energizing said control sequence means:

(a) whenever said first and second character transfer control signals and said word transfer control signal and said output control signal from said data processor are not detected,
(b) after the transfer of a character between said communcations buffer and an input-output means, and
(c) at the end of a transfer in progress signal.

18. In combination with data handling equipment which handles characters of information:
(I) a memory having a plurality of multicharacter storage registers
(a) each of said multicharacter storage registers having a plurality of pairs of character-storage locations,
(II) storage register selection means for selecting one of said multicharacter storage registers,
(III) character-storage location selection means for selecting a pair of character-storage locations and including:
(a) indicating means for indicating which of the character-storage locations of a selected pair of character-storage locations is to be included in a character transfer, and
(IV) control means responsive to said storage register selection means and said character-storage selection means to cause a character transfer between said data handling equipment and the character-storage location indicated by said indicating means of the pair of character-storage locations selected by said character-storage location selection means of the multicharacter storage register selected by said storage register selection means.

19. In combination with data handling equipment which handles characters of information:
(I) a memory having a plurality of multicharacter storage registers
(a) each of said multicharacter storage registers having a plurality of pairs of character-storage locations,
(II) input-output means for connecting said memory to said data handling equipment whereby characters of information are transmitted between said memory and data handling equipment via said input-output means,
(III) storage register selection means for selecting one of said multicharacter storage registers,
(IV) character-storage location selection means for selecting a pair of character-storage locations and including:
(a) indicating means for selecting which of the character-storage locations of a selected pair of character-storage locations is to be included in a character transfer, and
(V) control means responsive to said storage register selecting means and said character-storage location selection means for transferring the contents of a selected pair of character-storage locations between said input-output means and including a character selection means responsive to said indicating means for controlling said input-output means to transfer one of the transfer characters between said input-output means and said data handling equipment.

20. The combination of claim 19 wherein:
(a) said control means includes means for transferring a pair of characters from the selected pair of character-storage locations to said input-output means and transferring a pair of characters from said input-output means to said selected pair of character-storage locations, and
(b) said character selection means causes the transfer of one of the characters in said input-output means to said data handling equipment after said control means has caused the transfer of a pair of characters to said input-output means, and causes the retransfer of the pair of characters in said input-output means back to the selected pair of character-storage locations.

21. The combination of claim 20 wherein:
(a) said control means includes means for transferring a pair of characters from the selected pair of character-storage locations to said input-output means and transferring a pair of characters from said input-output means to said selected pair of character-storage locations, and
(b) said character selection means causes the replacement of one of the characters in said input-output means that are transferred from the selected pair of character storage locations by a character from said data handling equipment and causes the transfer of the unsubstituted character and the substituting character back to the selected pair of character-storage locations.

22. In combination with
(a) a data processor which transmits and receives words of information as groups of information characters, each comprising a plurality of bits, which transmits input and output control signals to indicate when it will transmit a word of information and when it will receive a word of information and which transmits storage register address signals, and
(b) a plurality of input-output devices each of which transmits and receives multibit information characters in response to input and output control signals indicating when it can transmit or receive a character of information, a communications buffer comprising:
(I) a memory having a plurality of multicharacter storage registers which comprises addressable pairs of character-storage locations,
(II) storage register selection means for selecting one multicharacter storage register at a time,
(III) character addresser means for selecting said pairs of addressable character-storage locations and including odd-even control signal generating means to indicate the availability of the odd and even character-storage locations of the selected pair of character-storage locations,
(IV) odd-even character selector means for transmitting characters to either said data processor or said input-output device, including
(1) input means connected to said memory for receiving a pair of characters from the selected pair of character-storage locations,
(2) output means for transmitting a character, and
(3) control means for receiving the odd-even control signal for controlling which of the pair of characters received by said input means is transmitted by said output means in accordance with the presence or absence of said odd-even control signal,
(V) a memory input selector for transmitting a pair of received characters to the selected pair of character-storage registers comprising:
(1) input means connected to
(a) said memmory for receiving a pair of characters transferred from said memory,
(b) said data processor, and
(c) said input-output device,
(2) first and second output means connected to said memory whereby each of said output means transmits one character to said memory,
(3) control means responsive to said odd-even control signal for connecting the input means connected to said data processor or to said input-output device to said first or second output means and for connecting input means connected to said memory to said second or first output means in accordance with the presence or absence of said odd-even control signal when information characters are being received by said memory and for connecting the input means connected to said memory to both said first and second output means when information is being transferred from said memory.

23. In combination with (a) a data processor which transmits and receives words of information as groups of information characters, each comprising a plurality of bits, which transmits input and output control signals to indicate when it will transmit a word of information and when it will receive a word of information and which transmits storage register address signals, and (b) a plurality of input-output devices each of which transmits and receives multibit information characters in response to input and output control signals indicating when it can transmit or receive a character of information, a communications buffer comprising:

(I) a memory having a plurality of multicharacter storage registers which comprises:

(1) an array of plural aligned planes of magnetic cores each of which cores has two states of residual magnetization for storing a bit of information wherein the magnetic cores are also arrayed in aligned rows and aligned columns, each row and also each column embracing all the planes, (a) the magnetic cores aligned with the intersection of a given row and column being two addressable multibit character-storage locations wherein the corresponding magnetic cores in a first group of said planes are assigned to store one of the two characters and the corresponding magnetic cores in a second group of said planes are assigned to store the other of the two characters, (b) there being as many rows as input-output devices with each particular row assigned as a multicharacter storage register to a corresponding particular input-output device, (c) each of said multicharacter storage registers being divided into three groups of character-storage locations wherein (i) the first group includes two distinct addressable character-storage locations for storing control bits related to different kinds of transfer operations between said data processor and said communications buffer, and between the associated input-output device and said communications buffer, (ii) the second group includes two distinct addressable character-storage locations for storing address characters associated with the addressable character storage locations in the storage register, and (iii) the third group includes the remaining addressable character-storage lotions for storing information characters, (d) a plurality of row windings, as many in number as said rows, each particular row winding threading all the magnetic cores in a corresponding particular row, (e) a plurality of column windings, as many in number as said columns, each particular column winding threading all the magnetic cores which are located in a corresponding particular column, (f) a plurality of inhibit windings, as many in number as said planes, each particular inhibit winding threading all the magnetic cores in a corresponding particular plane, (g) a plurality of sense windings, as many in number as said planes, each of the sense windings threading all the magnetic cores in a corresponding particular plane, (2) a first plurality of bilateral switches, as many in number as said row windings, each having: a control input, a first terminal which is connected to one end of its particular one of said row windings, and a second terminal which is connected to a source of predetermined potential whereby when a given control input receives a row-selection control signal, current can flow between said first and second terminals, (3) a second plurality of bilateral switches, as many in number as said column windings, each having: a control input, a first terminal which is connected to one end of its particular one of said column windings, and a second terminal which is connected to a predetermined potential source whereby when a given control input receives a column-selection control signal, current can flow between the latter first and second terminals, (4) a read-write amplifier means having a read input, a write input, and an output which is connected to the other end of each row winding and column winding whereby a current having a first direction is transmitted from the latter output for driving said magnetic cores to a first state of residual magnetization when a signal is received at said read input, and a current having a second direction is transmitted from the latter output for driving said magnetic cores to a second state of residual magnetization when a signal is received at said write input, (5) a plurality of inhibit amplifier means, as many in number as said inhibit windings, each having a first and a second input and an output which is connected to its particular one of said inhibit windings whereby when a signal is received at the first input and no signal is received at the second input a current is transmitted from said output which maintains said magnetic cores in said first state of residual magnetization, (6) a plurality of sense amplifier means, as many in number as said sense windings, each having an input which is connected to its particular one of said sense windings, and an output, whereby a signal is transmitted from said output whenever any magnetic core threaded by said sense winding switches from said second state of residual magnetization to said first state of residual magnetization, (7) pulse generator means having an input which is responsive to an initiate read-write cycle control signal, and an output means for generating a read pulse signal followed by a write pulse signal and an inhibit pulse signal overlapping said write pulse signal in time whenever a signal is received at said input, (8) means for transmitting said read pulse signal to the read input of said read-write amplifier, (9) means for transmitting said write pulse signal to the write input of said read-write amplifier, and

(10) means for transmitting said inhibit pulse signal to the first input of each of said inhibit amplifier means, (II) memory row scanning means responsive to stepping signals (1) for sequentially transmitting control signals to the control inputs of said first plurality of bilateral switches for sequentially selecting multicharacter storage registers of said memory, and (2) for sequentially transmitting said control signals to the input-output devices associated with the selected multicharacter storage registers, (III) character addresser means for selecting said addressable character-storage locations in said memory comprising (1) address-character storage means for storing address characters representing said character-storage locations, (2) means responsive to an initial character-storage location signal for causing said address-character storage means to store initial address characters, (3) add-one means responsive to add-one control signal for increasing the address represented by the stored address characters by one, (4) decoding means having an input connected to the output of said address-character storage means for generating column-selection control signals in accordance with the character address stored in said address character storage means and an output for transmitting said control signals to the control inputs of said second plurality of bilateral switches in said memory for selecting memory columns, and (5) odd-even generating means for generating an odd-even control signal to indicate whether the stored address characters represent a character-storage location associated with the first group of planes or with a character-storage location associated with the second group of planes, said odd-even control signal being present when the character-storage address is associated with the second group of said planes, (IV) odd-even character selector means for transmitting characters to either said data processor or said input-output device comprising a plurality of output gating means each having (1) a first input connected to the output of a sense amplifier means associated with said first group of planes, (2) a second input connected to the output of a corresponding sense amplifier means of said second group of planes, and (3) a control input for receiving the odd-even control signals from said odd-even generating means, whereby when an odd-even control signal is present at the control inputs of said plurality of output gating means the character from said second group of planes is transmitted to the outputs of said plurality of output gating means and when an odd-even control signal is absent the character from said first group of planes is transmitted to the outputs of said plurality of output gating means, (V) memory input selector means comprising (1) a first plurality of switching units associated with the first group of planes, (2) a second plurality of switching units associated with the second group of planes, (3) each of said switching units having an output connected to the second input of a corresponding one of said inhibit amplifier means, (4) each of said switching units comprising recirculation, processor output and input-output gating means, (5) said recirculation gating means having (a) a bit input connected to the output of a corresponding one of said sense amplifier means, (b) a recirculation control input responsive to a recirculation control signal, (c) an odd-even control signal input responsive to the presence of said odd-even control signal for transferring a bit signal present at said bit input to the output only if said recirculation gating means is part of said first plurality of switching units and responsive to the absence of said odd-even control signal for transferring a bit signal present at said bit input to said output only if said recirculation means is part of said second plurality of switching units provided said recirculation control signal is present at said recirculation control input, and (d) a character pair control signal input responsive to a character pair control signal and in the presence of a recirculation control signal at said recirculation control input for transferring the bit signal irrespective of the presence or absence of an odd-even control signal, (6) said processor output gating means having (a) a bit input responsive to character bits transmitted by said data processor, (b) a processor output control input responsive to a processor output control signal, and (c) an odd-even control signal input responsive to the presence of said odd-even control signal for transferring a bit present at said bit input to said output only if said processor output gating means is part of said second plurality of switching units and responsive to the absence of said odd-even control signal for transferring a bit present at said bit input to said output only if said processor output means is part of said first plurality of switching units provided said processor output control signal is present, and (7) said input-output output gating means having (a) a bit input responsive to character bits transmitted by an input-output device, (a) an input-output output control input responsive to an input-output output control signal, and (c) an odd-even control input responsive to the presence of said odd-even control signal for transferring a bit present at said bit input to said output only if said input-output output gating means is part of said second plurality of switching units and responsive to the absence of said odd-even control signal for transferring a bit present at said bit input to said output only if said input-output output gating means is part of said first plurality of switching means provided said input-output output control signal is present, (VI) control means comprising (1) control sequence means including (a) means for transmitting stepping signals to said memory row scanning means for selecting storage registers, (b) means for transmitting an initial character-storage location signal to said character addresser means, (c) means for transmitting an initiate read-write control signal to the pulse generator means of said memory, (d) means for generating a first character transfer control signal when a transfer is from said memory to said input-output device, (e) means for generating a second character transfer control signal when a transfer is to said memory from said input-output device, (f) means for generating a word transfer control signal when a transfer is to take place between said data processor and said memory, (2) means responsive to said first or second character transfer control signals including (a) means responsive to said first character transfer control signal for activating said means for transmitting an initiate read-write control signal for transmitting recirculation and character pair control signals to each of the recirculation gating means of said memory input selector means and for transmitting a control signal to the input-output device associated with the selected storage register to cooperate with the control signal from said row scanning means whereby the two characters of the selected row and column are read from and rewritten into said memory and said two characters are also transmitted to said odd-even character selector means so that one of said characters is transferred to the input-output device associated with the selected storage register, (b) means responsive to said second character control signal for activating said means for transmitting an initiate read-write control signal, transmitting recirculation control signals to each of said recirculation gating means and input-output output control signals to each of said input-output gating means of said memory input selector means and for transmitting a control signal to the input-output device associated with the selected storage register whereby one of the characters read from the memory is rewritten into the same selected character-address location and a character from said input-output device is written into the other selected character-address location, (3) means responsive to said word transfer signal and an input control signal from said data processor including (a) means for continually activating said means for transmitting an initiate read-write control signal whereby a series of initiate read-write control signals are transmitted to said memory, (b) means for transmitting a series of add-one control signals to said character addresser means, (c) means for transmitting control signals to said data processor whereby the characters of the word stored in the selected storage register are transferred to said data processor.

No references cited.

ROBERT C. BAILEY, *Primary Examiner.*

R. ZACHE, *Assistant Examiner.*

UNITED STATES PATENT OFFICE

CERTIFICATE OF CORRECTION

Patent No. 3,312,945 April 4, 1967

Evelyn Berezin et al.

It is certified that error appears in the above identified patent and that said Letters Patent are hereby corrected as shown below:

Column 4, line 15, "rows" should read -- row --; line 67, "or flip-flap" should read -- reset --; line 75, "block" should read -- blocking --. Column 16, line 13, "PATCB′" should read -- PTCB′ --. Column 17, line 62, "is" should read -- are --. Column 26, line 65, "CAA" should read -- CCA --; same line 65, "CAA′" should read -- CCA′ --. Column 28, line 61, "CC2" should read -- CC2′ --. Column 31, line 20, "CWD1CWD1′" should read -- CWD1 and CWD1′ --; line 61, "+DRF1" should read -- -DRF1 --. Column 32, lines 45 and 46, "CAA", each occurrence, should read -- CCA --; line 55, "(AA1·DRF9" should read -- [(AA1·DRF9 --. Column 35, line 15, "2K1OA" should read -- 2K1OC --; line 18, "2K1OA" should read -- 2K1OC --. Column 45, line 21, after "The" insert -- counter --. Column 46, line 30, "diode" should read -- anode --. Column 48, line 1, "stage" should read -- set --; line 67, "-20" should read -- +20 --. Column 51, line 10, "beow" should read -- below --. Column 57, line 8, before "first" insert -- said --. Column 68, line 61, "memmory" should read -- memory --.

Signed and sealed this 10th day of March 1970.

(SEAL)
Attest:

EDWARD M.FLETCHER,JR.
Attesting Officer

WILLIAM E. SCHUYLER, JR.
Commissioner of Patents